(12) United States Patent
Sato

(10) Patent No.: US 12,704,385 B2
(45) Date of Patent: Aug. 11, 2026

(54) INFORMATION PROCESSING DEVICE, MOBILE DEVICE, AND INFORMATION PROCESSING SYSTEM

(71) Applicant: Sony Group Corporation, Tokyo (JP)

(72) Inventor: Naoyuki Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 122 days.

(21) Appl. No.: 18/260,619

(22) PCT Filed: Dec. 24, 2021

(86) PCT No.: PCT/JP2021/048264
§ 371 (c)(1),
(2) Date: Jul. 7, 2023

(87) PCT Pub. No.: WO2022/158255
PCT Pub. Date: Jul. 28, 2022

(65) Prior Publication Data

US 2024/0053169 A1 Feb. 15, 2024

(30) Foreign Application Priority Data

Jan. 21, 2021 (JP) ................................ 2021-008183

(51) Int. Cl.
*G01C 21/00* (2006.01)

(52) U.S. Cl.
CPC ................................ *G01C 21/3837* (2020.08)

(58) Field of Classification Search
CPC .............. G01C 21/3837; G01C 21/005; G01C 21/206; G05D 1/02
See application file for complete search history.

(56) References Cited

U.S. PATENT DOCUMENTS

2017/0197311 A1* 7/2017 Nicolas .................. B25J 9/1666
2020/0409376 A1* 12/2020 Ali ...................... A47L 11/4011

FOREIGN PATENT DOCUMENTS

JP 2011-528627 A 11/2011
JP 2011-253302 A 12/2011
JP 5160322 B2 3/2013
(Continued)

OTHER PUBLICATIONS

International Search Report and Written Opinion mailed on Mar. 15, 2022, received for PCT Application PCT/JP2021/048264, filed on Dec. 24, 2021, 8 pages including English Translation.

*Primary Examiner* — Rachid Bendidi
*Assistant Examiner* — Kirsten Jade M Santos
(74) *Attorney, Agent, or Firm* — XSENSUS LLP

(57) ABSTRACT

A map for determining a safe traveling route that does not collide with a performer or an object on a stage is generated, and an image capturing robot is caused to travel according to a route determined on the basis of the map. A potential map in which a traveling allowance area of the image capturing robot that moves on a stage and captures an image is defined is generated. A control circuitry acquires action schedule data of a performer, arrangement schedule data of an object on a stage, and control schedule data of a lighting on the stage, and generates, on the basis of the acquired data, a potential map in which an area that does not collide with a performer or an object and is inconspicuous by a lighting is defined as a travel allowance area.

15 Claims, 30 Drawing Sheets

(56) References Cited

FOREIGN PATENT DOCUMENTS

| | | | |
|---|---|---|---|
| JP | 2019509541 | A | 4/2019 |
| JP | 2020-087061 | A | 6/2020 |
| JP | 2020-150297 | A | 9/2020 |
| WO | 2021/230073 | A1 | 11/2021 |

* cited by examiner

11 LIGHTING
14 DECORATIVE OBJECT
12 SPEAKER
20 PERFORMER
13 MONITOR
10 STAGE
50 IMAGE CAPTURING ROBOT
30 AUDIENCE

14 DECORATIVE OBJECT
11 LIGHTING
20 PERFORMER
10 STAGE
12 SPEAKER
13 MONITOR
50 IMAGE CAPTURING ROBOT
30 AUDIENCE

FIG. 5

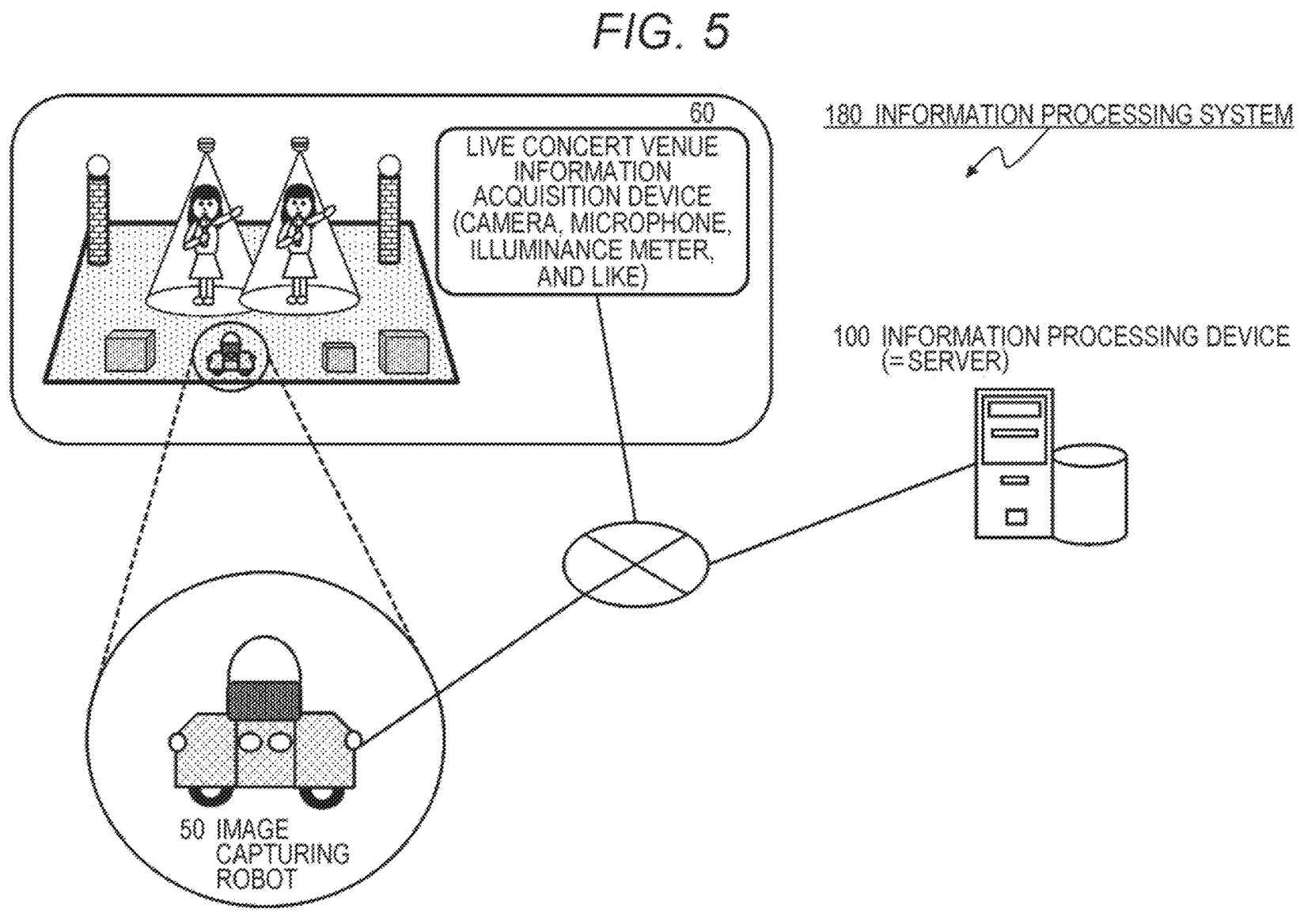

180 INFORMATION PROCESSING SYSTEM

60

LIVE CONCERT VENUE INFORMATION ACQUISITION DEVICE (CAMERA, MICROPHONE, ILLUMINANCE METER, AND LIKE)

100 INFORMATION PROCESSING DEVICE (=SERVER)

50 IMAGE CAPTURING ROBOT

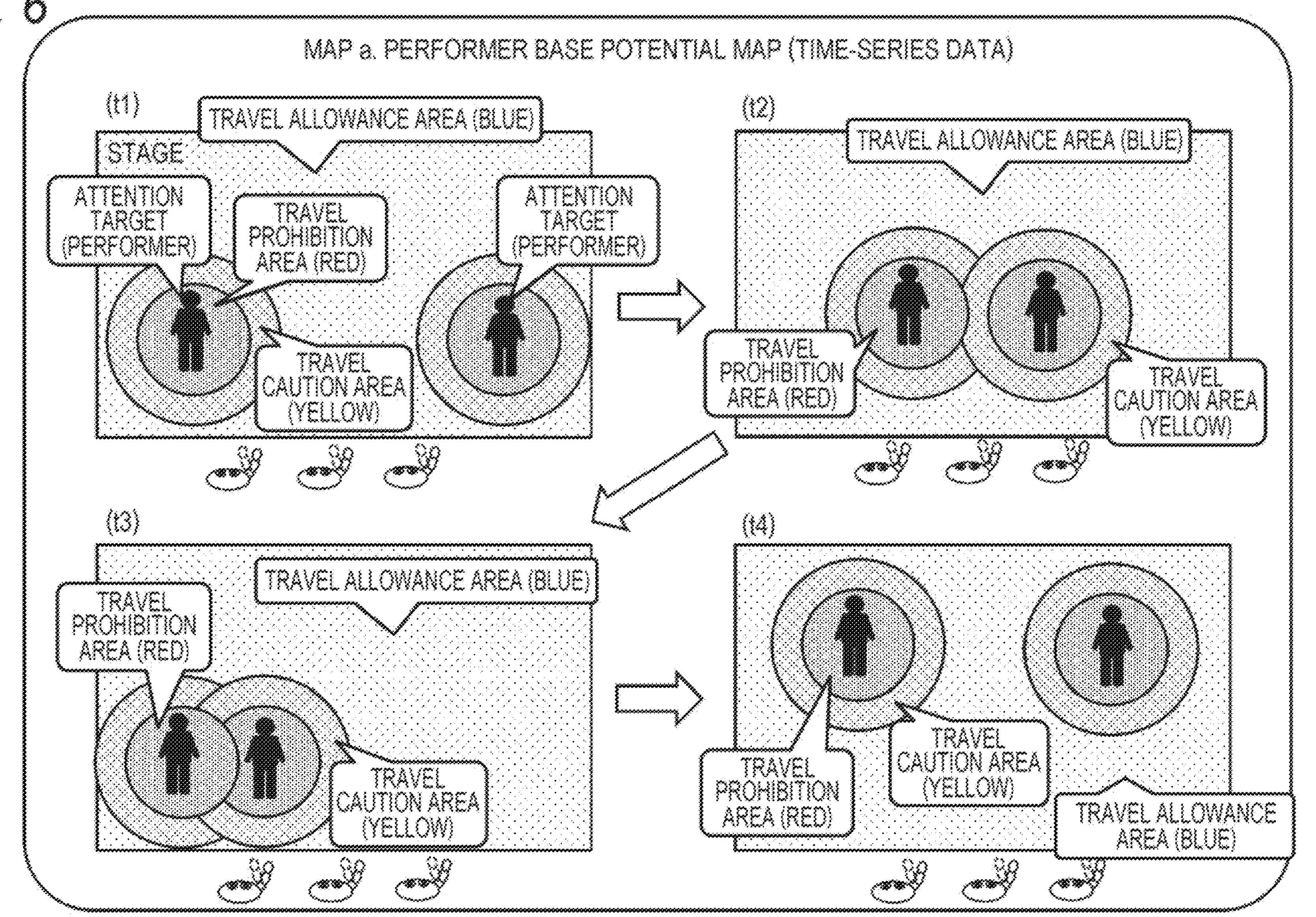
FIG. 6
MAP a. PERFORMER BASE POTENTIAL MAP (TIME-SERIES DATA)
(t1)
TRAVEL ALLOWANCE AREA (BLUE)
STAGE
ATTENTION TARGET (PERFORMER)
TRAVEL PROHIBITION AREA (RED)
ATTENTION TARGET (PERFORMER)
TRAVEL CAUTION AREA (YELLOW)
(t2)
TRAVEL ALLOWANCE AREA (BLUE)
TRAVEL PROHIBITION AREA (RED)
TRAVEL CAUTION AREA (YELLOW)
(t3)
TRAVEL ALLOWANCE AREA (BLUE)
TRAVEL PROHIBITION AREA (RED)
TRAVEL CAUTION AREA (YELLOW)
(t4)
TRAVEL CAUTION AREA (YELLOW)
TRAVEL PROHIBITION AREA (RED)
TRAVEL ALLOWANCE AREA (BLUE)

MAP b. LIGHTING BASE POTENTIAL MAP (TIME-SERIES DATA)
(t1)
TRAVEL ALLOWANCE AREA (BLUE)
STAGE
(t2)
TRAVEL CAUTION AREA (YELLOW)
TRAVEL PROHIBITION AREA (RED)
TRAVEL ALLOWANCE AREA (BLUE)
(t3)
TRAVEL CAUTION AREA (YELLOW)
TRAVEL ALLOWANCE AREA (BLUE)
TRAVEL PROHIBITION AREA (RED)
(t4)
TRAVEL CAUTION AREA (YELLOW)
TRAVEL PROHIBITION AREA (RED)
TRAVEL ALLOWANCE AREA (BLUE)

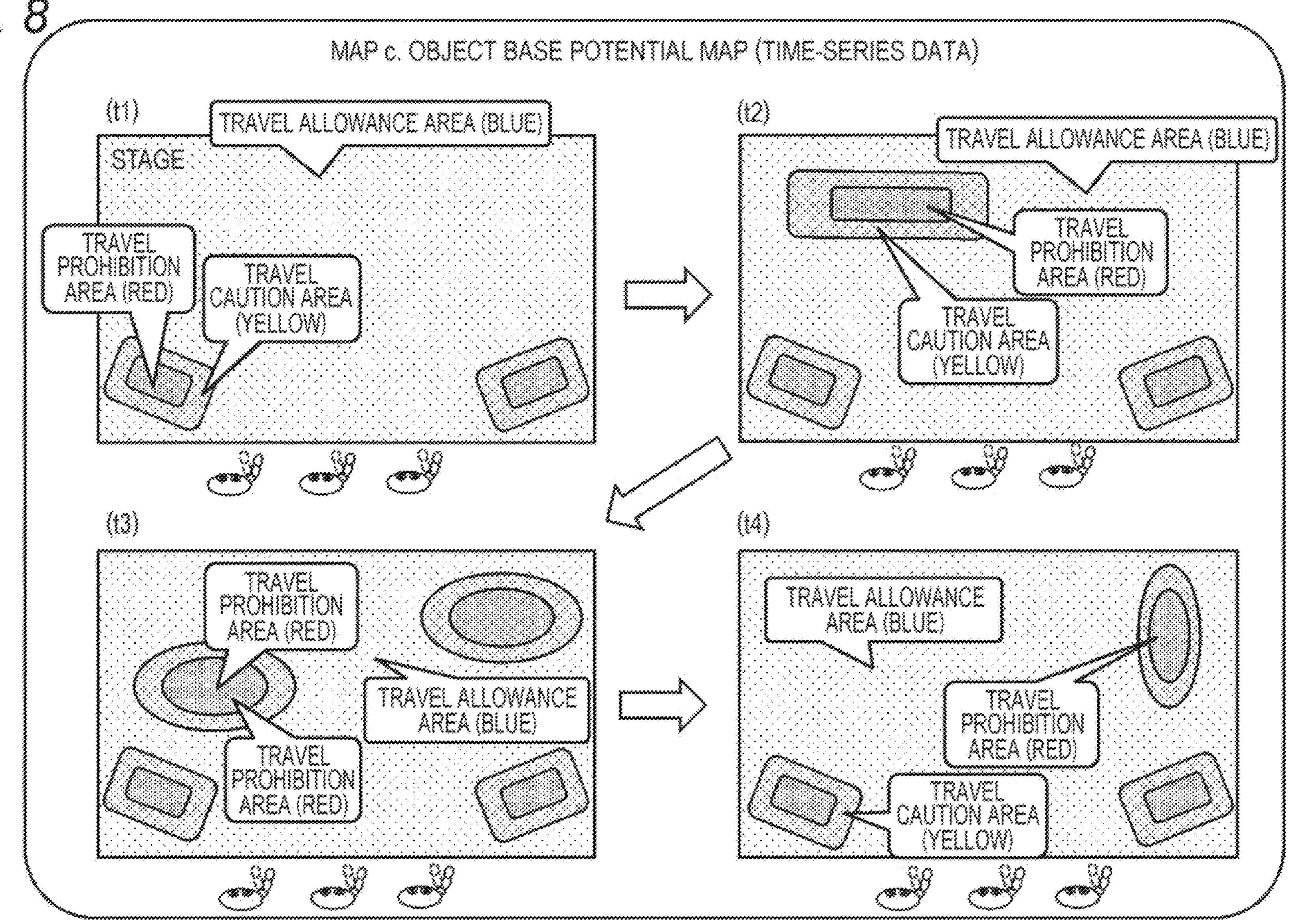
FIG. 8
MAP c. OBJECT BASE POTENTIAL MAP (TIME-SERIES DATA)
(t1)
TRAVEL ALLOWANCE AREA (BLUE)
STAGE
TRAVEL PROHIBITION AREA (RED)
TRAVEL CAUTION AREA (YELLOW)
(t2)
TRAVEL ALLOWANCE AREA (BLUE)
TRAVEL PROHIBITION AREA (RED)
TRAVEL CAUTION AREA (YELLOW)
(t3)
TRAVEL PROHIBITION AREA (RED)
TRAVEL ALLOWANCE AREA (BLUE)
TRAVEL PROHIBITION AREA (RED)
(t4)
TRAVEL ALLOWANCE AREA (BLUE)
TRAVEL PROHIBITION AREA (RED)
TRAVEL CAUTION AREA (YELLOW)

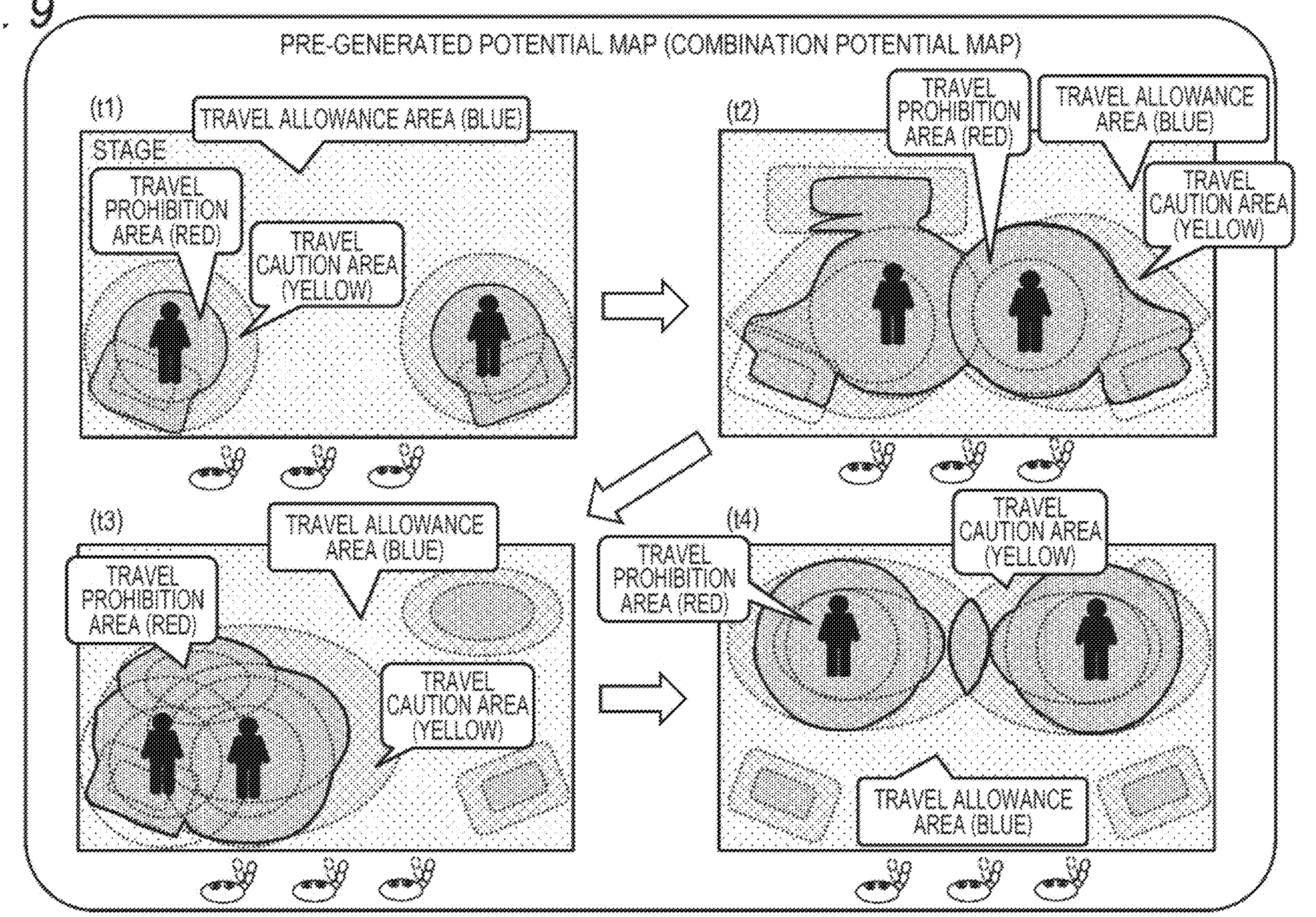
FIG. 9
PRE-GENERATED POTENTIAL MAP (COMBINATION POTENTIAL MAP)
(t1)
TRAVEL ALLOWANCE AREA (BLUE)
STAGE
TRAVEL PROHIBITION AREA (RED)
TRAVEL CAUTION AREA (YELLOW)
(t2)
TRAVEL PROHIBITION AREA (RED)
TRAVEL ALLOWANCE AREA (BLUE)
TRAVEL CAUTION AREA (YELLOW)
(t3)
TRAVEL ALLOWANCE AREA (BLUE)
TRAVEL PROHIBITION AREA (RED)
TRAVEL CAUTION AREA (YELLOW)
(t4)
TRAVEL CAUTION AREA (YELLOW)
TRAVEL PROHIBITION AREA (RED)
TRAVEL ALLOWANCE AREA (BLUE)

100 INFORMATION PROCESSING DEVICE
150
PRE-GENERATED POTENTIAL MAP
160
TRAVELING ROUTE GENERATION UNIT
165
TRAVELING ROUTE INFORMATION
170
TRAVEL CONTROL UNIT
50 IMAGE CAPTURING ROBOT

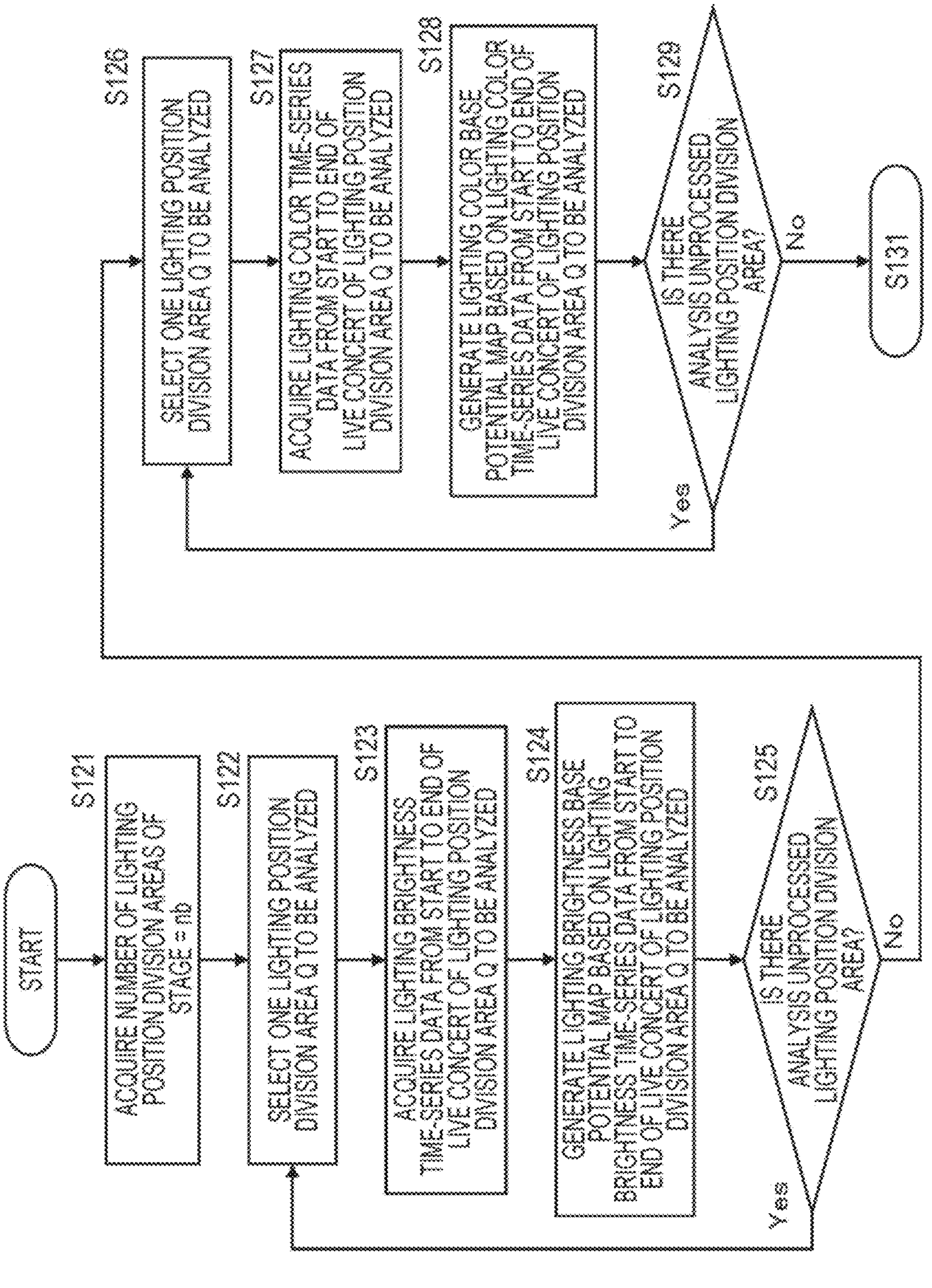
FIG. 13
START
S121
ACQUIRE NUMBER OF LIGHTING POSITION DIVISION AREAS OF STAGE = nb
S122
SELECT ONE LIGHTING POSITION DIVISION AREA Q TO BE ANALYZED
S123
ACQUIRE LIGHTING BRIGHTNESS TIME-SERIES DATA FROM START TO END OF LIVE CONCERT OF LIGHTING POSITION DIVISION AREA Q TO BE ANALYZED
S124
GENERATE LIGHTING BRIGHTNESS BASE POTENTIAL MAP BASED ON LIGHTING BRIGHTNESS TIME-SERIES DATA FROM START TO END OF LIVE CONCERT OF LIGHTING POSITION DIVISION AREA Q TO BE ANALYZED
S125
IS THERE ANALYSIS UNPROCESSED LIGHTING POSITION DIVISION AREA?
Yes
No
S126
SELECT ONE LIGHTING POSITION DIVISION AREA Q TO BE ANALYZED
S127
ACQUIRE LIGHTING COLOR TIME-SERIES DATA FROM START TO END OF LIVE CONCERT OF LIGHTING POSITION DIVISION AREA Q TO BE ANALYZED
S128
GENERATE LIGHTING COLOR BASE POTENTIAL MAP BASED ON LIGHTING COLOR TIME-SERIES DATA FROM START TO END OF LIVE CONCERT OF LIGHTING POSITION DIVISION AREA Q TO BE ANALYZED
S129
IS THERE ANALYSIS UNPROCESSED LIGHTING POSITION DIVISION AREA?
Yes
No
S131

FIG. 16

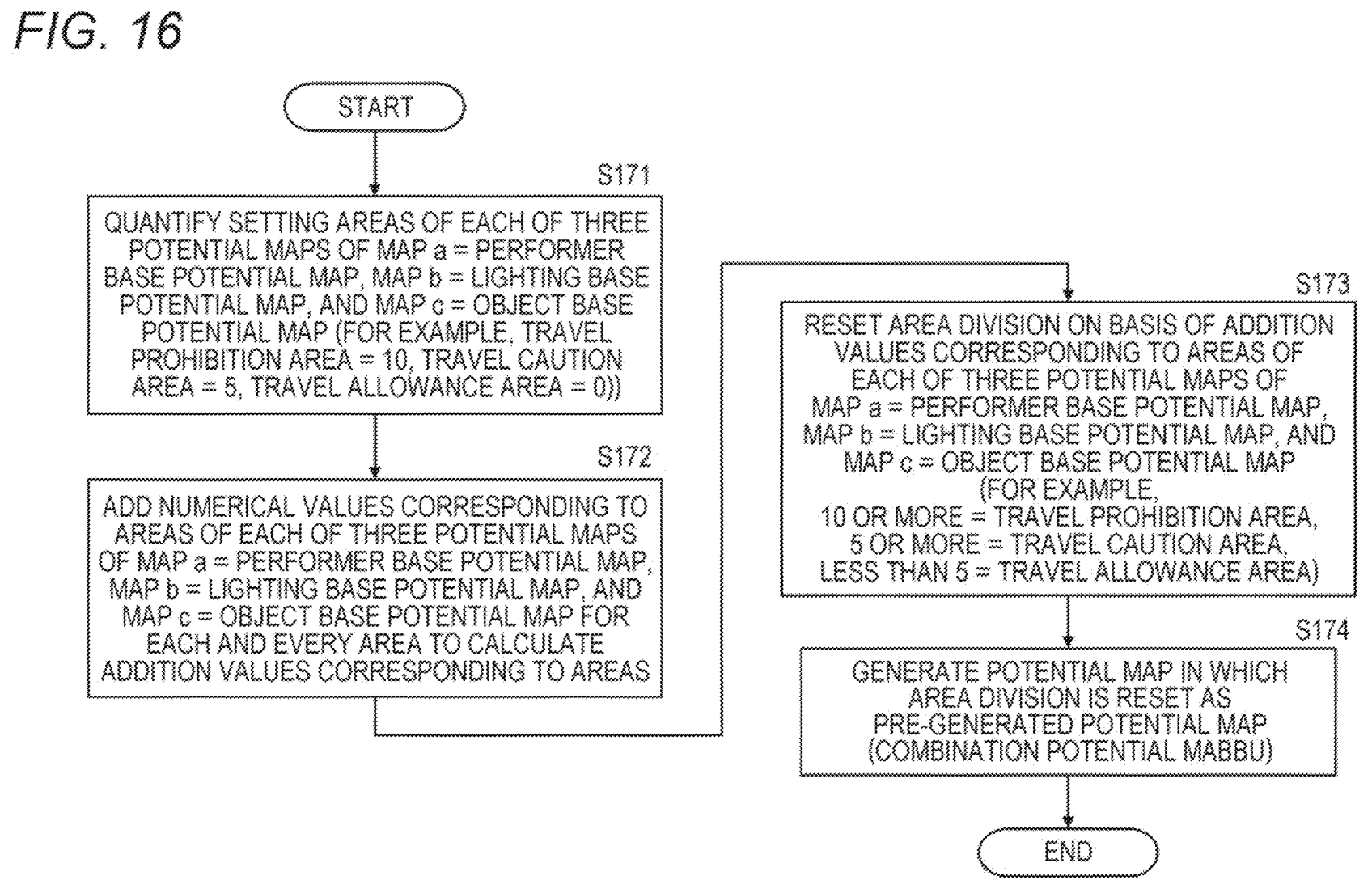

START

S171
QUANTIFY SETTING AREAS OF EACH OF THREE POTENTIAL MAPS OF MAP a = PERFORMER BASE POTENTIAL MAP, MAP b = LIGHTING BASE POTENTIAL MAP, AND MAP c = OBJECT BASE POTENTIAL MAP (FOR EXAMPLE, TRAVEL PROHIBITION AREA = 10, TRAVEL CAUTION AREA = 5, TRAVEL ALLOWANCE AREA = 0))

S172
ADD NUMERICAL VALUES CORRESPONDING TO AREAS OF EACH OF THREE POTENTIAL MAPS OF MAP a = PERFORMER BASE POTENTIAL MAP, MAP b = LIGHTING BASE POTENTIAL MAP, AND MAP c = OBJECT BASE POTENTIAL MAP FOR EACH AND EVERY AREA TO CALCULATE ADDITION VALUES CORRESPONDING TO AREAS

S173
RESET AREA DIVISION ON BASIS OF ADDITION VALUES CORRESPONDING TO AREAS OF EACH OF THREE POTENTIAL MAPS OF MAP a = PERFORMER BASE POTENTIAL MAP, MAP b = LIGHTING BASE POTENTIAL MAP, AND MAP c = OBJECT BASE POTENTIAL MAP (FOR EXAMPLE, 10 OR MORE = TRAVEL PROHIBITION AREA, 5 OR MORE = TRAVEL CAUTION AREA, LESS THAN 5 = TRAVEL ALLOWANCE AREA)

S174
GENERATE POTENTIAL MAP IN WHICH AREA DIVISION IS RESET AS PRE-GENERATED POTENTIAL MAP (COMBINATION POTENTIAL MABBU)

END

14 DECORATIVE OBJECT
11 LIGHTING
20 PERFORMER
12 SPEAKER
13 MONITOR
10 STAGE
31 TV CAMERA
35 PRIORITY AUDIENCE
50 IMAGE CAPTURING ROBOT
30 AUDIENCE

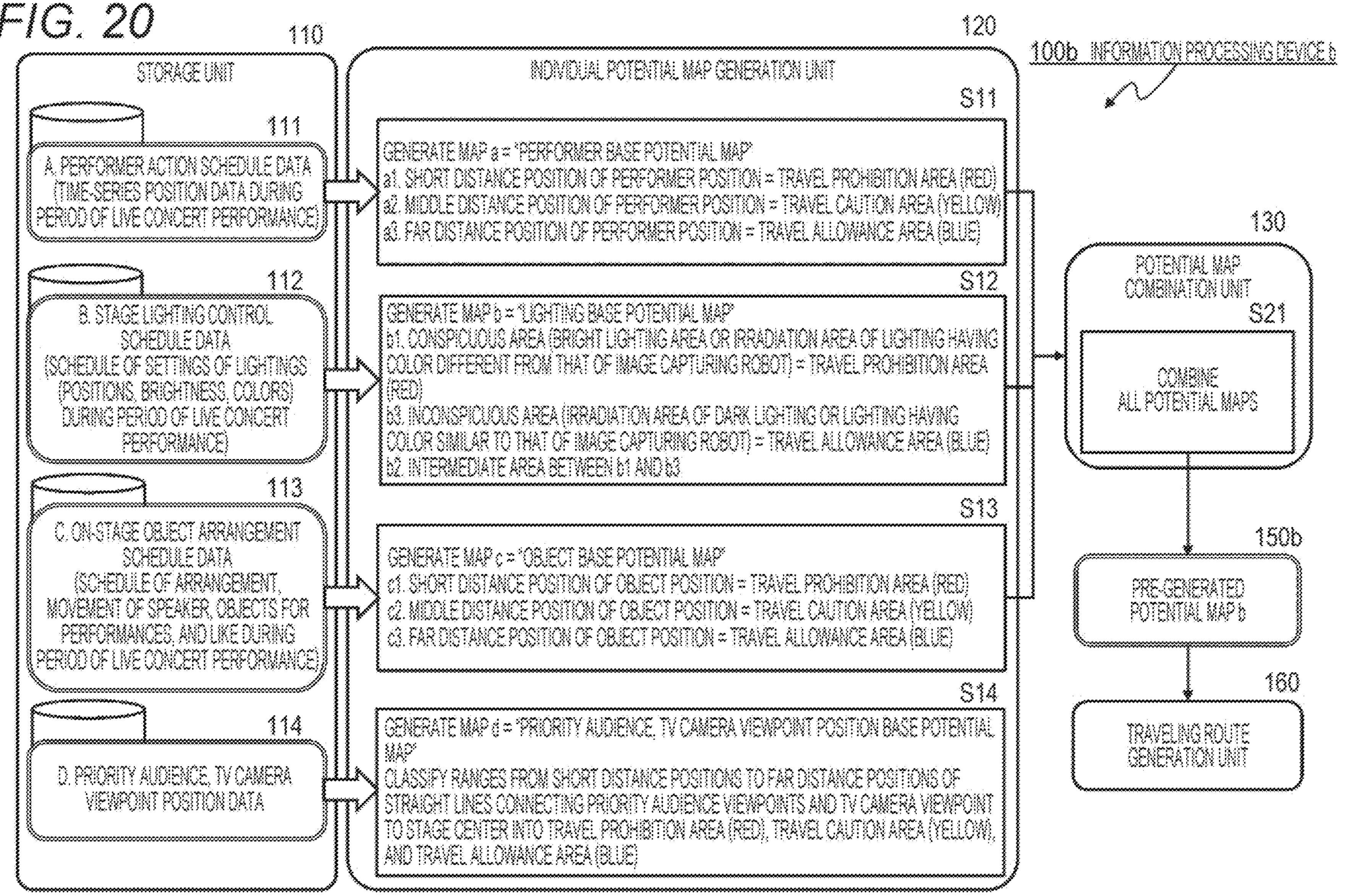
FIG. 20
100b INFORMATION PROCESSING DEVICE b
110
STORAGE UNIT
111
A. PERFORMER ACTION SCHEDULE DATA (TIME-SERIES POSITION DATA DURING PERIOD OF LIVE CONCERT PERFORMANCE)
112
B. STAGE LIGHTING CONTROL SCHEDULE DATA (SCHEDULE OF SETTINGS OF LIGHTINGS (POSITIONS, BRIGHTNESS, COLORS) DURING PERIOD OF LIVE CONCERT PERFORMANCE)
113
C. ON-STAGE OBJECT ARRANGEMENT SCHEDULE DATA (SCHEDULE OF ARRANGEMENT, MOVEMENT OF SPEAKER, OBJECTS FOR PERFORMANCES, AND LIKE DURING PERIOD OF LIVE CONCERT PERFORMANCE)
114
D. PRIORITY AUDIENCE, TV CAMERA VIEWPOINT POSITION DATA
120
INDIVIDUAL POTENTIAL MAP GENERATION UNIT
S11
GENERATE MAP a = "PERFORMER BASE POTENTIAL MAP"
a1. SHORT DISTANCE POSITION OF PERFORMER POSITION = TRAVEL PROHIBITION AREA (RED)
a2. MIDDLE DISTANCE POSITION OF PERFORMER POSITION = TRAVEL CAUTION AREA (YELLOW)
a3. FAR DISTANCE POSITION OF PERFORMER POSITION = TRAVEL ALLOWANCE AREA (BLUE)
S12
GENERATE MAP b = "LIGHTING BASE POTENTIAL MAP"
b1. CONSPICUOUS AREA (BRIGHT LIGHTING AREA OR IRRADIATION AREA OF LIGHTING HAVING COLOR DIFFERENT FROM THAT OF IMAGE CAPTURING ROBOT) = TRAVEL PROHIBITION AREA (RED)
b3. INCONSPICUOUS AREA (IRRADIATION AREA OF DARK LIGHTING OR LIGHTING HAVING COLOR SIMILAR TO THAT OF IMAGE CAPTURING ROBOT) = TRAVEL ALLOWANCE AREA (BLUE)
b2. INTERMEDIATE AREA BETWEEN b1 AND b3
S13
GENERATE MAP c = "OBJECT BASE POTENTIAL MAP"
c1. SHORT DISTANCE POSITION OF OBJECT POSITION = TRAVEL PROHIBITION AREA (RED)
c2. MIDDLE DISTANCE POSITION OF OBJECT POSITION = TRAVEL CAUTION AREA (YELLOW)
c3. FAR DISTANCE POSITION OF OBJECT POSITION = TRAVEL ALLOWANCE AREA (BLUE)
S14
GENERATE MAP d = "PRIORITY AUDIENCE, TV CAMERA VIEWPOINT POSITION BASE POTENTIAL MAP"
CLASSIFY RANGES FROM SHORT DISTANCE POSITIONS TO FAR DISTANCE POSITIONS OF STRAIGHT LINES CONNECTING PRIORITY AUDIENCE VIEWPOINTS AND TV CAMERA VIEWPOINT TO STAGE CENTER INTO TRAVEL PROHIBITION AREA (RED), TRAVEL CAUTION AREA (YELLOW), AND TRAVEL ALLOWANCE AREA (BLUE)
130
POTENTIAL MAP COMBINATION UNIT
S21
COMBINE ALL POTENTIAL MAPS
150b
PRE-GENERATED POTENTIAL MAP b
160
TRAVELING ROUTE GENERATION UNIT

FIG. 21

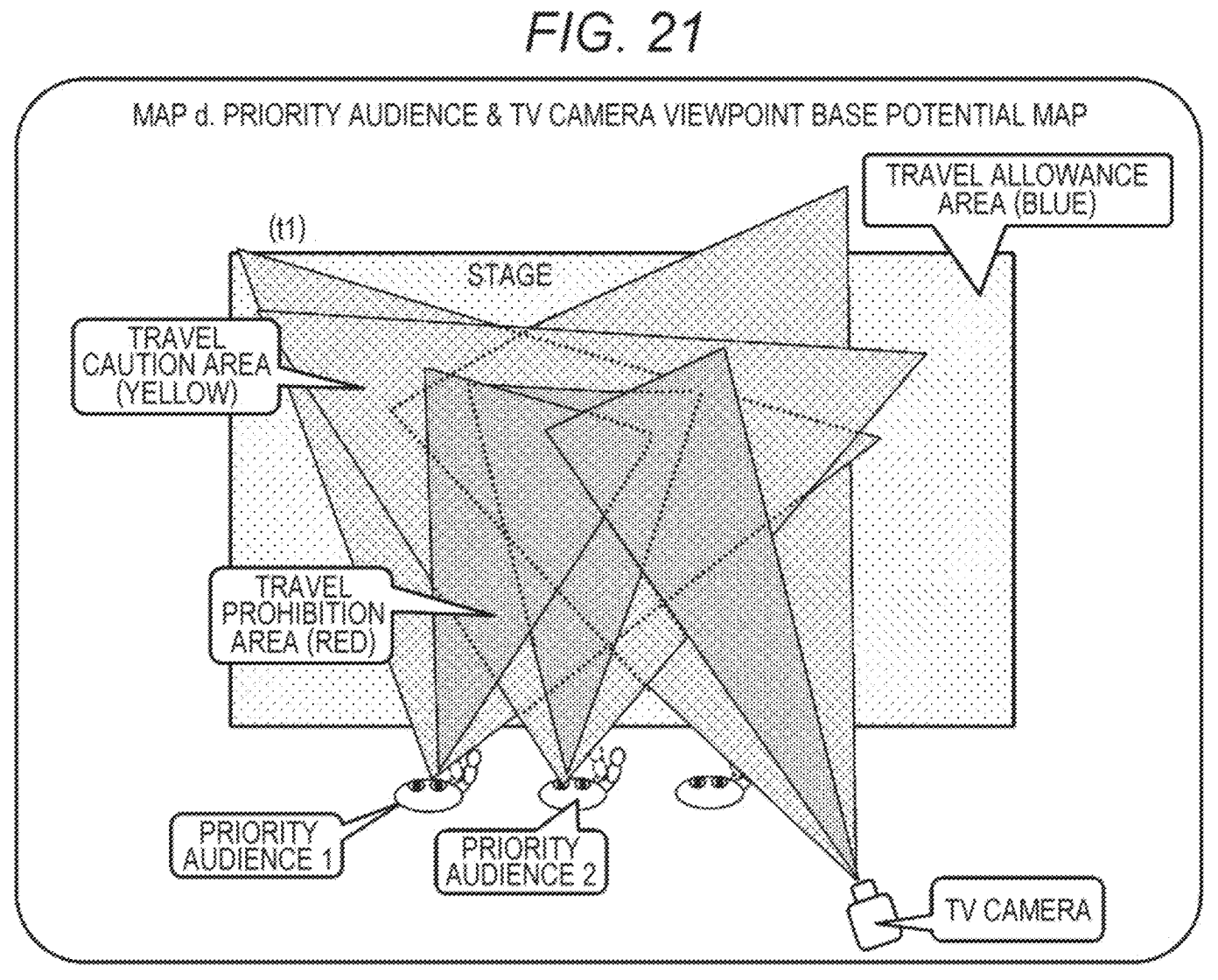

MAP d. PRIORITY AUDIENCE & TV CAMERA VIEWPOINT BASE POTENTIAL MAP

TRAVEL ALLOWANCE AREA (BLUE)

TV CAMERA

STAGE (t1)

TRAVEL CAUTION AREA (YELLOW)

TRAVEL PROHIBITION AREA (RED)

PRIORITY AUDIENCE 1

PRIORITY AUDIENCE 2

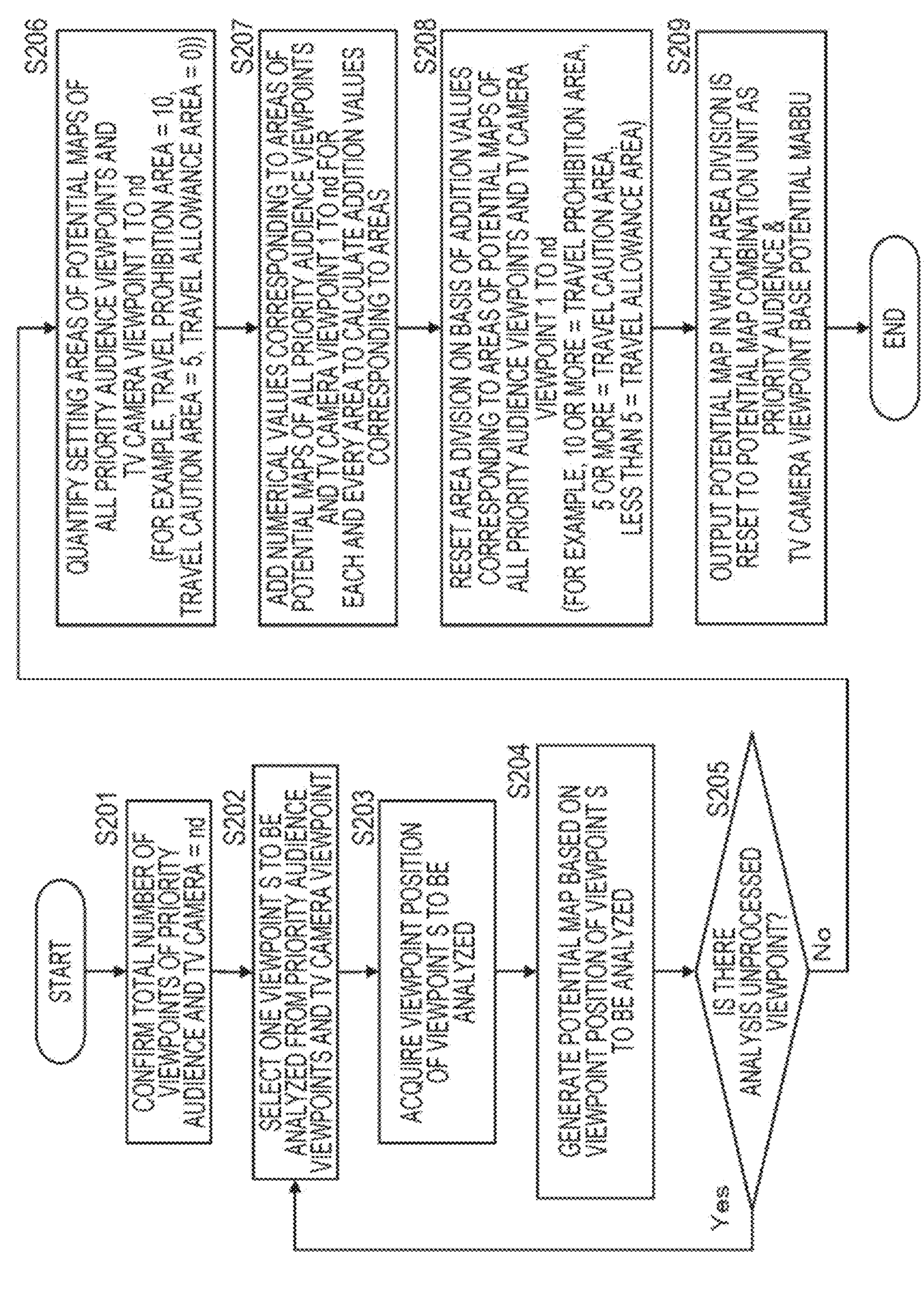
FIG. 22
START
S201
CONFIRM TOTAL NUMBER OF VIEWPOINTS OF PRIORITY AUDIENCE AND TV CAMERA = nd
S202
SELECT ONE VIEWPOINT S TO BE ANALYZED FROM PRIORITY AUDIENCE VIEWPOINTS AND TV CAMERA VIEWPOINT
S203
ACQUIRE VIEWPOINT POSITION OF VIEWPOINT S TO BE ANALYZED
S204
GENERATE POTENTIAL MAP BASED ON VIEWPOINT POSITION OF VIEWPOINT S TO BE ANALYZED
S205
IS THERE ANALYSIS UNPROCESSED VIEWPOINT?
Yes
No
S206
QUANTIFY SETTING AREAS OF POTENTIAL MAPS OF ALL PRIORITY AUDIENCE VIEWPOINTS AND TV CAMERA VIEWPOINT 1 TO nd
(FOR EXAMPLE, TRAVEL PROHIBITION AREA = 10, TRAVEL CAUTION AREA = 5, TRAVEL ALLOWANCE AREA = 0))
S207
ADD NUMERICAL VALUES CORRESPONDING TO AREAS OF POTENTIAL MAPS OF ALL PRIORITY AUDIENCE VIEWPOINTS AND TV CAMERA VIEWPOINT 1 TO nd FOR EACH AND EVERY AREA TO CALCULATE ADDITION VALUES CORRESPONDING TO AREAS
S208
RESET AREA DIVISION ON BASIS OF ADDITION VALUES CORRESPONDING TO AREAS OF POTENTIAL MAPS OF ALL PRIORITY AUDIENCE VIEWPOINTS AND TV CAMERA VIEWPOINT 1 TO nd
(FOR EXAMPLE, 10 OR MORE = TRAVEL PROHIBITION AREA, 5 OR MORE = TRAVEL CAUTION AREA, LESS THAN 5 = TRAVEL ALLOWANCE AREA)
S209
OUTPUT POTENTIAL MAP IN WHICH AREA DIVISION IS RESET TO POTENTIAL MAP COMBINATION UNIT AS PRIORITY AUDIENCE & TV CAMERA VIEWPOINT BASE POTENTIAL MAPBU
END

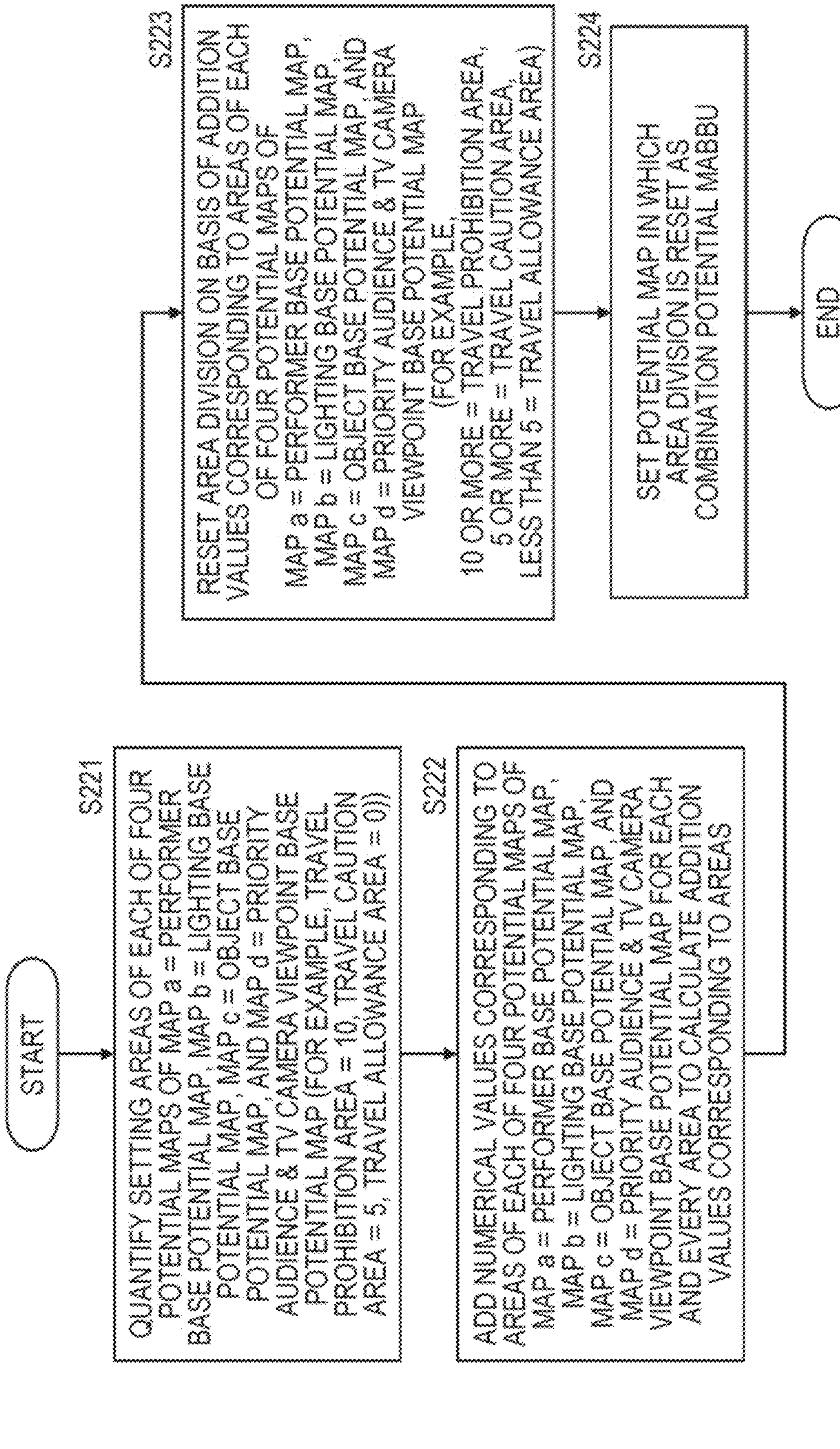
FIG. 23
START
QUANTIFY SETTING AREAS OF EACH OF FOUR POTENTIAL MAPS OF MAP a = PERFORMER BASE POTENTIAL MAP, MAP b = LIGHTING BASE POTENTIAL MAP, MAP c = OBJECT BASE POTENTIAL MAP, AND MAP d = PRIORITY AUDIENCE & TV CAMERA VIEWPOINT BASE POTENTIAL MAP (FOR EXAMPLE, TRAVEL PROHIBITION AREA = 10, TRAVEL CAUTION AREA = 5, TRAVEL ALLOWANCE AREA = 0))
S221
ADD NUMERICAL VALUES CORRESPONDING TO AREAS OF EACH OF FOUR POTENTIAL MAPS OF MAP a = PERFORMER BASE POTENTIAL MAP, MAP b = LIGHTING BASE POTENTIAL MAP, MAP c = OBJECT BASE POTENTIAL MAP, AND MAP d = PRIORITY AUDIENCE & TV CAMERA VIEWPOINT BASE POTENTIAL MAP FOR EACH AND EVERY AREA TO CALCULATE ADDITION VALUES CORRESPONDING TO AREAS
S222
RESET AREA DIVISION ON BASIS OF ADDITION VALUES CORRESPONDING TO AREAS OF EACH OF FOUR POTENTIAL MAPS OF MAP a = PERFORMER BASE POTENTIAL MAP, MAP b = LIGHTING BASE POTENTIAL MAP, MAP c = OBJECT BASE POTENTIAL MAP, AND MAP d = PRIORITY AUDIENCE & TV CAMERA VIEWPOINT BASE POTENTIAL MAP (FOR EXAMPLE, 10 OR MORE = TRAVEL PROHIBITION AREA, 5 OR MORE = TRAVEL CAUTION AREA, LESS THAN 5 = TRAVEL ALLOWANCE AREA)
S223
SET POTENTIAL MAP IN WHICH AREA DIVISION IS RESET AS COMBINATION POTENTIAL MABBU
S224
END

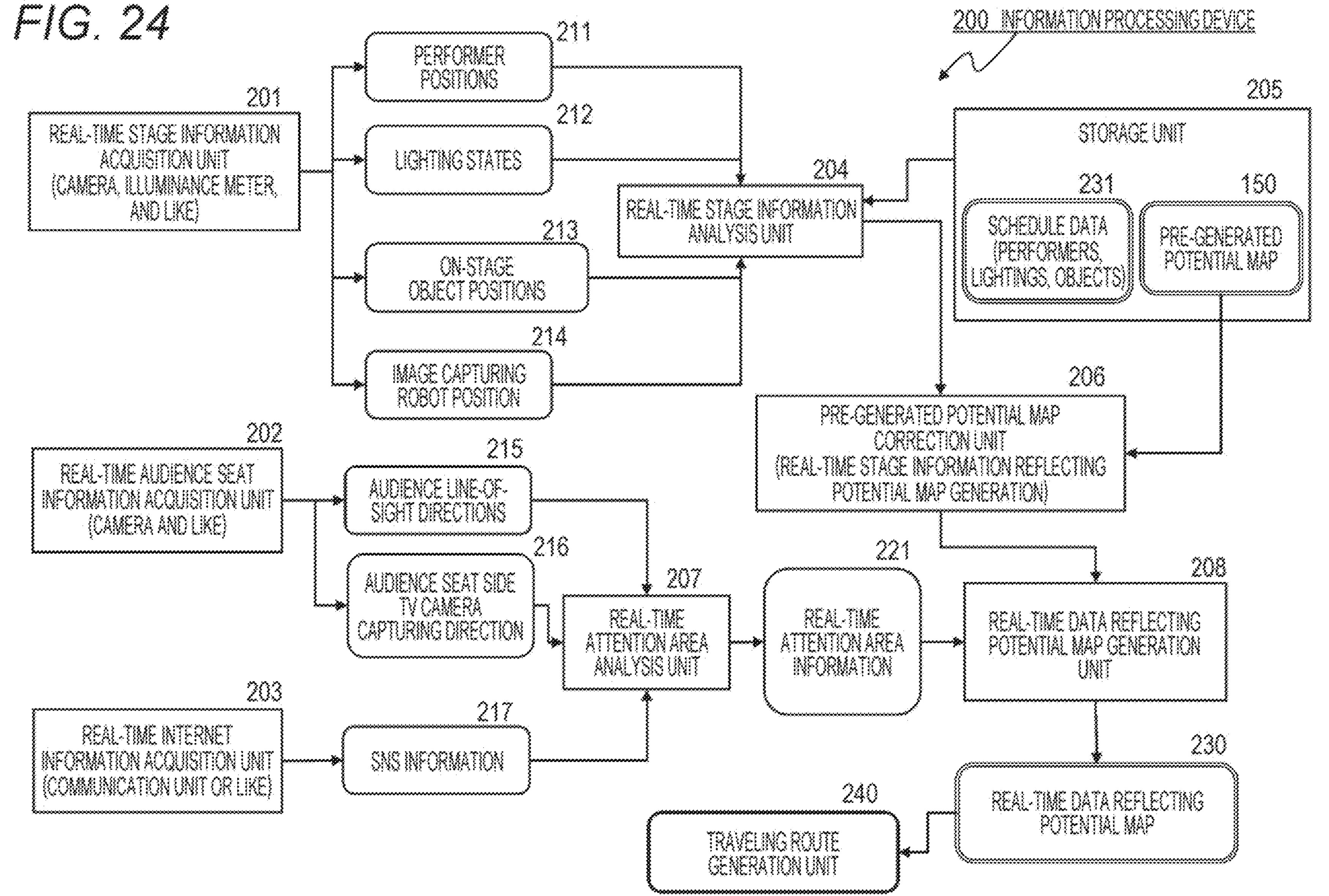
FIG. 24
200 INFORMATION PROCESSING DEVICE
201
REAL-TIME STAGE INFORMATION ACQUISITION UNIT (CAMERA, ILLUMINANCE METER, AND LIKE)
211
PERFORMER POSITIONS
212
LIGHTING STATES
213
ON-STAGE OBJECT POSITIONS
214
IMAGE CAPTURING ROBOT POSITION
204
REAL-TIME STAGE INFORMATION ANALYSIS UNIT
205
STORAGE UNIT
231
SCHEDULE DATA (PERFORMERS, LIGHTINGS, OBJECTS)
150
PRE-GENERATED POTENTIAL MAP
206
PRE-GENERATED POTENTIAL MAP CORRECTION UNIT (REAL-TIME STAGE INFORMATION REFLECTING POTENTIAL MAP GENERATION)
202
REAL-TIME AUDIENCE SEAT INFORMATION ACQUISITION UNIT (CAMERA AND LIKE)
215
AUDIENCE LINE-OF-SIGHT DIRECTIONS
216
AUDIENCE SEAT SIDE TV CAMERA CAPTURING DIRECTION
207
REAL-TIME ATTENTION AREA ANALYSIS UNIT
221
REAL-TIME ATTENTION AREA INFORMATION
208
REAL-TIME DATA REFLECTING POTENTIAL MAP GENERATION UNIT
203
REAL-TIME INTERNET INFORMATION ACQUISITION UNIT (COMMUNICATION UNIT OR LIKE)
217
SNS INFORMATION
230
REAL-TIME DATA REFLECTING POTENTIAL MAP
240
TRAVELING ROUTE GENERATION UNIT

FIG. 25

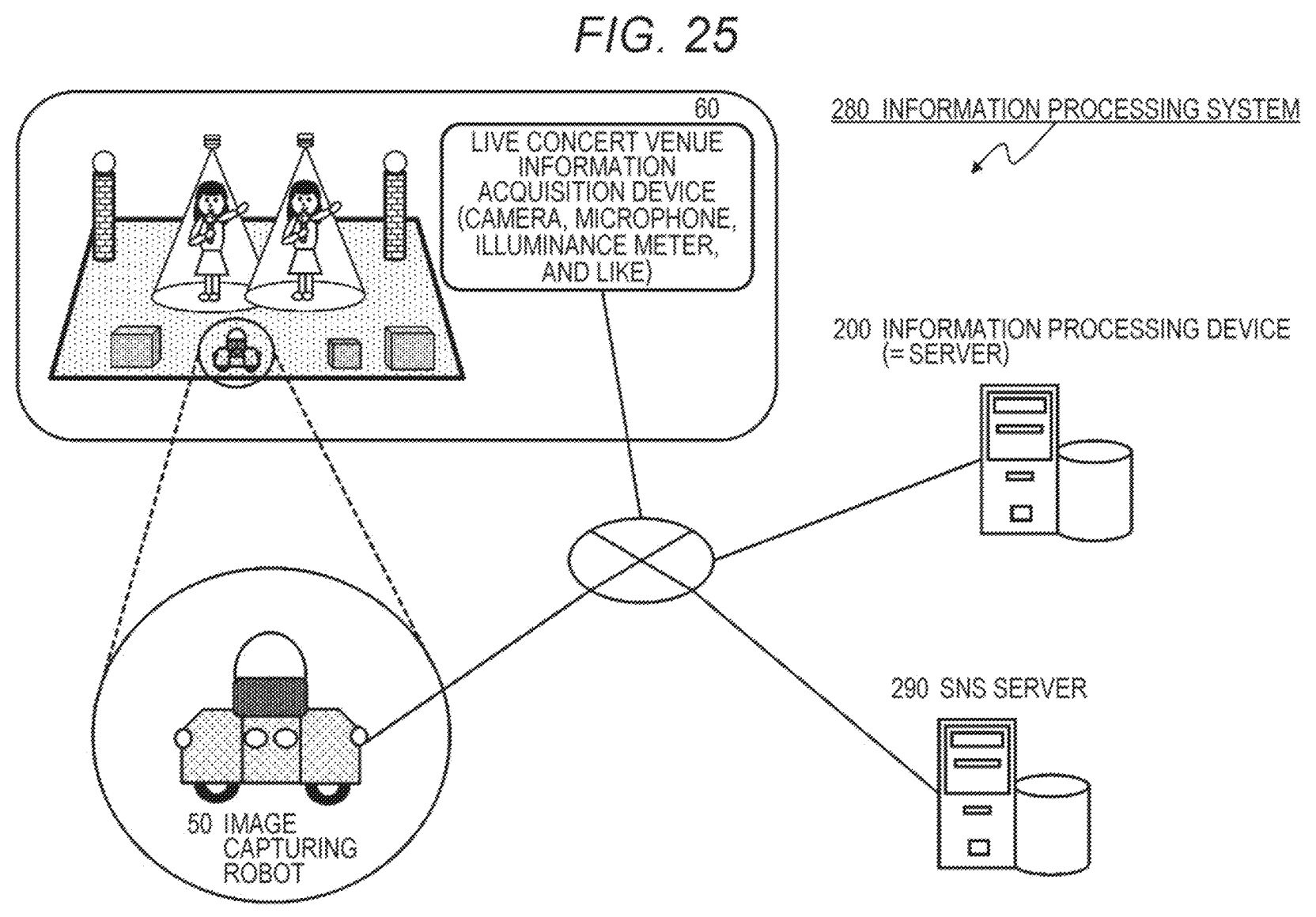

280 INFORMATION PROCESSING SYSTEM

200 INFORMATION PROCESSING DEVICE (= SERVER)

290 SNS SERVER

60

LIVE CONCERT VENUE INFORMATION ACQUISITION DEVICE (CAMERA, MICROPHONE, ILLUMINANCE METER, AND LIKE)

50 IMAGE CAPTURING ROBOT (1) PRE-GENERATED POTENTIAL MAP
TRAVEL PROHIBITION AREA (RED)
TRAVEL CAUTION AREA (YELLOW)
TRAVEL ALLOWANCE AREA (BLUE)
(2) REAL-TIME STAGE INFORMATION REFLECTING POTENTIAL MAP
TRAVEL PROHIBITION AREA (RED)
TRAVEL CAUTION AREA (YELLOW)
TRAVEL ALLOWANCE AREA (BLUE)

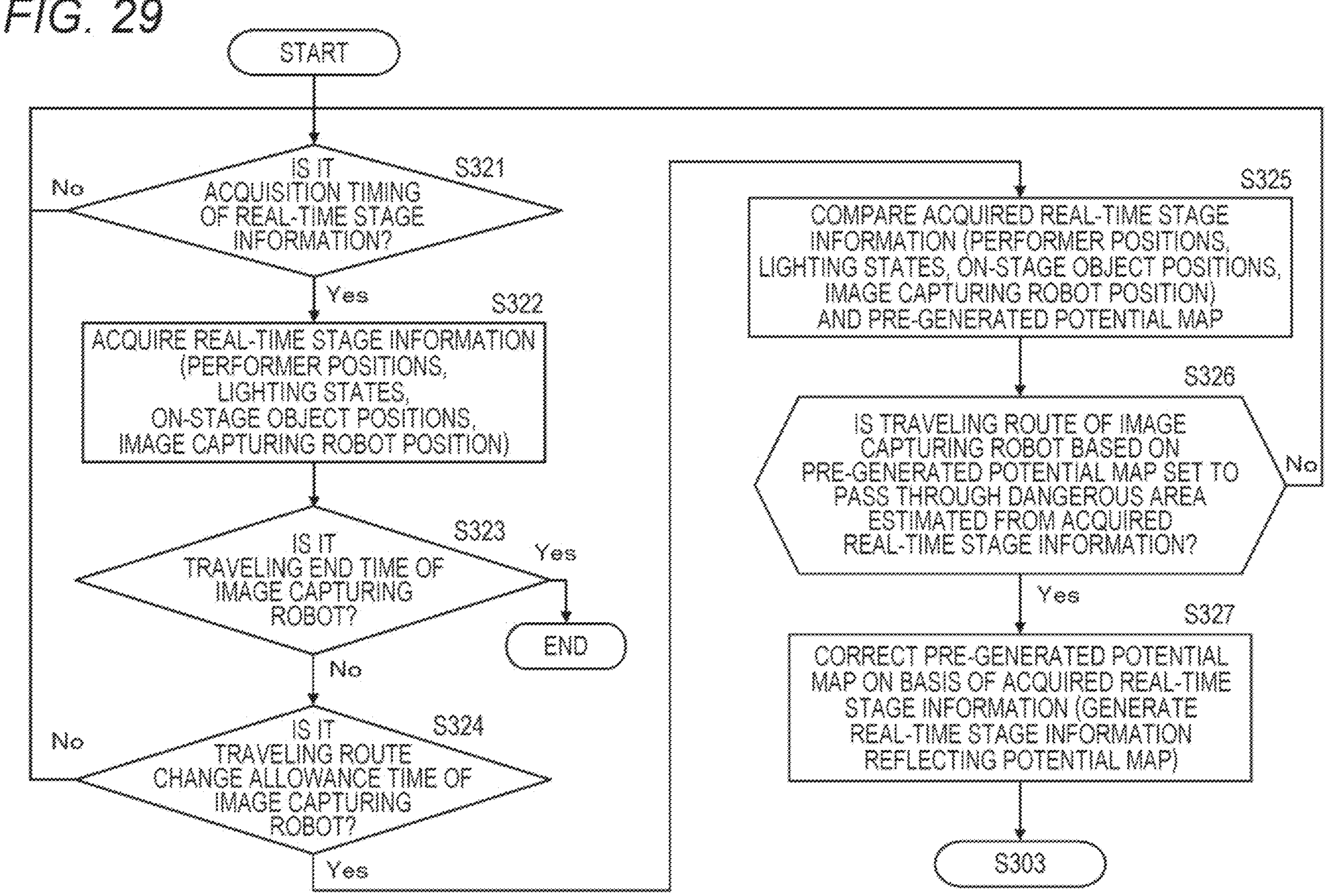
FIG. 29
START
S321
IS IT ACQUISITION TIMING OF REAL-TIME STAGE INFORMATION?
No
Yes
S322
ACQUIRE REAL-TIME STAGE INFORMATION (PERFORMER POSITIONS, LIGHTING STATES, ON-STAGE OBJECT POSITIONS, IMAGE CAPTURING ROBOT POSITION)
S323
IS IT TRAVELING END TIME OF IMAGE CAPTURING ROBOT?
Yes
END
No
S324
IS IT TRAVELING ROUTE CHANGE ALLOWANCE TIME OF IMAGE CAPTURING ROBOT?
No
Yes
S325
COMPARE ACQUIRED REAL-TIME STAGE INFORMATION (PERFORMER POSITIONS, LIGHTING STATES, ON-STAGE OBJECT POSITIONS, IMAGE CAPTURING ROBOT POSITION) AND PRE-GENERATED POTENTIAL MAP
S326
IS TRAVELING ROUTE OF IMAGE CAPTURING ROBOT BASED ON PRE-GENERATED POTENTIAL MAP SET TO PASS THROUGH DANGEROUS AREA ESTIMATED FROM ACQUIRED REAL-TIME STAGE INFORMATION?
No
Yes
S327
CORRECT PRE-GENERATED POTENTIAL MAP ON BASIS OF ACQUIRED REAL-TIME STAGE INFORMATION (GENERATE REAL-TIME STAGE INFORMATION REFLECTING POTENTIAL MAP)
S303

FIG. 30

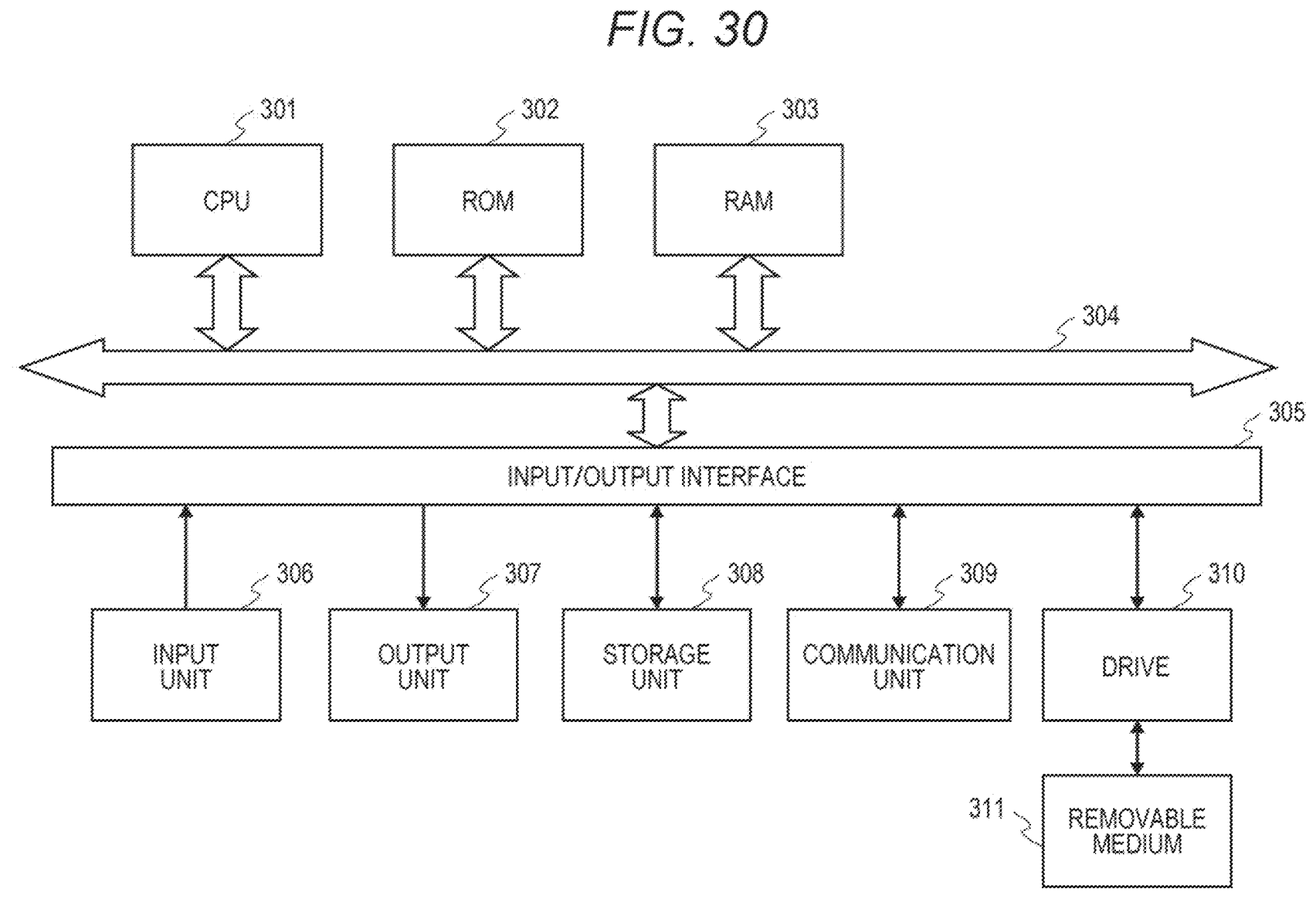

301 CPU
302 ROM
303 RAM
304
305 INPUT/OUTPUT INTERFACE
306 INPUT UNIT
307 OUTPUT UNIT
308 STORAGE UNIT
309 COMMUNICATION UNIT
310 DRIVE
311 REMOVABLE MEDIUM

INFORMATION PROCESSING DEVICE, MOBILE DEVICE, AND INFORMATION PROCESSING SYSTEM

CROSS-REFERENCE TO RELATED APPLICATIONS

The present application is based on PCT filing PCT/JP2021/048264, filed Dec. 24, 2021, which claims priority to Japanese Application No. 2021-008183, filed Jan. 21, 2021, the entire contents of each are incorporated herein by reference.

TECHNICAL FIELD

The present disclosure relates to an information processing device, a mobile device, and an information processing system. More specifically, the present disclosure relates to an information processing device, a mobile device, and an information processing system that generate a map in which a route that does not collide with a performer, an object such as a speaker on a stage or the like and does not disturb the line-of-sight of an audience is set, and perform movement control according to the map in a configuration in which a performance of a song of a performer performed on a stage is captured by a camera mounted on the mobile device (automated traveling robot) that moves on the stage.

BACKGROUND ART

In a case where various performances performed on a stage such as music live concerts are performed, processing of capturing images of a performance performed on the stage using a mobile camera traveling on the same stage may be performed.

In a case where such image capturing is performed, the camera is attached to a mobile device (carriage), for example, such as an automated traveling robot and moves to various positions on the stage to capture images from various angles. In this case, the camera needs to select and move along a traveling route that does not collide with the performer moving around on the stage or equipment such as a microphone, a speaker, and the like installed on the stage.

Furthermore, performing movement so as not to disturb the line-of-sight of the audience in front of or around the stage is also required.

Note that, as conventional technologies that disclose movement control of a mobile device such as a robot or the like, for example, Patent Document 1 (Japanese Patent Application Laid-Open No. 2020-087061), Patent Document 2 (Japanese Patent No. 5160322), and the like are disclosed.

Patent Document 1 discloses an unmanned mobile body that monitors a person so as not to disturb the person to be monitored. Specifically, an area in which the mobile body is hardly sensed by a sensory organ of the person to be monitored is determined, and monitoring is performed from the determined area.

Furthermore, Patent Document 2 discloses a robot device that follows a certain object, and discloses a configuration in which tracking processing can be continued even in a case where an obstacle enters between the tracking target and the robot and the robot is to lose the tracking target.

Patent Document 1 described above discloses a configuration in which an area that is difficult to be sensed by a person to be monitored is selected and monitoring is performed from the selected position, and Patent Document 2 described above discloses a configuration for continuing tracking in a case where an obstacle appears between a robot and a tracking target, and each patent document only discloses a configuration for implementing a specific purpose.

On the other hand, in a case where a performer moving on a stage is captured by a camera moving on the same stage, the position of the camera needs to be determined according to various situations including the moving position of the performer, the equipment position on the stage, the line-of-sight of the audience, and the like.

Patent Documents 1 and 2 described above do not disclose a control configuration for determining an optimum route for moving a camera in consideration of such various situations.

CITATION LIST

Patent Document

Patent Document 1: Japanese Patent Application Laid-Open No. 2020-087061

Patent Document 2: Japanese Patent No. 5160322

SUMMARY OF THE INVENTION

Problems to be Solved by the Invention

The present disclosure has been made in view of the issues described above, for example, and provides an information processing device, a mobile device, and an information processing system that determine an optimum position and a traveling route of a camera according to various situations including a moving position of a performer performing performance on a stage, an equipment position on the stage, a line-of-sight of an audience, and the like, and perform movement control of the mobile device (camera).

Solutions to Problems

A first aspect of the present disclosure is an information processing device including a data processing unit that generates a potential map in which a travel allowance area of an image capturing robot that moves on a stage and captures an image is defined, in which the data processing unit acquires data of at least one of action schedule data of a performer on the stage or arrangement schedule data of an object on the stage, and generates, on the basis of acquired data, a potential map in which a travel allowance area in which a possibility of collision with a performer or an object on a stage is equal to or less than a defined threshold is defined.

Moreover, a second aspect of the present disclosure is a mobile device including at least one of a storage unit that stores traveling route information generated on the basis of a potential map in which a travel allowance area in which a possibility of collision with a performer or an object on a stage is equal to or less than a defined threshold is defined, the potential map being a map generated on the basis of data of at least one of action schedule data of a performer on a stage or arrangement schedule data of an object on the stage, or a communication unit that acquires the traveling route information from an external device, in which the mobile device performs travel processing according to either the traveling route information acquired from the storage unit or the traveling route information acquired via the communication unit.

Moreover, a third aspect of the present disclosure is an information processing system including an image capturing robot and a server, in which the image capturing robot is an image capturing robot that moves on a stage and captures an image, the server includes a data processing unit that generates a potential map in which a travel allowance area of the image capturing robot is defined, the data processing unit acquires data of at least one of action schedule data of a performer on the stage or arrangement schedule data of an object on the stage, and generates, on the basis of acquired data, a potential map in which a travel allowance area in which a possibility of collision with a performer or an object on a stage is equal to or less than a defined threshold is defined, and the image capturing robot travels according to a traveling route determined on the basis of the potential map generated by the server.

Other objects, features, and advantages of the present disclosure will become apparent from a more detailed description based on examples of the present disclosure described below and the accompanying drawings. Note that a system in the present description is a logical set configuration of a plurality of devices, and is not limited to one in which devices with respective configurations are in the same housing.

According to a configuration of an example of the present disclosure, a map for determining a safe traveling route that does not collide with a performer or an object on a stage can be generated, and an image capturing robot can be caused to travel according to a route determined on the basis of the map.

Specifically, for example, a potential map in which a traveling allowance area of the image capturing robot that moves on a stage and captures an image is defined is generated. A data processing unit acquires action schedule data of a performer, arrangement schedule data of an object on a stage, and control schedule data of a lighting on the stage, and generates, on the basis of the acquired data, a potential map in which an area that does not collide with a performer or an object and is inconspicuous by a lighting is defined as a travel allowance area. Moreover, a traveling route of the robot is determined on the basis of the generated map, and the robot is caused to travel.

With the present configuration, a map for determining a safe traveling route that does not collide with a performer or an object on a stage can be generated, and an image capturing robot can be caused to travel according to a route determined on the basis of the map.

Note that the effects described herein are only examples and are not limited thereto, and additional effects may also be present.

BRIEF DESCRIPTION OF DRAWINGS

FIG. 5 is a diagram describing a configuration and processing of an information processing system according to the present disclosure.

FIG. 6 is a diagram describing an example of a performer base potential map generated by an individual potential map generation unit.

FIG. 8 is a diagram describing an example of an object base potential map generated by the individual potential map generation unit.

FIG. 9 is a diagram describing an example of a pre-generated potential map generated by a potential map combination unit.

FIG. 13 is a diagram illustrating a flowchart describing a generation processing sequence of a lighting base potential map performed by the information processing device according to the present disclosure.

FIG. 16 is a diagram illustrating a flowchart describing a generation processing sequence of a pre-generated potential map performed by the information processing device according to the present disclosure.

FIG. 20 is a diagram describing a configuration example and processing of an information processing device according to Example 2 of the present disclosure.

FIG. 21 is a diagram describing an example of a priority audience & TV camera base potential map generated by the information processing device according to Example 2 of the present disclosure.

FIG. 22 is a flowchart illustrating a generation processing sequence of a priority audience & TV camera base potential map performed by the information processing device according to the present disclosure.

FIG. 23 is a diagram illustrating a flowchart describing a generation processing sequence of a pre-generated potential map performed by the information processing device according to Example 2 of the present disclosure.

FIG. 24 is a diagram describing a configuration example and processing of an information processing device according to Example 3 of the present disclosure.

FIG. 25 is a diagram describing a configuration and processing of an information processing system according to Example 3 of the present disclosure.

FIG. 29 is a diagram illustrating a flowchart describing the generation processing sequence of the real-time data reflecting potential map performed by the information processing device according to Example 3 of the present disclosure.

FIG. 30 is a diagram describing a hardware configuration example of the information processing device according to the present disclosure.

MODE FOR CARRYING OUT THE INVENTION

Hereinafter, details of an information processing device, a mobile device, and an information processing system of the present disclosure will be described with reference to the drawings. Note that the description will be given according to the following items.

1. Outline of Processing of Present Disclosure
2. (Example 1) Details of Configuration and Processing of Information Processing Device According to Example 1 of Present Disclosure
3. Sequence of Processing Performed by Information Processing Device According to Example 1 of Present Disclosure 3-(1) Generation Sequence of Map a "Performer Base Potential Map"

3-(2) Generation Sequence of Map b "Lighting Base Potential Map"

3-(3) Generation Sequence of Map c "Object Base Potential Map"

3-(4) Generation Sequence of Pre-Generated Potential Map Obtained by Combining Individual Potential Maps 4. (Example 2) Details of Configuration and Processing of Information Processing Device for Creating Map in Consideration of Lines-of-Sight of Audience and Line-of-Sight of Television Camera on Audience Seat Side
5. (Example 3) Example of Generating Real-Time Data Reflecting Potential Map Using Information During Live Concert Performance
6. Hardware Configuration Example of Each Device
7. Summary of Configuration of Present Disclosure

1. Outline of Processing of Present Disclosure

First, an outline of processing of the present disclosure will be described with reference to FIG. 1 and subsequent drawings.

Figure 1:
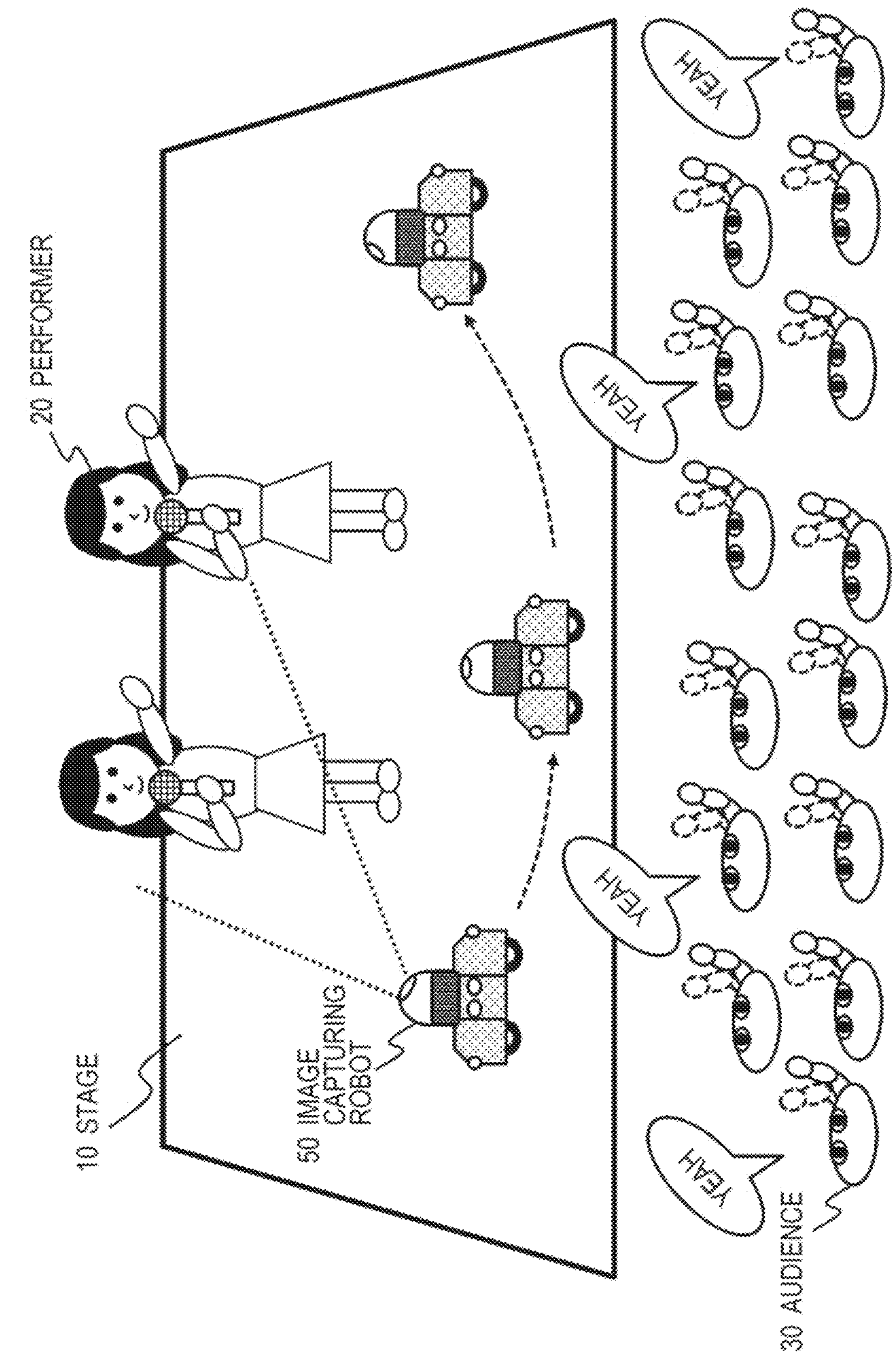
FIG. 1 is a diagram describing an outline of a live concert stage and an outline of processing according to the present disclosure.

FIG. 1 is a diagram illustrating an example of performance such as a music live concert performed on a stage. The example illustrated in FIG. 1 is an example in which performers 20 who are a pair of idol singers perform a music live concert on a stage 10.

In front of the stage 10, there are a large audience 30 watching the performance of the performers 20.

In a case where various performances including such a music live concert and the like are performed on a stage as described above, there is a case where processing of capturing images of the performance is performed by a mobile camera that travels on the same stage.

An image capturing robot 50 illustrated in FIG. 1 is a mobile device on which a camera is mounted, that is, a traveling robot, and moves around on a stage and captures the performance of the performers 20 from various angles.

The image capturing robot 50 is an automated traveling robot (mobile device) such as a carriage or the like equipped with a camera, and captures images from various angles while traveling on the stage according to a defined traveling route, for example.

The image capturing robot 50 needs to select and move along a safe traveling route that does not collide with a performer moving around on the stage or equipment such as a microphone, a speaker, and the like installed on the stage.

Furthermore, performing movement so as not to disturb the line-of-sight of the audience in front of or around the stage is also required.

Figure 2:
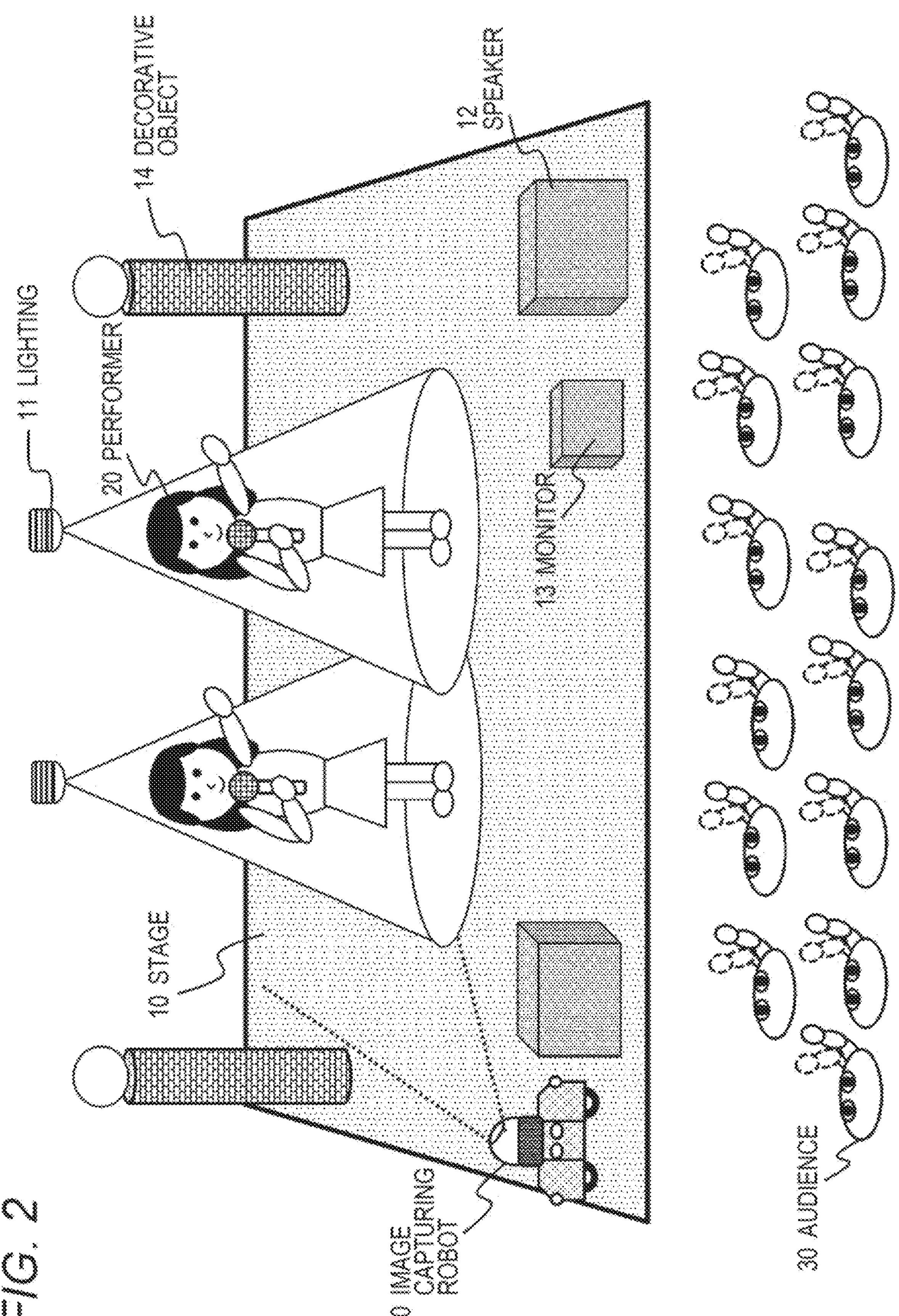
FIG. 2 is a diagram describing the outline of the live concert stage and the outline of the processing according to the present disclosure.

As illustrated in FIG. 2, a speaker 12, a monitor 13, and decorative objects 14 of various types are placed on the stage 10 on which a live concert is actually performed, and the performers 20 and the like are also irradiated with lightings 11.

The performers 20 move around on the stage in accordance with the progress of the live concert, and the positions, brightness, and colors of the lightings 11 also change in accordance with this movement.

Furthermore, the decorative objects 14 are replaced one after another in accordance with the progress of the live concert.

Figure 3:
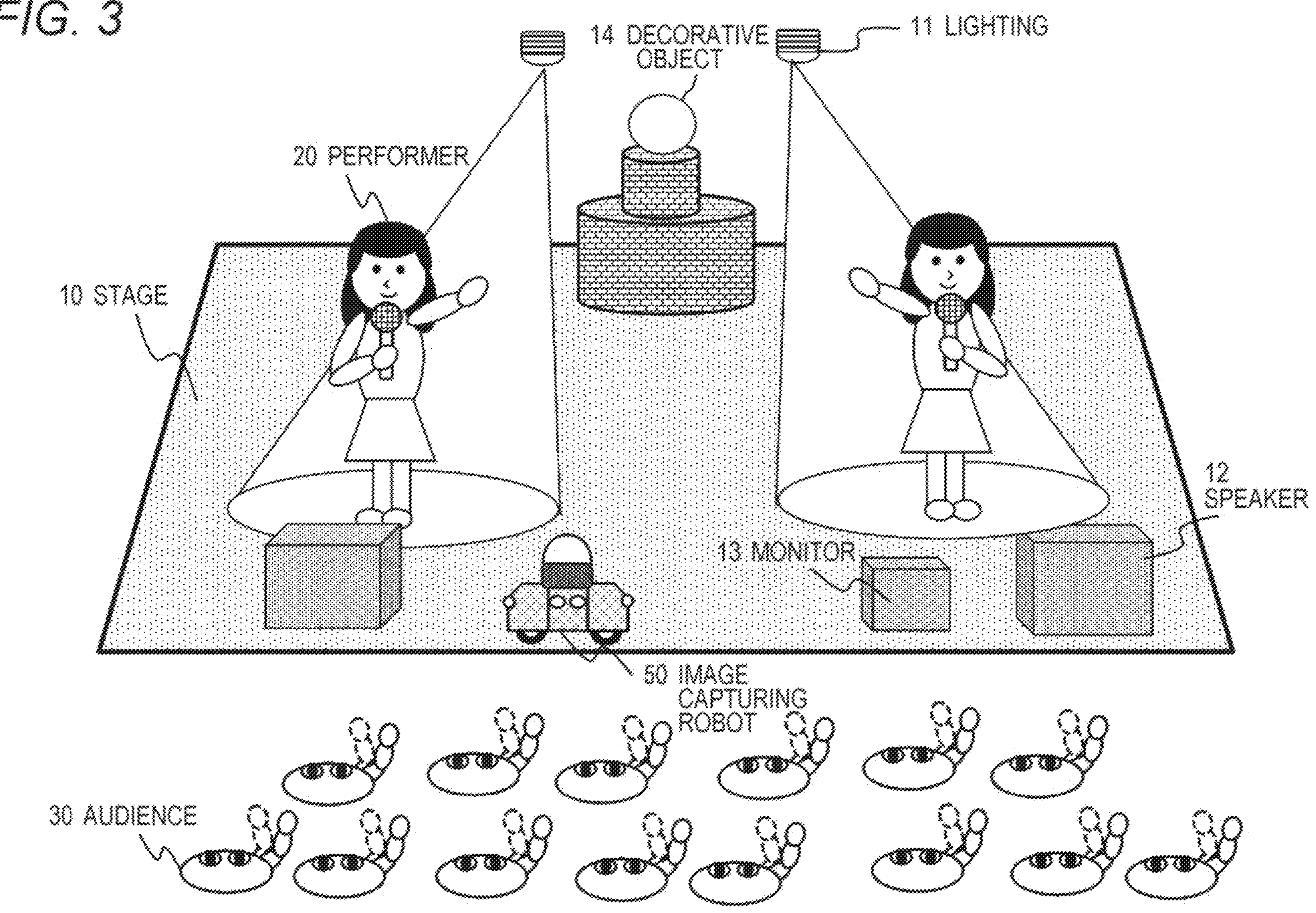
FIG. 3 is a diagram describing the outline of the live concert stage and the outline of the processing according to the present disclosure.

For example, a stage state illustrated in FIG. 2 is a scene at a time t1 in the live concert. In a stage state at a later certain time t2, for example, as illustrated in FIG. 3, the positions of the performers 20 are different, and the positions, brightness, and colors of the lightings 11 are also changed. Moreover, the decorative objects 14 are also replaced.

As described above, the positions of the performers 20 on the stage, the positions, brightness, and colors of the lightings 11, the positions of the decorative objects, and the like are sequentially changed according to the time zone in which the performance such as a live concert or the like is performed.

During a performance period of such a live concert, the image capturing robot 50 needs to travel so as not to collide with a performer 20, an arranged object of a decorative object 14, the speaker 12, and the like that are on the stage.

Furthermore, selecting and traveling along a route that does not interfere with lines-of-sight of the audience 30 are important. As one method for this, for example, control is effective in which a dark area other than a bright irradiation area of a lighting is selected and traveled along.

The present disclosure determines an optimum position and a traveling route of a camera according to various situations including moving positions of performers performing a performance on a stage, equipment positions on the stage, lightings, lines-of-sight of an audience, and the like, and performs movement control of a mobile device (camera).

Hereinafter, configurations and details of the processing of the present disclosure will be described.

2. (Example 1) Details of Configuration and Processing of Information Processing Device According to Example 1 of Present Disclosure Hereinafter, details of a configuration and the processing of an information processing device according to Example 1 of the present disclosure will be described.

Figure 4:
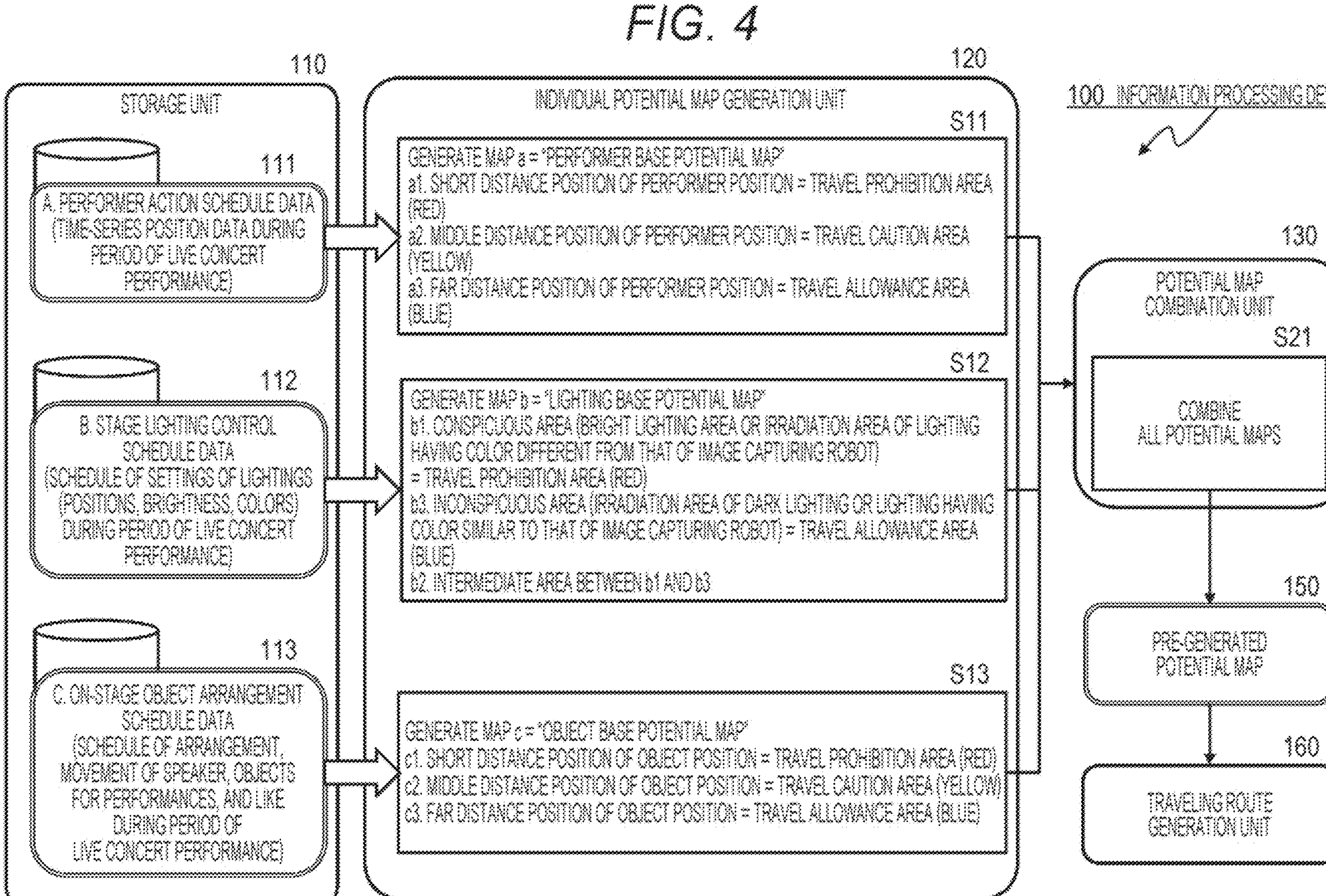
FIG. 4 is a diagram describing a configuration and processing of an information processing device according to the present disclosure.

FIG. 4 is a diagram illustrating a configuration example of an information processing device 100 according to Example 1 of the present disclosure.

Note that the information processing device 100 may be formed inside the mobile device that travels on a stage illustrated in FIGS. 1 to 3, that is, the image capturing robot 50 equipped with a camera, or may be a device independent of the image capturing robot 50, such as a device capable of communicating with the image capturing robot 50 or the like.

FIG. 5 illustrates a configuration example of an information processing system in a case where the information processing device having the configuration illustrated in FIG. 4 is a device independent of the image capturing robot 50.

For example, as illustrated in FIG. 5, an information processing system 180 is constructed in which the information processing device (server) 100, a live concert venue information acquisition device 60, the image capturing robot 50 in the live concert venue, and the like are connected via a communication network.

The information processing device (server) 100 has the configuration illustrated in FIG. 4.

The live concert venue information acquisition device 60 includes a camera that captures an image of the live concert venue, a microphone that acquires audio information of the live concert venue, an illuminance meter that detects a lighting state, a color analysis device, and the like, and transmits information of an acquired image and the like to the information processing device (server) 100 via the communication network.

The information processing device (server) 100 performs processing of generating a map for determining a traveling route of the image capturing robot 50 in the live concert venue (the map is a potential map), processing of determining a traveling route using the map, processing of generating travel control information of the image capturing robot 50 according to the determined traveling route, and the like.

The information processing device (server) 100 further transmits the generated travel control information to the image capturing robot 50 via the communication network.

The image capturing robot 50 travels on the stage in accordance with the travel control information received from the information processing device (server) 100.

For example, processing using such an information processing system can be performed.

Hereinafter, the configuration and the processing of the information processing device 100 illustrated in FIG. 4 will be described.

As illustrated in FIG. 4, the information processing device 100 includes a storage unit 110, an individual potential map generation unit 120, a potential map combination unit 130, and a traveling route generation unit 160. Note that, as described above, the information processing device 100 may be formed inside the mobile device that travels on a stage illustrated in FIGS. 1 to 3, that is, the image capturing robot 50 equipped with a camera, or may be a device independent of the image capturing robot 50, such as a device capable of communicating with the image capturing robot 50 or the like as in the information processing device (server) 100 illustrated in FIG. 5.

The storage unit 110 stores the following three pieces of data.

A. performer action schedule data 111,

B. stage lighting control schedule data 112,

C. on-stage object arrangement schedule data 113

Note that these three pieces of schedule data are prepared in advance before the start of a live concert and stored in the storage unit 110. That is, the schedule data is schedule data prepared in advance according to a program such as a live concert progress table prepared before the start of a live concert.

The information processing device 100 generates a map for setting a safe traveling route that does not cause the image capturing robot 50 to collide with a performer, an object such as a speaker or the like (the map is a potential map) using these pieces of schedule data. At the time of actual live concert performance, the image capturing robot 50 is caused to travel along a safe traveling route selected using the generated potential map.

Details of the data stored in the storage unit 110 will be described.

A. performer action schedule data 111 is time-series position data during a period of a live concert of performers moving around on a stage. That is, the time-series position data of performers from the start to the end of a live concert (performance).

B. stage lighting control schedule data 112 is time-series data of lighting control information including lighting setting information such as lighting positions, brightness, colors, and the like of lightings from the start to the end of a live concert (performance).

C. on-stage object arrangement schedule data 113 is time-series data of on-stage object arrangement position information including the arrangement positions of on-stage objects from the start to the end of a live concert (performance).

Note that the on-stage objects include a speaker, a monitor, a decorative object, and the like arranged on a stage.

These three types of data are time-series schedule data from the start to the end of a live concert (performance). That is, for example, in a case of a one-hour live concert, the three types of time-series schedule data of A. performer action schedule data 111, B. stage lighting control schedule data 112, and C. on-stage object arrangement schedule data 113 for one hour are recorded in the storage unit 110.

The stored data in the storage unit 110 is used in the individual potential map generation unit 120.

The individual potential map generation unit 120 generates the following three types of individual potential maps individually using the three types of time-series data A, B, and C described above.

Map a=performer base potential map,

Map b=lighting base potential map,

Map c=object base potential map

Note that a potential map is a map in which a travel prohibition area, a travel caution area, and a travel allowance area of the image capturing robot 50 described with reference to FIGS. 1 to 3 are defined.

All of the three types of maps a to c described above are time-series maps.

For example, the map a=performer base potential map is a time-series map in which each area (travel prohibition area, travel caution area, and travel allowance area) is dynamically changed according to the performer positions from the start to the end of a live concert (performance).

The map b=lighting base potential map is a time-series map in which each area (travel prohibition area, travel caution area, and travel allowance area) is dynamically changed according to the lighting states (lighting positions, brightness, colors, and the like) from the start to the end of a live concert (performance).

The map c=object base potential map is a time-series map in which each area (travel prohibition area, travel caution area, and travel allowance area) is dynamically changed according to the object arrangement positions from the start to the end of a live concert (performance).

As illustrated in FIG. 4, the individual potential map generation unit 120 performs each type of processing of steps S11 to S13 illustrated in the drawing.

That is, in step S11, a map a=performer base potential map is generated.

In step S12, a map b=lighting base potential map is generated.

In step S13, a map c=object base potential map is generated.

Note that the processing in steps S11 to S13 can be performed as parallel processing.

Hereinafter, the processing will be sequentially described.

(Step S11)

In step S11, the individual potential map generation unit 120 generates a map a="performer base potential map".

As described above, the "performer base potential map" is a map in which each area (travel prohibition area, travel caution area, and travel allowance area) is dynamically changed according to the performer positions from the start to the end of a live concert (performance), and a time-series map in which the following three areas (a1 to a3) are set.

a1. travel prohibition area (red)=short distance position of a performer position a2. travel caution area (yellow)=middle distance position of a performer position a3. travel allowance area (blue)=far distance position of a performer position Specifically, for example, a1. travel prohibition area (red)=area in which a possibility of collision with a performer is a predefined first threshold Tha1 or more a2. travel caution area (yellow)=area in which possibility of collision with a performer falls within a range of the predefined first threshold value Tha1 to a predefined second threshold value Tha2 a3. travel allowance area (blue)=area in which possibility of collision with a performer is equal to or less than the predefined second threshold value Tha2

For example, the map is a map in which these area divisions are performed.

A specific example of the map a=performer base potential map will be described with reference to FIG. 6.

The "performer base potential map" is a time-series map in which each area (travel prohibition area, travel caution area, and travel allowance area) is dynamically changed according to the performer positions from the start to the end of a live concert (performance), and FIG. 6 illustrates an example of a performer base potential map at four timings (t1 to t4).

The map (t1) in the upper left of FIG. 6 is an example of the "performer base potential map" at a time t1.

There are two performers on the stage, as described above with reference to FIGS. 1 to 3.

Note that, as described above, the potential map is a map generated before the actual start of a live concert, and the positions and the like of the performers are scheduled positions of the performers estimated in accordance with a live concert program such as a live concert progress table or the like. Action schedule data indicating the positions of the performers from the start to the end of the live concert (performance) is generated and recorded in advance as A. performer action schedule data 111 in the storage unit 110.

The "performer base potential map" is a map in which different colors in units of areas are arranged according to areas determined according to the distances from the performer positions as follows (the areas are a travel prohibition area, a travel caution area, and a travel allowance area).

The short distance position of a performer position is set in red as a travel prohibition area.

The middle distance position of a performer position is set in yellow as a travel caution area.

The far distance position of a performer position is set in blue as a travel allowance area.

The map (t2) in the upper right of FIG. 6 is an example of the "performer base potential map" at a time t2 when a certain time has elapsed from the time t1.

At the time t2, the two performers have moved to positions different from the time t1. In accordance with this movement of the performers, the settings of these three areas of the travel prohibition area (red), the travel caution area (yellow), and the travel allowance area (blue) also change.

The map (t3) in the lower left of FIG. 6 is an example of the "performer base potential map" at a time t3 when a certain time has further elapsed from the time t2.

At the time t3, the two performers have moved to positions different from times t1 and t2. In accordance with this movement of the performers, the settings of these three areas of the travel prohibition area (red), the travel caution area (yellow), and the travel allowance area (blue) also change.

The map (t4) in the lower right of FIG. 6 is an example of the "performer base potential map" at a time t4 when a certain time has further elapsed from the time t3.

At the time t4, the two performers have moved to positions different from times t1 to t3. In accordance with this movement of the performers, the settings of these three areas of the travel prohibition area (red), the travel caution area (yellow), and the travel allowance area (blue) also change.

As described above, the "performer base potential map" is a time-series map in which each area (travel prohibition area, travel caution area, and travel allowance area) is dynamically changed according to the performer positions from the start time to the end time of a live concert (performance).

In step S11, the individual potential map generation unit 120 generates such a map a="performer base potential map".

Note that action schedule data indicating the positions of the performers from the start to the end of the live concert (performance) is generated and recorded in advance as A. performer action schedule data 111 in the storage unit 110.

In step S11, the individual potential map generation unit 120 acquires A. performer action schedule data 111 in the storage unit 110 and generates a time-series map a="performer base potential map" in which each area (travel prohibition area, travel caution area, and travel allowance area) is dynamically changed from the start to the end of a live concert (performance) with reference to the acquired data.

(Step S12)

Moreover, in step S12, the individual potential map generation unit 120 generates a map b="lighting base potential map".

As described above, the "lighting base potential map" is a time-series map in which each area (travel prohibition area, travel caution area, and travel allowance area) is dynamically changed according to the lighting states (lighting positions, brightness, colors, and the like) from the start to the end of a live concert (performance), and a time-series map in which the following three areas (b1 to b3) are set.

b1. travel prohibition area (red)=conspicuous area due to the lighting states (bright area or lighting area having a color different from that of the image capturing robot)

b3. travel allowance area (blue)=inconspicuous area due to the lighting states (dark area or lighting area having a color similar to that of the image capturing robot)

b2. travel caution area (yellow)=intermediate area between b1 and b3

Specifically, for example, b1. travel prohibition area (red)=area in which a lighting state value calculated on the basis of the lighting states (lighting positions, brightness, colors, and the like) is equal to or greater than a predefined first threshold Thb1 (=conspicuous area (bright area or lighting area having a color different from that of the image capturing robot))

b3. travel allowance area (blue)=area in which a lighting state value calculated on the basis of the lighting states (lighting positions, brightness, colors, and the like) is less than a predefined second threshold Thb2 (=inconspicuous area (dark area or lighting area having a color similar to that of the image capturing robot))

b2. travel caution area (yellow)=intermediate area between b1 and b3

For example, the map is a map in which these area divisions are performed.

A specific example of the map b=lighting base potential map will be described with reference to FIG. 7.

Figure 7:
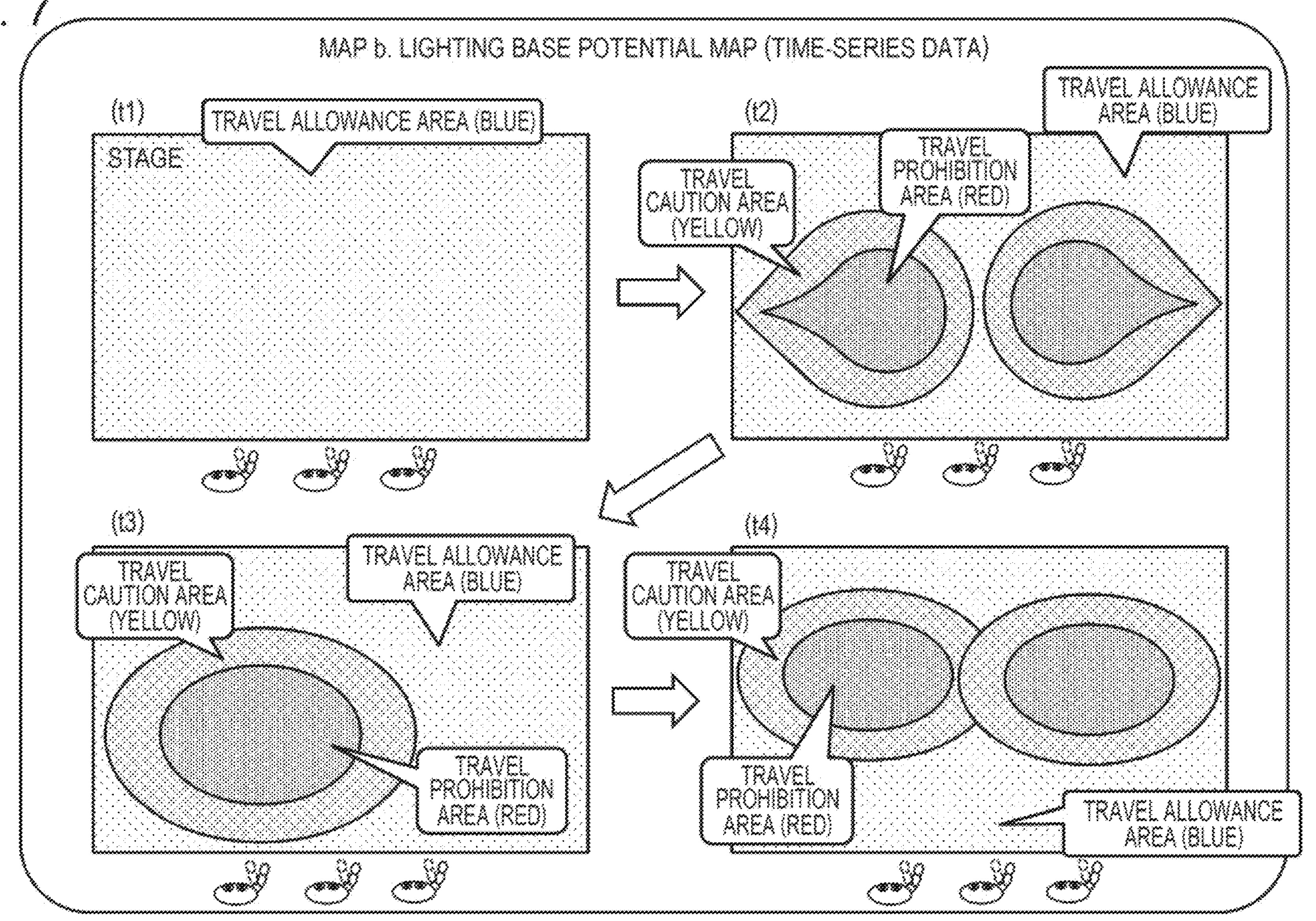
FIG. 7 is a diagram describing an example of a lighting base potential map generated by the individual potential map generation unit.

The "lighting base potential map" is a time-series map in which each area (travel prohibition area, travel caution area, and travel allowance area) is dynamically changed according to the lighting states (lighting positions, brightness, colors, and the like) from the start to the end of a live concert (performance), and FIG. 7 illustrates an example of a lighting base potential map at the four timings (t1 to t4).

The map (t1) in the upper left of FIG. 7 is an example of the "lighting base potential map" at the time t1.

This map (t1) is an example of a map in a state in which the lightings are dark entirely at the start of the live concert, for example.

In this case, since the entire stage is set dark, the entire stage is set as the travel allowance area (blue)=inconspicuous area (dark area or lighting area having a color similar to that of the image capturing robot) due to the lighting states.

The map (t2) in the upper right of FIG. 7 is an example of the "lighting base potential map" at the time t2 when a certain time has elapsed from the time t1.

At the time t2, the lighting states (lighting positions, brightness, colors, and the like) are set to states different from the time t1. In accordance with this change of the lighting states (lighting positions, brightness, colors, and the like), the settings of these three areas of the travel prohibition area (red), the travel caution area (yellow), and the travel allowance area (blue) also change.

The "lighting base potential map" is a map in which different colors in units of areas are arranged according to areas determined according to the lighting states (lighting positions, brightness, colors, and the like) as follows (the areas are a travel prohibition area, a travel caution area, and a travel allowance area).

That is, a conspicuous area due to a lighting state (bright area or lighting area having a color different from that of the image capturing robot) is set in red as a travel prohibition area.

An inconspicuous area due to a lighting state (dark area or lighting area having a color similar to that of the image capturing robot) is set in blue as a travel allowance area.

An intermediate area between the travel prohibition area and the travel allowance area described above is set in yellow as a travel caution area.

As described above, in accordance with this change of the lighting states (lighting positions, brightness, colors, and the like), the settings of these three areas of the travel prohibition area (red), the travel caution area (yellow), and the travel allowance area (blue) change at the time t2.

The map (t3) in the lower left of FIG. 7 is an example of the "lighting base potential map" at the time t3 when a certain time has further elapsed from the time t2.

At the time t3, the lighting states (lighting positions, brightness, colors, and the like) are states different from the times t1 and t2. In accordance with this change of the lighting states (lighting positions, brightness, colors, and the like), the settings of these three areas of the travel prohibition area (red), the travel caution area (yellow), and the travel allowance area (blue) also change.

The map (t4) in the lower right of FIG. 7 is an example of the "lighting base potential map" at the time t4 when a certain time has further elapsed from the time t3.

Also at the time t4, the lighting states (lighting positions, brightness, colors, and the like) are set to states different from the times t1 to t3. In accordance with this change of the lighting states (lighting positions, brightness, colors, and the like), the settings of these three areas of the travel prohibition area (red), the travel caution area (yellow), and the travel allowance area (blue) also change.

As described above, the "lighting base potential map" is a time-series map in which each area (travel prohibition area, travel caution area, and travel allowance area) is dynamically changed according to a change of the lighting states (lighting positions, brightness, colors, and the like) from the start time to the end time of a live concert (performance).

In step S12, the individual potential map generation unit 120 generates such a map b="lighting base potential map". Note that this p b="lighting base potential map"

Note that transition schedule data of the lighting states (lighting positions, brightness, colors, and the like) from the start to the end of a live concert (performance) is generated and recorded in advance as B. stage lighting control scheduled data 112 in the storage unit 110.

In step S12, the individual potential map generation unit 120 acquires B. stage lighting control schedule data 112 in the storage unit 110 and generates a time-series map b="lighting base potential map" in which each area (travel prohibition area, travel caution area, and travel allowance area) is dynamically changed from the start to the end of a live concert (performance) with reference to the acquired data.

(Step S13)

In step S13, the individual potential map generation unit 120 generates a map c="object base potential map".

As described above, the "object base potential map" is a map in which each area (travel prohibition area, travel caution area, and travel allowance area) is dynamically changed according to the on-stage object arrangement positions from the start to the end of a live concert (performance), and a time-series map in which the following three areas (c1 to c3) are set.

c1. travel prohibition area (red)=short distance position of an object arrangement position c2. travel caution area (yellow)=middle distance position of an object arrangement position c3. travel allowance area (blue)=far distance position of an object arrangement position Specifically, for example, c1. travel prohibition area (red)=area in which a possibility of collision with an object is a predefined first threshold Thc1 or more c2. travel caution area (yellow)=area in which a possibility of collision with an object falls within a range of the predefined first threshold value Thc1 to a predefined second threshold value Thc2 c3. Travel allowance area (blue)=area in which a possibility of collision with an object is equal to or less than the predefined second threshold value Thc2

For example, the map is a map in which these area divisions are performed.

Note that the object is an object arranged on a stage and is a speaker, a monitor, a decorative object, or the like.

A specific example of the map c=object base potential map will be described with reference to FIG. 8.

The "object base potential map" is a time-series map in which each area (travel prohibition area, travel caution area, and travel allowance area) is dynamically changed according to the object arrangement positions from the start to the end of a live concert (performance), and FIG. 8 illustrates an example of an object base potential map at the four timings (t1 to t4).

The map (t1) in the upper left of FIG. 8 is an example of the "object base potential map" at the time t1.

A speaker, a monitor, a decorative object, and the like are arranged on the stage, and some of these are moved, replaced, and the like in accordance with the progress of the live concert.

The "object base potential map" is a map in which different colors in units of areas are arranged according to areas determined according to the distances from the object arrangement positions as follows (the areas are a travel prohibition area, a travel caution area, and a travel allowance area).

The short distance position of an object arrangement position is set in red as a travel prohibition area.

The middle distance position of an object arrangement position is set in yellow as a travel caution area.

The far distance position of an object arrangement position is set in blue as a travel allowance area.

The map (t2) in the upper right of FIG. 8 is an example of the "object base potential map" at the time t2 when a certain time has elapsed from the time t1.

At the time t2, the objects on the stage have been moved or replaced to positions different from the time t1. In accordance with this movement or replacement of the objects, the settings of these three areas of the travel prohibition area (red), the travel caution area (yellow), and the travel allowance area (blue) also change.

The map (t3) in the lower left of FIG. 8 is an example of the "object base potential map" at the time t3 when a certain time has further elapsed from the time t2.

At the time t3, the objects on the stage have been moved or replaced to positions different from the times t1 and t2. In accordance with this movement or replacement of the objects, the settings of these three areas of the travel prohibition area (red), the travel caution area (yellow), and the travel allowance area (blue) also change.

The map (t4) in the lower right of FIG. 8 is an example of the "object base potential map" at the time t4 when a certain time has further elapsed from the time t3.

At the time t4, the objects on the stage have been moved or replaced to positions different from the times t1 to t3. In accordance with this movement or replacement of the objects, the settings of these three areas of the travel prohibition area (red), the travel caution area (yellow), and the travel allowance area (blue) also change.

As described above, the "object base potential map" is a time-series map in which each area (travel prohibition area, travel caution area, and travel allowance area) is dynamically changed according to the on-stage object arrangement positions from the start time to the end time of a live concert (performance).

In step S13, the individual potential map generation unit 120 generates such a map c="object base potential map".

Note that the on-stage object arrangement schedule data indicating the arrangement positions of the objects from the start to the end of a live concert (performance) is generated and recorded in advance as C. on-stage object arrangement schedule data 113 in the storage unit 110.

In step S13, the individual potential map generation unit 120 acquires C. on-stage object arrangement schedule data 113 in the storage unit 110 and generates a time-series map c="object base potential map" in which each area (travel prohibition area, travel caution area, and travel allowance area) is dynamically changed from the start to the end of a live concert (performance) with reference to the acquired data.

As described above, the individual potential map generation unit 120 illustrated in FIG. 4 generates the following three maps in steps S11 to S13. That is, in step S11, a map a=performer base potential map is generated.

In step S12, a map b=lighting base potential map is generated.

In step S13, a map c=object base potential map is generated.

These three individual potential maps generated by the individual potential map generation unit 120, that is, a map a=performer base potential map, a map b=lighting base potential map, and a map c=object base potential map, are input to the potential map combination unit 130.

The potential map combination unit 130 performs processing of combining the three individual potential maps generated by the individual potential map generation unit 120 to generate a pre-generated potential map 150.

Note that the pre-generated potential map 150 is also a time-series map in which each area (travel prohibition area, travel caution area, and travel allowance area) is dynamically changed from the start to the end of a live concert (performance).

The pre-generated potential map 150 generated by the potential map combination unit 130 is generated as combination data reflecting all of three pieces of time-series data of the three individual potential maps generated by the individual potential map generation unit 120, that is, a map a=performer base potential map, a map b=lighting base potential map, and a map c=object base potential map.

FIG. 9 illustrates a specific example of a pre-generated potential map 150 generated by the potential map combination unit 130.

FIG. 9 illustrates an example of a pre-generated potential map 150 of the four timings (t1 to t4) similar to the individual potential maps described with reference to FIGS. 6 to 8.

The pre-generated potential maps at the four timings (t1 to t4) illustrated in FIG. 9 are maps generated by combining the individual potential maps at the four same timings (t1 to t4) illustrated in FIGS. 6 to 8 in units of each timing.

The map (t1) in the upper left of FIG. 9 is an example of the "pre-generated potential map" at the time t1.

This "pre-generated potential map" at the time t1 is a map obtained by combining these three individual potential maps at the same timing (t1) of the performer base potential map at the time t1 illustrated in FIG. 6 (t1), the lighting base potential map at the time t1 illustrated in FIG. 7 (t1), and the object base potential map at the time t1 illustrated in FIG. 8 (t1).

On the stage, there are two performers at the same positions as in FIG. 6 (t1), and objects including a speaker, a monitor, a decorative object, and the like are arranged at similar positions as in FIG. 8 (t1). The lighting is set such that the entire stage is dark as in FIG. 7 (t1).

Although a specific sequence of combining processing will be described below, for example, the combining processing is performed by the following processing.

Areas of each of the individual potential maps (travel prohibition area, travel caution area, and travel allowance area) are quantified.

For example, travel prohibition area=10, travel caution area=5, travel allowance area=0

Such quantification is performed, numerical values of the respective areas of each of the individual potential maps are added, and a pre-generated potential map as a combination map is generated on the basis of the addition results.

For example, a combination map, that is, a pre-generated potential map is generated in which an area having an addition value of 10 or more is set as a travel prohibition area, an area having an addition value of 5 or more and less than 10 is set as a travel caution area, and an area having an addition value of less than 5 is set as a travel allowance area.

This "pre-generated potential map" illustrated in FIG. 9 (t1) is a map generated by quantifying and adding each area (travel prohibition area, travel caution area, and travel allowance area) of these three individual potential maps at the same timing (t1) of the performer base potential map at the time t1 illustrated in FIG. 6 (t1), the lighting base potential map at the time t1 illustrated in FIG. 7 (t1), and the object base potential map at the time t1 illustrated in FIG. 8 (t1), and performing area division based on the addition value described above.

The "pre-generated potential map" is a map in which a travel prohibition area, a travel caution area, and a travel allowance area are determined in consideration of all the performer positions, the lighting states (lighting positions, brightness, colors), and the object arrangement positions, and the following different colors are arranged in units of the determined areas.

A travel prohibition area is set to red.

A travel caution area is set to yellow.

A travel allowance area is set to blue.

The map (t2) in the upper right of FIG. 9 is an example of a combination map, that is, the "pre-generated potential map" at the time t2 when a certain time has elapsed from the time t1.

At the time t2, the performer positions, the lighting states (lighting positions, brightness, colors), and the object arrangement positions are set differently from those at the time t1.

This "pre-generated potential map" at the time t2 is a map generated by quantifying and adding each area (travel prohibition area, travel caution area, and travel allowance area) of these three individual potential maps at the same timing (t2) of the performer base potential map at the time t2 illustrated in FIG. 6 (t2), the lighting base potential map at the time t2 illustrated in FIG. 7 (t2), and the object base potential map at the time t2 illustrated in FIG. 8 (t2), and performing area division based on the addition value.

The map (t3) in the lower left of FIG. 9 is an example of a combination map, that is, the "pre-generated potential map" at the time t3 when a certain time has further elapsed from the time t2.

At the time t3, the performer positions, the lighting states (lighting positions, brightness, colors), the object arrangement positions are set differently from those at the times t1 and t2.

This "pre-generated potential map" at the time t3 is a map generated by quantifying and adding each area (travel prohibition area, travel caution area, and travel allowance area) of these three individual potential maps at the same timing (t3) of the performer base potential map at the time t3 illustrated in FIG. 6 (t3), the lighting base potential map at the time t3 illustrated in FIG. 7 (t3), and the object base potential map at the time t3 illustrated in FIG. 8 (t3), and performing area division based on the addition value.

The map (t4) in the lower right of FIG. 9 is an example of a combination map, that is, the "pre-generated potential map" at the time t4 when a certain time has further elapsed from the time t3.

At the time t4, the performer positions, the lighting states (lighting positions, brightness, colors), and the object arrangement positions are set differently from those at the times t1 to t3.

This "pre-generated potential map" at the time t4 is a map generated by quantifying and adding each area (travel prohibition area, travel caution area, and travel allowance area) of these three individual potential maps at the same timing (t4) of the performer base potential map at the time t4 illustrated in FIG. 6 (t4), the lighting base potential map at the time t4 illustrated in FIG. 7 (t4), and the object base potential map at the time t4 illustrated in FIG. 8 (t4), and performing area division based on the addition value.

As described above, the potential map combination unit 130 performs the processing of combining three individual potential maps generated by the individual potential map generation unit 120, that is, a map a=performer base potential map,
a map b=lighting base potential map, and
a map c=object base potential map
to generate the pre-generated potential map 150.

The potential map combination unit 130 quantifies and adds each area (travel prohibition area, travel caution area, and travel allowance area) of a plurality of individual potential maps at the same timing, performs area division based on the addition values, and generates the pre-generated potential map 150.

The pre-generated potential map 150 generated by the potential map combination unit 130 is provided to the traveling route generation unit 160, and the traveling route generation unit 160 determines a traveling route of the image capturing robot 50 from the start to the end of a live concert (performance) on the basis of the pre-generated potential map 150.

Figure 10:
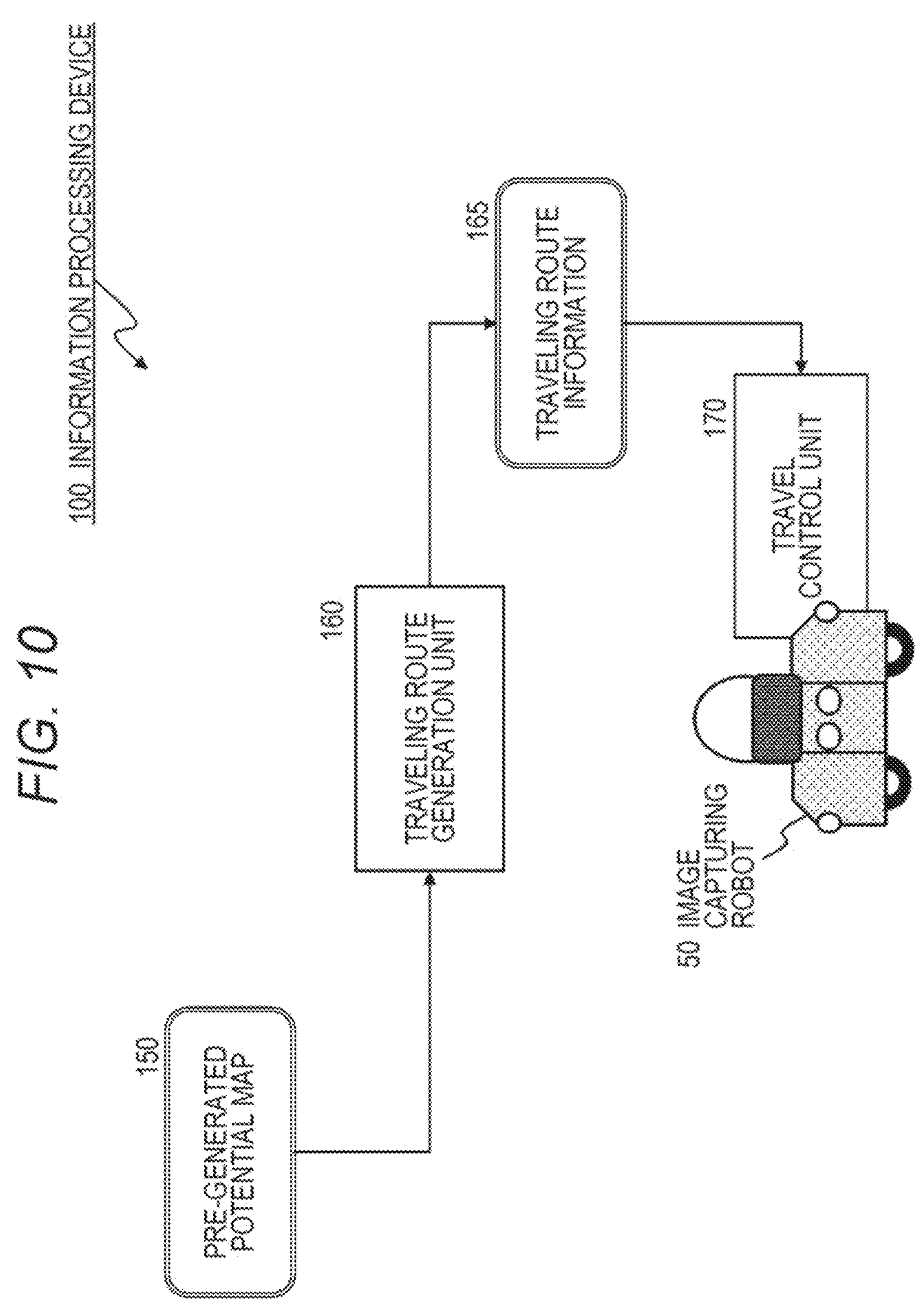
FIG. 10 is a diagram describing a configuration and processing of the information processing device according to the present disclosure.

That is, as illustrated in FIG. 10, the traveling route generation unit 160 inputs the pre-generated potential map 150 generated by the potential map combination unit 130, and generates traveling route information 165 in which a route in which the image capturing robot 50 selects and travels in an area that does not collide with a performer or an object on the stage from the start to the end of a live concert (performance) and is not conspicuous by the lightings is set.

For example, the traveling route generation unit 160 generates a traveling route in which travel is performed only in a traveling allowance area in the pre-generated potential map 150.

The generated traveling route is provided to a travel control unit 170 that performs travel control of the image capturing robot 50, and the travel control unit 170 causes the image capturing robot 50 to travel according to the generated traveling route information 165.

Note that the travel control unit 170 may be formed in an information processing device in the image capturing robot 50 or an information processing device capable of communicating with the robot outside the image capturing robot 50.

As described above, the image capturing robot 50 is caused to travel according to the traveling route information 165 generated using the pre-generated potential map 150, thereby enabling the image capturing robot 50 to select and travel in an area that does not collide with a performer or an object on the stage from the start to the end of a live concert (performance) and is not conspicuous by the lightings.

An example of the traveling route information 165 generated using the pre-generated potential map 150 will be described with reference to FIG. 11.

Figure 11:
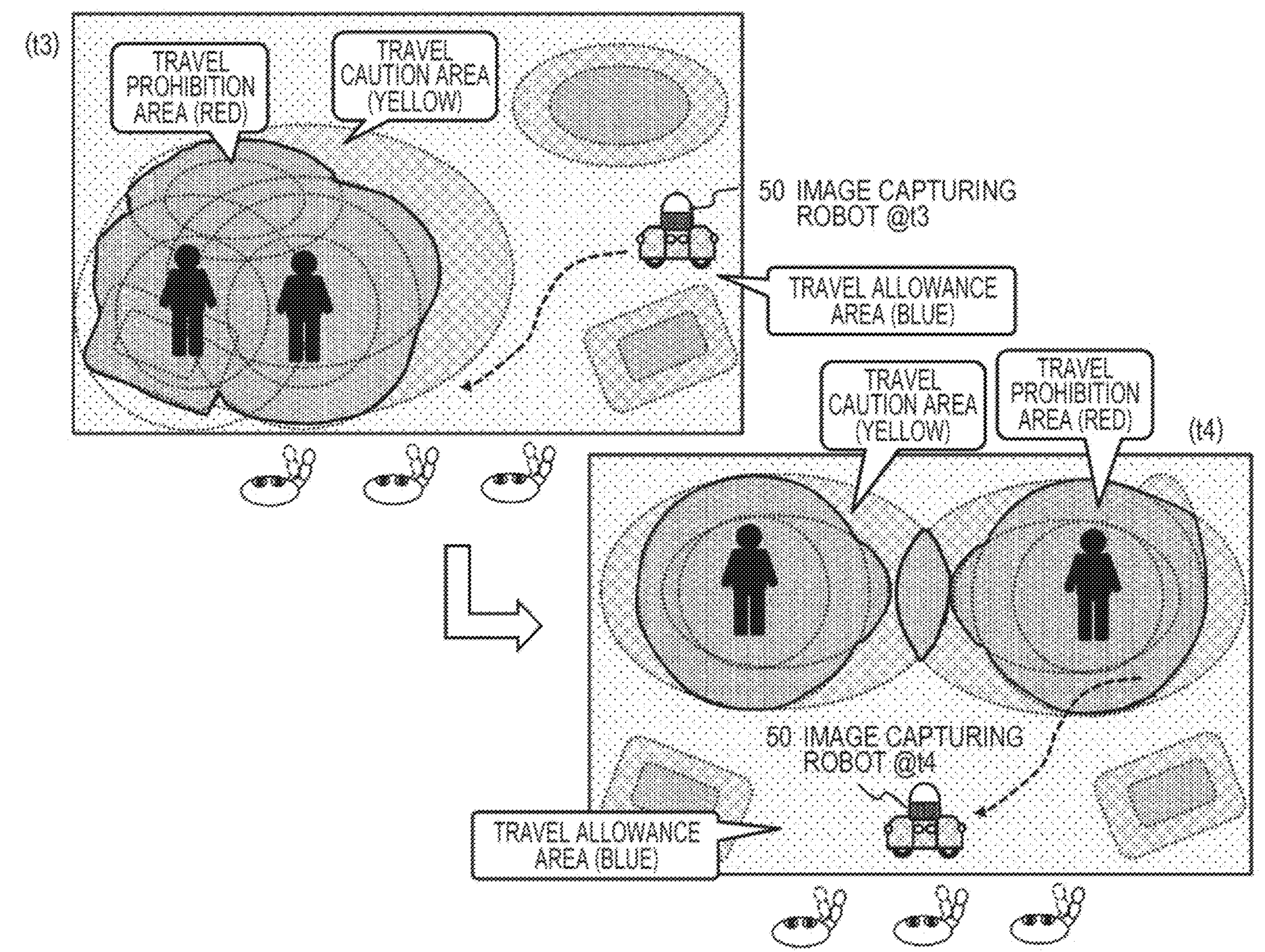
FIG. 11 is a diagram describing an example of a traveling route of an image capturing robot determined on the basis of a pre-generated potential map.

FIG. 11 illustrates an example of a traveling route of the image capturing robot 50 at the times (t3) to (t4).

The traveling route of the image capturing robot 50 at the times (t3) to (t4) illustrated in FIG. 11 is a traveling route set such that travel is performed only in a travel allowance area in the pre-generated potential map 150 generated by the potential map combination unit 130.

As described above, in a case were the image capturing robot 50 is caused to travel according to a traveling route set such that travel is performed only in a travel allowance area in the pre-generated potential map 150, the image capturing robot 50 can be caused to select and travel in an area that does not collide with a performer or an object on the stage from the start to the end of a live concert (performance) and is not conspicuous by the lightings.

3. Sequence of Processing Performed by Information Processing Device According to Example 1 of Present Disclosure Next, sequences of processing performed by the information processing device according to Example 1 of the present disclosure will be described.

Figure 12:
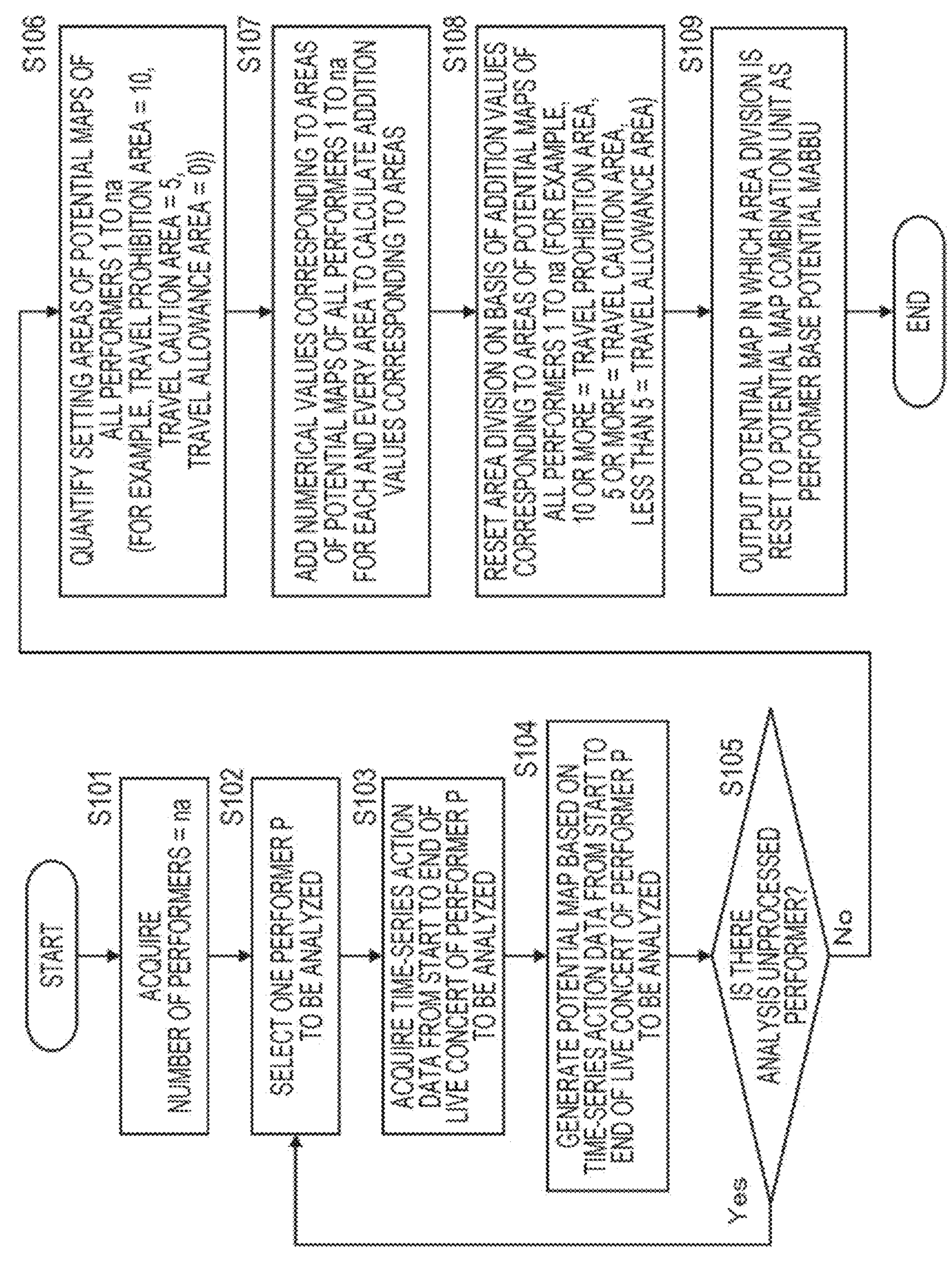
FIG. 12 is a diagram illustrating a flowchart describing a generation processing sequence of a performer base potential map performed by the information processing device according to the present disclosure.

Flowcharts illustrated in FIG. 12 and subsequent drawings are flowcharts for describing a sequence of processing performed by the information processing device 100 according to the present disclosure described above with reference to FIG. 4.

The flowcharts illustrated in FIGS. 12 to 15 are sequences of processing performed by the individual potential map generation unit 120 of the information processing device 100, and correspond to generation sequences of the following three types of individual potential maps.

(1) FIG. 12=generation sequence of a map a "performer base potential map"

Figure 14:
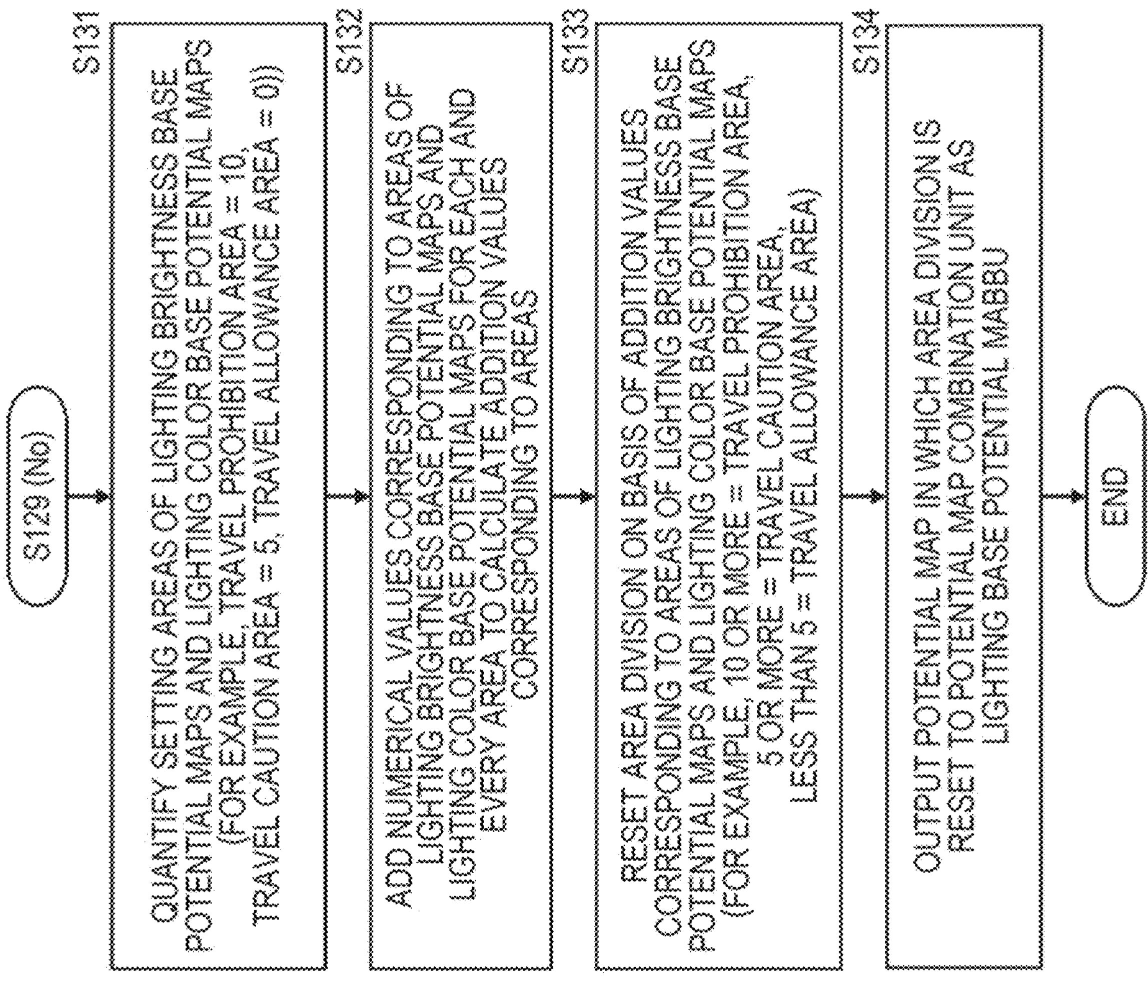
FIG. 14 is a diagram illustrating a flowchart describing the generation processing sequence of the lighting base potential map performed by the information processing device according to the present disclosure.

(2) FIGS. 13 to 14=generation sequence of a map b "lighting base potential map"

Figure 15:
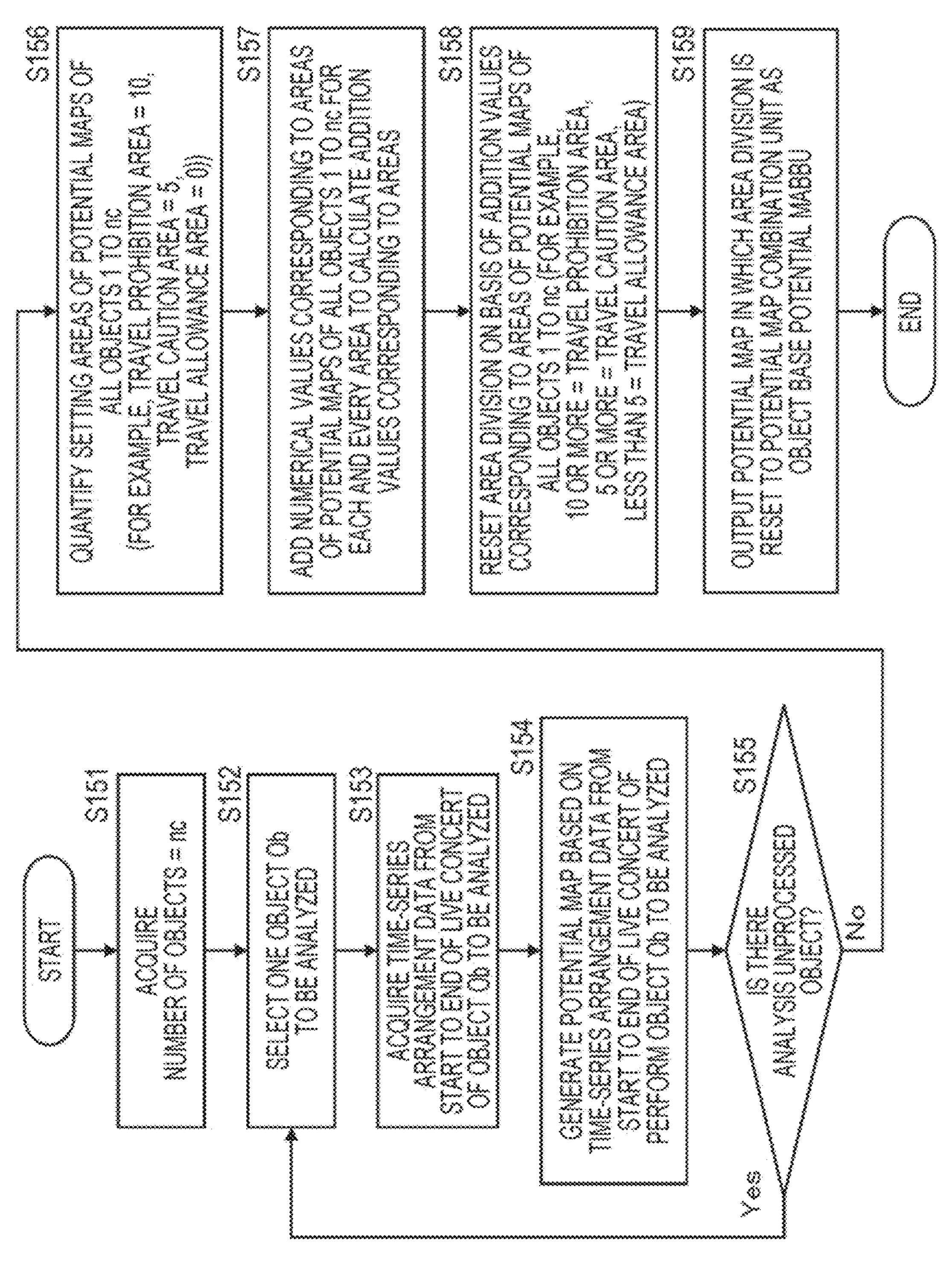
FIG. 15 is a diagram illustrating a flowchart describing a generation processing sequence of an object base potential map performed by the information processing device according to the present disclosure.

(3) FIG. 15=generation sequence of a map c "object base potential map"

Furthermore, a flowchart illustrated in FIG. 16 is a generation processing sequence of a "pre-generated potential map" that is a combination map performed by the potential map combination unit 130 of the information processing device 100 illustrated in FIG. 4.

Note that the processing according to the flow described below can be performed in accordance with, for example, a program stored in a storage unit of the information processing device under, for example, the control of a control unit having a program performance function such as a CPU or the like. Hereinafter, details of the processing of the flow illustrated in FIG. 14 will be sequentially described.

[3-(1) Generation Sequence of Map a "Performer Base Potential Map" ]

First, a generation sequence of the map a "performer base potential map" performed by the individual potential map generation unit 120 of the information processing device 100 with reference to a flowchart illustrated in FIG. 12.

Note that the processing according to the flowchart illustrated in FIG. 12 corresponds to a detailed sequence of generation processing of the map a=performer base potential map that is the processing of step S11 performed by the individual potential map generation unit 120 described above with reference to FIG. 4.

That is, it is a detailed sequence of the generation processing of the map a=performer base potential map that is a time-series map in which each area (travel prohibition area, travel caution area, and travel allowance area) is dynamically changed according to the performer positions from the start to the end of a live concert (performance).

Hereinafter, processing of each step of the flow illustrated in FIG. 12 will be sequentially described.

(Step S101)

First, in step S101, a data processing unit (individual potential map generation unit 120) of the information processing device 100 acquires the number of performers=na during a live concert performance period of a live concert for which the performer base potential map is to be generated.

This is performed, for example, as processing for acquisition from performer action schedule data generated on the basis of a preset live concert program, that is, "A. performer action schedule data 111" stored in the storage unit 110 of the information processing device 100 illustrated in FIG. 4.

(Step S102)

Next, in step S102, the data processing unit of the information processing device 100 selects one performer P to be analyzed.

(Step S103)

Next, in step S103, the data processing unit of the information processing device 100 acquires time-series action data from the start to the end of the live concert of the performer P to be analyzed.

This processing is also performed, for example, as processing for acquisition from the performer action schedule data generated on the basis of the preset live concert program, that is, "A. performer action schedule data 111" stored in the storage unit 110 of the information processing device 100 illustrated in FIG. 4.

(Step S104)

Next, in step S104, the data processing unit of the information processing device 100 generates a potential map based on the time-series action data from the start to the end of the live concert of the performer P to be analyzed.

This is processing performed according to the processing described above with reference to FIGS. 4 and 6, and is performed as processing of determining three areas (travel prohibition area, travel caution area, and travel allowance area) according to the distance from the position of the performer P to be analyzed at each time from the start to the end of the live concert, and arranging different colors in units of areas according to the determined areas.

Specifically, the following area setting and color setting are performed.

The short distance position of the position of the performer P is set in red as a travel prohibition area.

The middle distance position of the position of the performer P is set in yellow as a travel caution area.

The far distance position of the position of the performer P is set in blue as a travel allowance area.

A performer base potential map corresponding to one performer P to be analyzed is generated by this processing.

(Step S105)

Next, in step S105, the data processing unit of the information processing device 100 determines the presence or absence of an analysis unprocessed performer.

That is, whether or not generation of performer base potential maps of all the number of performers na acquired in step S101 has been completed is determined.

In a case where there is an unprocessed performer, the determination in step S105 is Yes. In this case, the processing of step S102 and subsequent steps for the unprocessed performer is performed.

On the other hand, in a case where there is no unprocessed performer, that is, in a case where it is determined that generation of the performer base potential maps of all the number of performers na acquired in step S101 has been completed, the determination in step S105 is No. In this case, the processing proceeds to step S106.

(Step S106)

In a case where generation of all the performer base potential maps is completed, the data processing unit of the information processing device 100 performs the processing of step S106 and subsequent steps.

First, in step S106, setting areas of each of the na potential maps corresponding to individual performers corresponding to all the performers 1 to na are quantified. For example, travel prohibition area=10, travel caution area=5, travel allowance area=0

Such quantification is performed in units of areas.

(Step S107)

Next, in step S107, the data processing unit of the information processing device 100 adds numerical values corresponding to the areas of the potential maps of all the performers 1 to na for each and every area to calculate addition values corresponding to the areas.

For example, it is assumed that individual performer base potential maps (m1 to m3) corresponding to three performers are generated using the number of the performers=3, and the area setting of a certain stage position (x1, y1) at a certain time tx is set as follows.

Numerical value of a map m1=5 (travel caution area)

Numerical value of a map m2=5 (travel caution area)

Numerical value of a map m3=0 (travel allowance area)

In this case, the addition value is 5+5+0=10.

Such addition processing is performed for all the maps. Note that the maps are time-series data, that is, the processing is performed for all stage positions of the maps at all times.

(Step S108)

Next, in step S108, the data processing unit of the information processing device 100 resets the area division on the basis of the addition values corresponding to the areas of the potential maps of all the performers 1 to na.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S109)

Next, in step S109, the data processing unit of the information processing device 100 outputs a potential map in which the area division is reset in step S108 to the potential map combination unit 130 as a "performer base potential map".

The detailed sequence of generation processing of the map a=performer base potential map performed by the individual potential map generation unit 120 has been described above.

By this processing, the map a=performer base potential map that is a time-series map in which each area (travel prohibition area, travel caution area, and travel allowance area) is dynamically changed according to the performer positions from the start to the end of the live concert (performance) is generated.

[3-(2) Generation Sequence of Map b "Lighting Base Potential Map" ]

Next, a generation sequence of the map b "lighting base potential map" performed by the individual potential map generation unit 120 of the information processing device 100 with reference to flowcharts illustrated in FIGS. 13 to 14.

Note that the processing according to the flowcharts illustrated in FIGS. 13 to 14 corresponds to a detailed sequence of generation processing of the map b=lighting base potential map that is the processing of step S12 performed by the individual potential map generation unit 120 described above with reference to FIG. 4.

That is, it is a detailed sequence of the generation processing of the map b=lighting base potential map that is a time-series map in which each area (travel prohibition area, travel caution area, and travel allowance area) is dynamically changed according to the lighting states (lighting positions, brightness, colors, and the like) from the start to the end of a live concert (performance).

Hereinafter, processing of each step of the flows illustrated in FIGS. 13 to 14 will be sequentially described.

(Step S121)

First, in step S121, the data processing unit (individual potential map generation unit 120) of the information processing device 100 acquires the number of lighting position division areas=nb during a live performance period of a live concert for which the lighting base potential map is to be generated.

This processing is performed, for example, as processing for acquisition from lighting control schedule data generated on the basis of a preset live concert program, that is, "B. stage lighting control schedule data 112" stored in the storage unit 110 of the information processing device 100 illustrated in FIG. 4.

(Step S122)

Next, in step S122, the data processing unit of the information processing device 100 selects one lighting position division area Q to be analyzed.

(Step S123)

Next, in step S123, the data processing unit of the information processing device 100 acquires time-series lighting brightness information from the start to the end of the live concert of the selected one lighting position division area Q to be analyzed.

This is also performed, for example, as processing for acquisition from the lighting control schedule data generated on the basis of the preset live concert program, that is, "B. stage lighting control schedule data 112" stored in the storage unit 110 of the information processing device 100 illustrated in FIG. 4.

(Step S124)

Next, in step S124, the data processing unit of the information processing device 100 generates a potential map based on the time-series lighting brightness data from the start to the end of the live concert of the selected one lighting position division area Q to be analyzed.

This is processing performed according to the processing described above with reference to FIGS. 4 and 7, and is performed as processing of determining three areas (travel prohibition area, travel caution area, and travel allowance area) according to the brightness of the lighting position division area Q at each time from the start to the end of the live concert, and arranging different colors in units of areas according to the determined areas.

Specifically, the following area setting and color setting are performed.

In a case where the brightness of the lighting position division area Q is equal to or greater than a defined threshold Thd1, red is set as a travel prohibition area.

In a case where the brightness of the lighting position division area Q is in the range of defined thresholds Thd1 to Thd2, yellow is set as a travel caution area.

In a case where the brightness of the lighting position division area Q is less than the defined threshold Thd2, blue is set as a travel allowance area.

A lighting brightness base potential map corresponding to one lighting position division area Q is generated by this processing.

(Step S125)

Next, in step S125, the data processing unit of the information processing device 100 determines the presence or absence of an analysis unprocessed lighting position division area.

That is, whether or not generation of lighting brightness base potential maps of all the number of lighting position division areas nb acquired in step S121 has been completed is determined.

In a case where there is an unprocessed lighting position division area, the determination in step S125 is Yes. In this case, the processing of step S122 and subsequent steps for the unprocessed lighting position division area is performed.

On the other hand, in a case where there is no unprocessed lighting position division area, that is, in a case where it is determined that generation of the lighting brightness base potential maps of all the number of lighting position division areas nb acquired in step S121 has been completed, the determination in step S125 is No. In this case, the processing proceeds to step S126.

(Step S126)

In a case where generation of all the lighting brightness base potential maps is completed, the data processing unit of the information processing device 100 performs the processing of step S126 and subsequent steps.

First, in step S126, one lighting position division area Q to be analyzed is selected.

(Step S127)

Next, in step S127, the data processing unit of the information processing device 100 acquires time-series lighting color information from the start to the end of the live concert of the selected one lighting position division area Q to be analyzed.

This is also performed, for example, as processing for acquisition from the lighting control schedule data generated on the basis of the preset live concert program, that is, "B. stage lighting control schedule data 112" stored in the storage unit 110 of the information processing device 100 illustrated in FIG. 4.

(Step S128)

Next, in step S128, the data processing unit of the information processing device 100 generates a potential map based on the time-series lighting color data from the start to the end of the live concert of the selected one lighting position division area Q to be analyzed.

This is processing performed according to the processing described above with reference to FIGS. 4 and 7, and is performed as processing of determining three areas (travel prohibition area, travel caution area, and travel allowance area) according to the lighting color of the lighting position division area Q at each time from the start to the end of the live concert, and arranging different colors in units of areas according to the determined areas.

Specifically, the following area setting and color setting are performed.

In a case where the lighting color of the lighting position division area Q is a color different from that of the image capturing robot, red is set as a travel prohibition area.

In a case where the lighting color of the lighting position division area Q is a color different from that of the image capturing robot and is not similar to that of the image capturing robot, yellow is set as a travel caution area.

In a case where the lighting color of the lighting position division area Q is a color similar to that of the image capturing robot, blue is set as a travel allowance area.

A lighting color base potential map corresponding to one lighting position division area Q is generated by this processing.

(Step S129)

Next, in step S129, the data processing unit of the information processing device 100 determines the presence or absence of an analysis unprocessed lighting position division area.

That is, whether or not generation of lighting color base potential maps of all the number of lighting position division areas nb acquired in step S121 has been completed is determined.

In a case where there is an unprocessed lighting position division area, the determination in step S129 is Yes. In this case, the processing of step S126 and subsequent steps for the unprocessed lighting position division area is performed.

On the other hand, in a case where there is no unprocessed lighting position division area, that is, in a case where it is determined that generation of the lighting color base potential maps of all the number of lighting position division areas nb acquired in step S121 has been completed, the determination in step S129 is No. In this case, the processing proceeds to step S131.

(Step S131)

In a case where generation of all the lighting color base potential maps is completed, the data processing unit of the information processing device 100 performs the processing of step S131 and subsequent steps.

In step S131, the data processing unit of the information processing device 100 quantifies setting areas of the lighting brightness base potential maps and the lighting color base potential maps. For example, travel prohibition area=10, travel caution area=5, travel allowance area=0

Such quantification is performed in units of areas.

(Step S132)

Next, in step S132, the data processing unit of the information processing device 100 adds numerical values corresponding to the setting areas of the lighting brightness base potential maps and the lighting color base potential maps for each and every area to calculate addition values corresponding to the areas.

For example, it is assumed that the area setting of a certain stage position (x1, y1) at a certain time tx is the following setting.

Numerical value of a lighting brightness base potential map m1=5 (travel caution area)

Numerical value of a lighting color base potential map m2=0 (travel allowance area)

In this case, the addition value is 5+0=5.

Such addition processing is performed for all the maps. Note that the maps are time-series data, that is, the processing is performed for all stage positions of the maps at all times.

(Step S133)

Next, in step S133, the data processing unit of the information processing device 100 resets the area division on the basis of the addition values corresponding to the areas of the lighting brightness base potential maps and the lighting color base potential maps.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S134)

Next, in step S134, the data processing unit of the information processing device 100 outputs a potential map in which the area division is reset in step S133 to the potential map combination unit 130 as a "lighting base potential map".

The detailed sequence of generation processing of the map b=lighting base potential map performed by the individual potential map generation unit 120 has been described above.

By this processing, the map b=lighting base potential map that is a time-series map in which each area (travel prohibition area, travel caution area, and travel allowance area) is dynamically changed according to the lighting states (lighting positions, brightness, colors, and the like) from the start to the end of the live concert (performance) is generated.

[3-(3) Generation Sequence of Map c "Object Base Potential Map" ]

First, a generation sequence of the map c "object base potential map" performed by the individual potential map generation unit 120 of the information processing device 100 with reference to a flowchart illustrated in FIG. 15.

Note that the processing according to the flowchart illustrated in FIG. 15 corresponds to a detailed sequence of generation processing of the map c=object base potential map that is the processing of step S13 performed by the individual potential map generation unit 120 described above with reference to FIG. 4.

That is, it is a detailed sequence of the generation processing of the map c=object base potential map that is a time-series map in which each area (travel prohibition area, travel caution area, and travel allowance area) is dynamically changed according to the on-stage object arrangement positions from the start to the end of a live concert (performance).

Note that the object is an object arranged on a stage and is a speaker, a monitor, a decorative object, or the like.

Hereinafter, processing of each step of the flow illustrated in FIG. 15 will be sequentially described.

(Step S151)

First, in step S151, the data processing unit (individual potential map generation unit 120) of the information processing device 100 acquires the number of objects=nc during a live performance period of a live concert for which the object base potential map is to be generated.

This is performed, for example, as processing for acquisition from on-stage object arrangement schedule data generated on the basis of a preset live concert program, that is, "C. on-stage object arrangement schedule data 113" stored in the storage unit 110 of the information processing device 100 illustrated in FIG. 4.

(Step S152)

Next, in step S152, the data processing unit of the information processing device 100 selects one object Ob to be analyzed.

(Step S153)

Next, in step S153, the data processing unit of the information processing device 100 acquires time-series arrangement data from the start to the end of the live concert of the object Ob to be analyzed.

This processing is also performed, for example, as processing for acquisition from the on-stage object arrangement schedule data generated on the basis of the preset live concert program, that is, "C. on-stage object arrangement schedule data 113" stored in the storage unit 110 of the information processing device 100 illustrated in FIG. 4.

(Step S154)

Next, in step S154, the data processing unit of the information processing device 100 generates a potential map based on the time-series arrangement data from the start to the end of the live concert of the object Ob to be analyzed.

This is processing performed according to the processing described above with reference to FIGS. 4 and 8, and is performed as processing of determining three areas (travel prohibition area, travel caution area, and travel allowance area) according to the distance from the arrangement position of the object Ob to be analyzed at each time from the start to the end of the live concert, and arranging different colors in units of areas according to the determined areas.

Specifically, the following area setting and color setting are performed.

The short distance position of the arrangement position of the object Ob is set in red as a travel prohibition area.

The middle distance position of the arrangement position of the object Ob is set in yellow as a travel caution area.

The far distance position of the arrangement position of the object Ob is set in blue as a travel allowance area.

An object base potential map corresponding to one object Ob to be analyzed is generated by this processing.

(Step S155)

Next, in step S155, the data processing unit of the information processing device 100 determines the presence or absence of an analysis unprocessed object.

That is, whether or not generation of object base potential maps of all the number of objects nc acquired in step S151 has been completed is determined.

In a case where there is an unprocessed object, the determination in step S155 is Yes. In this case, the processing of step S152 and subsequent steps for the unprocessed object is performed.

On the other hand, in a case where there is no unprocessed object, that is, in a case where it is determined that generation of the object base potential maps of all the number of objects nc acquired in step S151 has been completed, the determination in step S155 is No. In this case, the processing proceeds to step S156.

(Step S156)

In a case where generation of all the object base potential maps is completed, the data processing unit of the information processing device 100 performs the processing of step S156 and subsequent steps.

First, in step S156, setting areas of each of the nc potential maps corresponding to individual objects corresponding to all the objects 1 to nc are quantified. For example, travel prohibition area=10, travel caution area=5, travel allowance area=0

Such quantification is performed in units of areas.

(Step S157)

Next, in step S157, the data processing unit of the information processing device 100 adds numerical values corresponding to the areas of the potential maps of all the objects 1 to nc for each and every area to calculate addition values corresponding to the areas.

For example, it is assumed that individual object base potential maps (m1 to m3) corresponding to three objects are generated using the number of the objects=3, and the area setting of a certain stage position (x1, y1) at a certain time tx is set as follows.

Numerical value of a map m1=5 (travel caution area)

Numerical value of a map m2=5 (travel caution area)

Numerical value of a map m3=0 (travel allowance area)

In this case, the addition value is 5+5+0=10.

Such addition processing is performed for all the maps. Note that the maps are time-series data, that is, the processing is performed for all stage positions of the maps at all times.

(Step S158)

Next, in step S158, the data processing unit of the information processing device 100 resets the area division on the basis of the addition values corresponding to the areas of the potential maps of all the objects 1 to nc.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S159)

Next, in step S159, the data processing unit of the information processing device 100 outputs a potential map in which the area division is reset in step S158 to the potential map combination unit 130 as an "object base potential map".

The detailed sequence of generation processing of the map c=object base potential map performed by the individual potential map generation unit 120 has been described above.

By this processing, the map c=object base potential map that is a time-series map in which each area (travel prohibition area, travel caution area, and travel allowance area) is dynamically changed according to the object arrangement positions from the start to the end of the live concert (performance) is generated.

[3-(4) Generation Sequence of Pre-Generated Potential Map Obtained by Combining Individual Potential Maps]

Next, a generation sequence of the pre-generated potential map performed by the potential map combination unit 130 of the information processing device 100 with reference to a flowchart illustrated in FIG. 16.

As described above with reference to FIG. 4, the potential map combination unit 130 combines three individual potential maps generated by the individual potential map generation unit 120, that is, a map a=performer base potential map, a map b=lighting base potential map, and a map c=object base potential map to generate a pre-generated potential map that is combination data reflecting all of time-series data of the three potential maps.

The flowchart illustrated in FIG. 16 is a generation sequence of a pre-generated potential map performed by the potential map combination unit 130. Hereinafter, processing of each step of the flow illustrated in FIG. 16 will be sequentially described.

(Step S171)

First, in step S171, the data processing unit (potential map combination unit 130) of the information processing device 100 illustrated in FIG. 4 quantifies setting areas of each of three individual potential maps generated by the individual potential map generation unit 120, that is, a map a=performer base potential map, a map b=lighting base potential map, and a map c=object base potential map. For example, travel prohibition area=10, travel caution area=5, travel allowance area=0

Such quantification is performed in units of areas.

(Step S172)

Next, in step S172, the data processing unit of the information processing device 100 adds numerical values corresponding to the setting areas of each of the three individual potential maps, that is, the map a=performer base potential map, the map b=lighting base potential map, and the map c=object base potential map for each and every area to calculate addition values corresponding to the areas.

For example, it is assumed that the area setting of a certain stage position (x1, y1) at a certain time tx is the following setting.

Numerical value of the map a=performer base potential map=5 (travel caution area)

Numerical value of the map b=lighting base potential map=0 (travel allowance area)

Numerical value of the map c=object base potential map=5 (travel caution area)

In this case, the addition value is 5+0+5=10.

Such addition processing is performed for all the maps. Note that the maps are time-series data, that is, the processing is performed for all stage positions of the maps at all times.

(Step S173)

Next, in step S173, the data processing unit of the information processing device 100 resets the area division on the basis of the addition values corresponding to the areas of the three individual potential maps, that is, the map a=performer base potential map, the map b=lighting base potential map, and the map c=object base potential map.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S174)

Next, in step S174, the data processing unit of the information processing device 100 generates a potential map in which the area division is reset in step S173 as a combination map, that is, a "pre-generated potential map".

The detailed sequence of the generation sequence of the pre-generated potential map 150 performed by the potential map combination unit 130 has been described above.

As described above, the potential map combination unit 130 performs the processing of combining three individual potential maps generated by the individual potential map generation unit 120, that is, a map a=performer base potential map, a map b=lighting base potential map, and a map c=object base potential map to generate the pre-generated potential map 150.

The pre-generated potential map 150 generated by the potential map combination unit 130 is provided to the traveling route generation unit 160, and the traveling route generation unit 160 determines a traveling route of the image capturing robot 50 from the start to the end of a live concert (performance) on the basis of the pre-generated potential map 150.

That is, as described above with reference to FIG. 10, the traveling route generation unit 160 inputs the pre-generated potential map 150 generated by the potential map combination unit 130, and generates traveling route information 165 in which a route in which the image capturing robot 50 selects and travels in an area that does not collide with a performer or an object on the stage from the start to the end of the live concert (performance) and is not conspicuous by the lightings is set.

For example, a traveling route is generated in which travel is performed only in a traveling allowance area in the pre-generated potential map 150.

The generated traveling route is provided to a travel control unit 170 that performs travel control of the image capturing robot 50, and the travel control unit 170 causes the image capturing robot 50 to travel according to the generated traveling route information 165.

As described above, the image capturing robot 50 is caused to travel according to the traveling route information 165 generated using the pre-generated potential map 150, thereby enabling the image capturing robot 50 to select and travel in an area that does not collide with a performer or an object on the stage from the start to the end of a live concert (performance) and is not conspicuous by the lightings.

Note that a traveling route of the image capturing robot 50 generated using the pre-generated potential map 150 can be displayed as a simulation image on a display unit of the information processing device 100, for example.

The data processing unit of the information processing device 100 generates simulation data for displaying a traveling schedule route of the image capturing robot 50 from the start to the end of the live concert on the basis of the traveling route information 165 generated using the generated pre-generated potential map 150. A specific display example of the simulation data is illustrated in FIG. 17.

Figure 17:
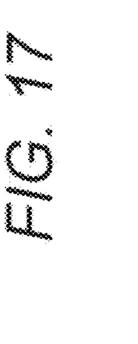
FIG. 17 is a diagram illustrating an example of a simulation image generated by the information processing device according to the present disclosure.

A user such as a robot control operator or the like can confirm a traveling position of the image capturing robot 50 at each time from the start (ts) to the end (te) of a live concert by performing an operation of moving a slider to the left and right as illustrated in FIG. 17.

FIG. 17 illustrates an example of display data indicating traveling positions of the image capturing robot 50 at the time t3 and the time t4 as a display example of the simulation data.

A user such as a robot control operator or the like can confirm a traveling route generated using the generated pre-generated potential map 150 by referring to the simulation data.

4. (Example 2) Details of Configuration and Processing of Information Processing Device for Creating Map in Consideration of Lines-of-Sight of Audience and Line-of-Sight of Television Camera on Audience Seat Side Next, as Example 2 of the present disclosure, details of a configuration and processing of an information processing device for creating a map in consideration of lines-of-sight of an audience and a line-of-sight of a television camera on an audience seat side will be described.

Example 1 described above has been had a configuration in which the following three individual maps are generated and used in a case where a potential map for determining a traveling route of the image capturing robot 50 is generated.

Map a=performer base potential map,

Map b=lighting base potential map,

Map c=object base potential map

Example 1 described above has been had a configuration in which, after the three individual potential maps are individually generated, the three individual potential maps are combined to generate a pre-generated potential map, and a traveling route of the image capturing robot 50 is determined using the generated pre-generated potential map.

For example, a travel allowance area in the pre-generated potential map is selected, and a traveling route of the image capturing robot 50 is determined.

Example 2 described below is an example in which, in addition to the processing of Example 1 described above, a fourth individual potential map is generated in consideration of lines-of-sight of an audience and a line-of-sight of a television camera on an audience seat side, and a pre-generated potential map is generated in consideration of the fourth individual potential map.

The lines-of-sight of the audience and the line-of-sight of the television camera on the audience seat side considered in present Example 2 will be described with reference to FIG. 18.

Figure 18:
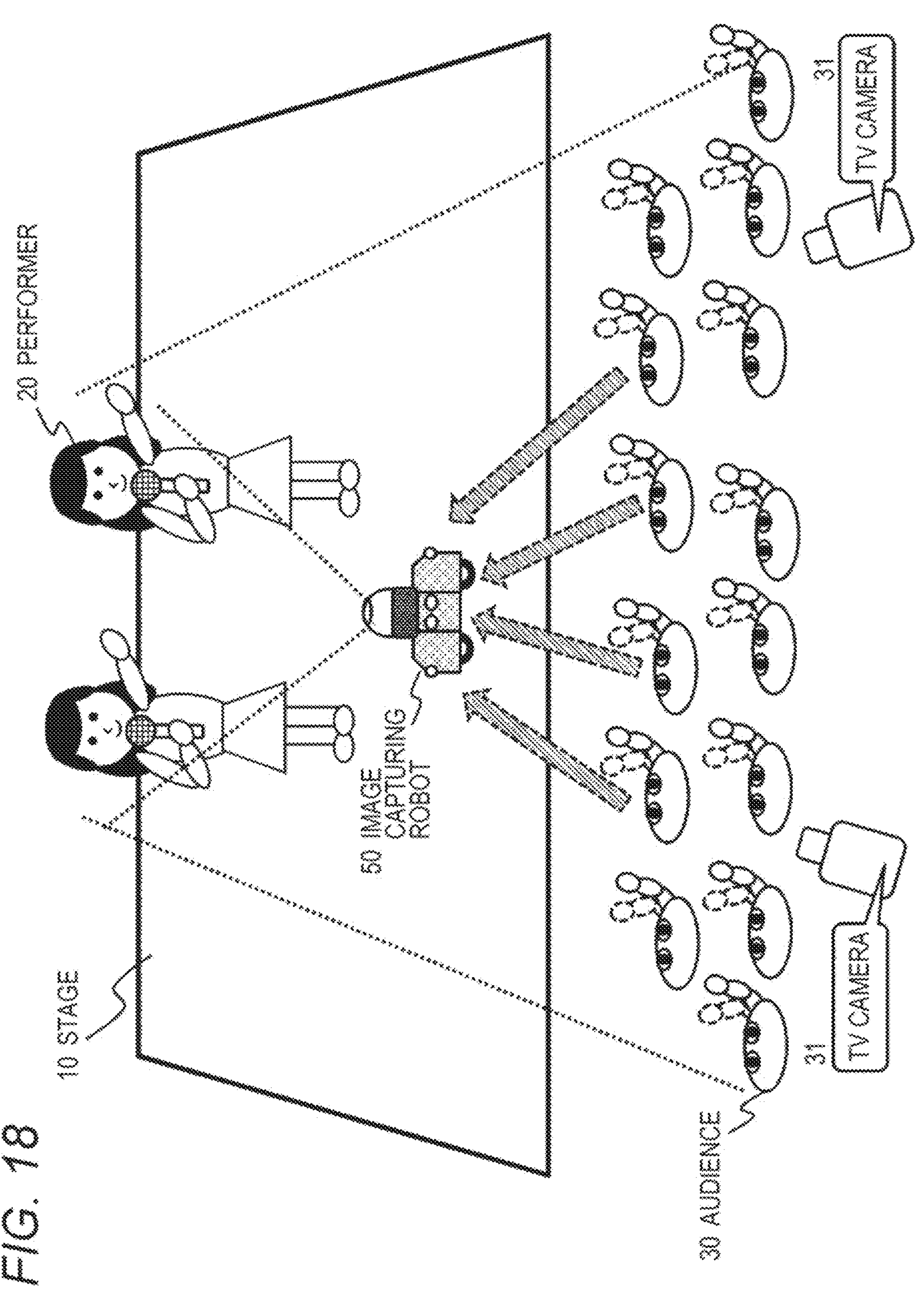
FIG. 18 is a diagram describing processing according to Example 2 of the present disclosure.

Similarly to the image capturing robot 50 illustrated in FIG. 1, an image capturing robot 50 illustrated in FIG. 18 is a mobile device on which a camera is mounted, that is, a traveling robot, and moves around on a stage and captures a performance of performers 20 from various angles.

However, as illustrated in FIG. 18, in a case where the image capturing robot 50 captures an image of the performers 20 from the front, for example, there is a case where the image capturing robot 50 enters between an audience 30 or TV cameras 31 on the audience seat side and the performers 20.

In such a state, even if the audience 30 directs the lines-of-sight in the direction of the performers 20, the image capturing robot 50 enters the field of view, and there occurs an issue that seeing the performers 20 is difficult.

This similarly applies to the TV cameras 31 on the audience seat side, and even if the TV cameras 31 turn the capturing directions (lines-of-sight) in the direction of the performers in order to capture the performers 20, the image capturing robot 50 enters images obtained by capturing, which causes an issue of hindering the capturing of the performers 20.

Example 2 below is an example for solving such an issue.

Figure 19:
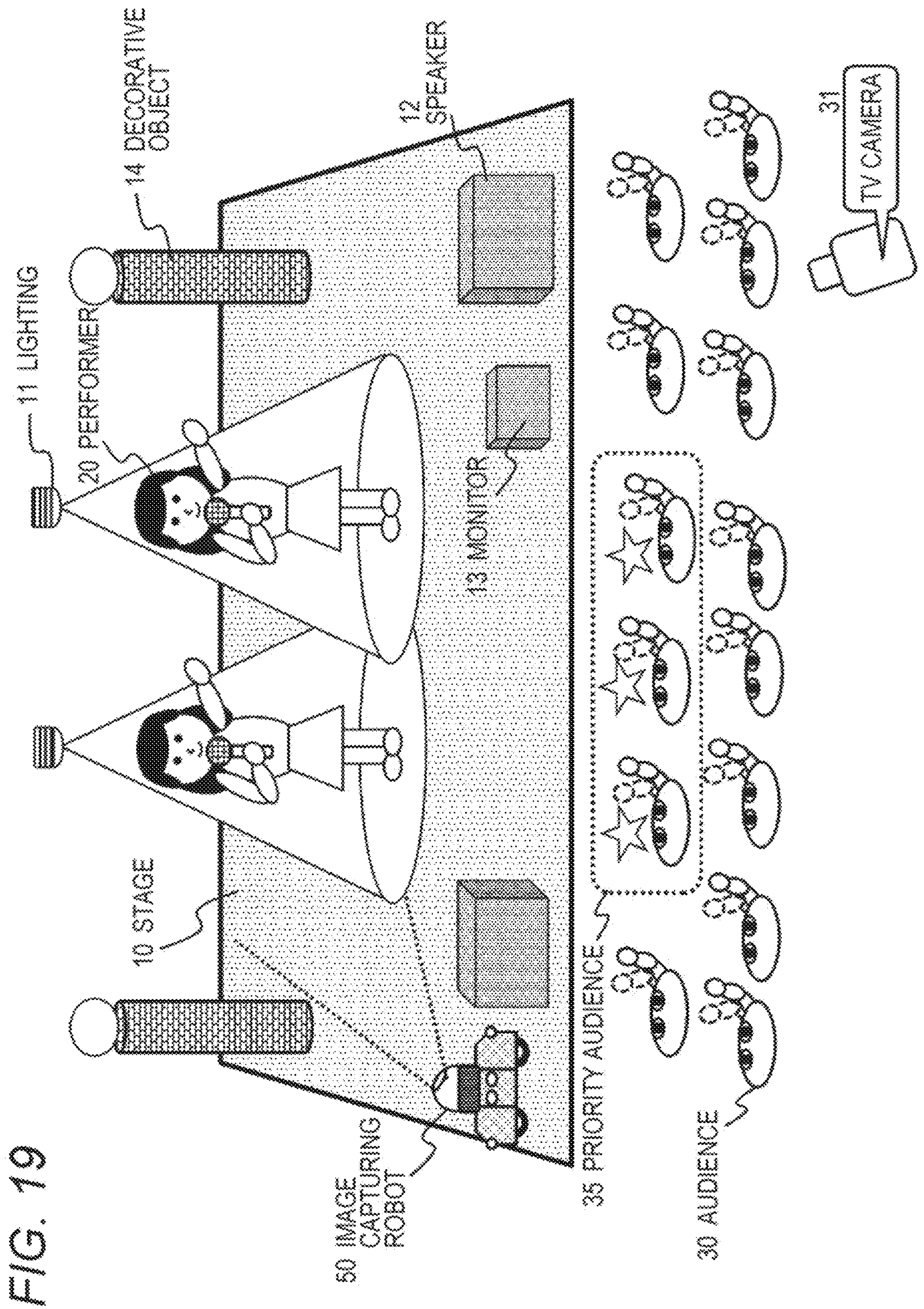
FIG. 19 is a diagram describing the processing according to Example 2 of the present disclosure.

FIG. 19 illustrates an example of a live concert venue where processing of present Example 2 is performed.

As illustrated in FIG. 19, a speaker 12, a monitor 13, and decorative objects 14 of various types are placed on the stage 10 on which the live concert is actually performed, and the performers 20 are also irradiated with lightings 11.

The performers 20 move around on the stage in accordance with the progress of the live concert, and the positions, brightness, and colors of the lightings 11 also change in accordance with this movement. Furthermore, the decorative objects 14 are variously replaced.

Furthermore, as illustrated in FIG. 19, there is the large audience 30 on the audience seat side, and a TV camera 31 is also arranged and captures a live concert of the performers 20.

In present Example 2, a potential map is generated in consideration of the viewpoint positions of a part of the audience 30, that is, a priority audience 35 illustrated in the figure, and the viewpoint position of the TV camera 31.

In a case where the potential map is generated in consideration of the viewpoint positions of all the audience, a potential map in which the entire stage is set as a travel prohibition area is generated, and a travel allowance area of the image capturing robot 50 almost disappears, and accordingly, processing in consideration of the viewpoint positions of a part that is the priority audience 35 is performed.

The priority audience 35 illustrated in the figure is, for example, seats secured as related person seats, and is reserved seats secured as reserved seats of an important audience.

In present Example 2, a potential map is generated in consideration of the viewpoint positions of the priority audience 35, and the viewpoint position of the TV camera 31 in addition to the processing of Example 1 described above.

Details of present Example 2 will be described with reference to FIG. 20 and subsequent drawings.

FIG. 20 is a diagram illustrating a configuration example of an information processing device 100*b* according to Example 2 of the present disclosure.

Note that the information processing device 100*b* may be formed inside the mobile device that travels on a stage illustrated in FIGS. 1 to 3, that is, the image capturing robot 50 equipped with a camera, or may be a device capable of communicating with the image capturing robot 50 or a device independent of the image capturing robot 50.

The configuration of the information processing device 100*b* illustrated in FIG. 20 will be described.

As illustrated in FIG. 20, the information processing device 100*b* includes a storage unit 110, an individual potential map generation unit 120, a potential map combination unit 130, and a traveling route generation unit 160.

These basic configurations are the same as those of the information processing device 100 described above with reference to FIG. 4.

Note that the information processing device 100*b* illustrated in this FIG. 20 may also be formed inside the mobile device that travels on a stage illustrated in FIGS. 1 to 3, that is, the image capturing robot 50 equipped with a camera, or may be a device independent of the image capturing robot 50, such as a device capable of communicating with the image capturing robot 50 (server) or the like as described above with reference to FIG. 5.

The storage unit 110 stores the following four pieces of data.

A. performer action schedule data 111,

B. stage lighting control schedule data 112,

C. on-stage object arrangement schedule data 113,

D. priority audience, TV camera viewpoint position data 114

Note that these four pieces of schedule data are prepared in advance before the start of a live concert and stored in the storage unit 110. That is, the schedule data is schedule data prepared in advance according to a program such as a live concert progress table prepared before the start of a live concert.

The data A to C are the same data as the data described with reference to FIG. 4 in Example 1. That is, A. performer action schedule data 111 is time-series position data during a period of a live concert of a performer moving around on a stage. That is, the time-series position data of performers from the start to the end of a live concert (performance).

B. stage lighting control schedule data 112 is time-series data of lighting control information including lighting setting information such as lighting positions, brightness, colors, and the like of lightings from the start to the end of a live concert (performance).

C. on-stage object arrangement schedule data 113 is time-series data of on-stage object arrangement position information including the arrangement positions of on-stage objects from the start to the end of a live concert (performance).

Note that the on-stage objects include a speaker, a monitor, a decorative object, and the like arranged on a stage.

In present Example 2, in addition to the data A to C, the following data D is stored in the storage unit 110.

D. priority audience, TV camera viewpoint position data 114

D. priority audience, TV camera viewpoint position data 114 is data of the viewpoint positions of the priority audience and the viewpoint position of the TV camera on the audience seat side from the start to the end of the live concert (performance).

Note that, in a case where the viewpoint positions of the priority audience and the viewpoint position of the TV camera change to various positions from the start to the end of the live concert (performance), D. priority audience, TV camera viewpoint position data 114 is time-series data that is dynamically changed with the lapse of time.

However, in a case where the viewpoint positions of the priority audience and the viewpoint position of the TV camera are at the same positions from the start to the end of the live concert (performance), D. priority audience, TV camera viewpoint position data 114 can be one piece of fixed data.

The stored data A to D in the storage unit 110 is used in the individual potential map generation unit 120.

The individual potential map generation unit 120 generates the following four types of individual potential maps individually using the four types of data A, B, C, and D described above.

Map a=performer base potential map,

Map b=lighting base potential map,

Map c=object base potential map,

Map d=priority audience, TV camera viewpoint position base potential map

The maps a to c are the individual potential maps described in Example 1.

The map a=performer base potential map is a time-series map in which each area (travel prohibition area, travel caution area, and travel allowance area) is dynamically changed according to the performer positions from the start to the end of a live concert (performance).

The map b=lighting base potential map is a time-series map in which each area (travel prohibition area, travel caution area, and travel allowance area) is dynamically changed according to the lighting states (lighting positions, brightness, colors, and the like) from the start to the end of a live concert (performance).

The map c=object base potential map is a time-series map in which each area (travel prohibition area, travel caution area, and travel allowance area) is dynamically changed according to the object arrangement positions from the start to the end of a live concert (performance).

The map d=priority audience, TV camera viewpoint position base potential map is a map in which each area (travel prohibition area, travel caution area, and travel allowance area) is set according to the priority audience, TV camera viewpoint positions on the audience seat side.

Note that, in a case where the viewpoint positions of the priority audience and the viewpoint position of the TV camera change to various positions from the start to the end of the live concert (performance), this map is time-series data in which setting areas (travel prohibition area, travel caution area, and travel allowance area) are dynamically changed with the lapse of time.

However, in a case where the viewpoint positions of the priority audience and the viewpoint position of the TV camera are at the same positions from the start to the end of the live concert (performance), this map is one map in which the setting areas (travel prohibition area, travel caution area, and travel allowance area) are not dynamically changed with the lapse of time.

In present Example 2, the individual potential map generation unit 120 generates the following four maps in steps S11 to S14 illustrated in FIG. 20. That is, in step S11, a map a=performer base potential map is generated.

In step S12, a map b=lighting base potential map is generated.

In step S13, a map c=object base potential map is generated.

In step S14, a map d=priority audience, TV camera viewpoint position base potential map is generated.

As illustrated in FIG. 20, in step S14, the individual potential map generation unit 120 generates a map d=priority audience, TV camera viewpoint position base potential map obtained by classifying ranges from short distance positions to far distance positions of straight lines connecting the priority audience viewpoint positions and the viewpoint position of the TV camera to the center position of the stage into a travel prohibition area (red), a travel caution area (yellow), and a travel allowance area (blue).

FIG. 21 illustrates a specific example of a "map d=priority audience, TV camera viewpoint position base potential map" generated by the individual potential map generation unit 120.

The "map d=priority audience, TV camera viewpoint position base potential map" is a map in which each area (travel prohibition area, travel caution area, and travel allowance area) is set according to the priority audience, TV camera viewpoint positions on the audience seat side.

As illustrated in FIG. 21, the map is generated as a map obtained by classifying ranges from short distance positions to far distance positions of straight lines connecting the priority audience viewpoints and the TV camera viewpoint to the center of the stage into a travel prohibition area (red), a travel caution area (yellow), and a travel allowance area (blue).

Note that, as described above, there are both a case where the "map d=priority audience, TV camera viewpoint position base potential map" is a time-series map in which setting areas (travel prohibition area, travel caution area, and travel allowance area) are dynamically changed and a case where the map is one fixed map in which the setting areas are not changed.

In this manner, the individual potential map generation unit 120 generates the following four individual potential maps.

Map a=performer base potential map,

Map b=lighting base potential map,

Map c=object base potential map,

Map d=priority audience, TV camera viewpoint position base potential map

These four individual potential maps generated by the individual potential map generation unit 120 are input to the potential map combination unit 130.

The potential map combination unit 130 performs processing of combining the four individual potential maps generated by the individual potential map generation unit 120 to generate a pre-generated potential map b,150*b*.

Note that the pre-generated potential map b,150*b* is also a time-series map in which each area (travel prohibition area, travel caution area, and travel allowance area) is dynamically changed from the start to the end of a live concert (performance).

The "pre-generated potential map b" generated in present Example 2 is a map in which a travel prohibition area, a travel caution area, and a travel allowance area are determined in consideration of all the performer positions, the lighting states (lighting positions, brightness, colors), the object arrangement positions, and further the priority audience viewpoints and the TV camera viewpoint, and the following different colors are arranged in units of the determined areas.

A travel prohibition area is set to red.

A travel caution area is set to yellow.

A travel allowance area is set to blue.

The pre-generated potential map b,150*b* generated by the potential map combination unit 130 is provided to the traveling route generation unit 160, and the traveling route generation unit 160 determines a traveling route of the image capturing robot 50 from the start to the end of a live concert (performance) on the basis of the pre-generated potential map b,150*b*.

The traveling route generation unit 160 inputs the pre-generated potential map b,150*b* generated by the potential map combination unit 130, and generates traveling route information 165 in which a route in which the image capturing robot 50 selects and travels in an area that does not collide with a performer or an object on the stage from the start to the end of a live concert (performance) and is not conspicuous by the lightings and further an area that does not interfere with the lines-of-sight of the priority audience 35 or the capturing of the TV camera 31 is set.

For example, the traveling route generation unit 160 generates a traveling route in which travel is performed only in a traveling allowance area in the pre-generated potential map b,150*b*.

The generated traveling route is provided to a travel control unit 170 that performs travel control of the image capturing robot 50, and the travel control unit 170 causes the image capturing robot 50 to travel according to the generated traveling route information 165.

As described above, the image capturing robot 50 is caused to travel according to the traveling route information 165 generated using the pre-generated potential map b,150*b* generated in present Example 2, thereby enabling the image capturing robot 50 to select and travel in an area that does not collide with a performer or an object on the stage from the start to the end of a live concert (performance) and is not conspicuous by the lightings and further an area that does not interfere with the lines-of-sight of the priority audience 35 or the capturing of the TV camera 31.

Next, a generation sequence of the map d "priority audience, TV camera viewpoint position base potential map" performed by the individual potential map generation unit 120 of the information processing device 100 with reference to the flow illustrated in FIG. 22.

Note that the processing according to the flowchart illustrated in FIG. 22 corresponds to a detailed sequence of the processing of step S14 performed by the individual potential map generation unit 120 described above with reference to FIG. 20.

That is, it is a detailed sequence of the generation processing of the map in which each area (travel prohibition area, travel caution area, and travel allowance area) is set according to the viewpoints of the priority audience and the TV camera from the start to the end of a live concert (performance).

Hereinafter, processing of each step of the flow illustrated in FIG. 22 will be sequentially described.

(Step S201)

First, in step S201, a data processing unit (individual potential map generation unit 120) of the information processing device 100 acquires the number of viewpoints of the priority audience and the TV camera=nd during a live concert performance period of a live concert for which the priority audience, TV camera viewpoint base potential map is to be generated.

This is performed, for example, as processing for acquisition from priority audience, TV camera viewpoint position data generated on the basis of a preset live concert program, that is, "D. priority audience, TV camera viewpoint viewpoint position data 114" stored in the storage unit 110 of the information processing device 100 illustrated in FIG. 20.

(Step S202)

Next, in step S202, the data processing unit of the information processing device 100 selects one priority audience viewpoint or TV camera viewpoint S to be analyzed.

(Step S203)

Next, in step S203, the data processing unit of the information processing device 100 acquires time-series position data from the start to the end of the live concert of the priority audience viewpoint or TV camera viewpoint S to be analyzed.

This processing is also performed, for example, as processing for acquisition from the priority audience viewpoint, TV camera viewpoint position data generated on the basis of the preset live concert program, that is, "D. priority audience, TV camera viewpoint viewpoint position data 114" stored in the storage unit 110 of the information processing device 100 illustrated in FIG. 4.

Note that, as described above, the time-series position data from the start to the end of the live concert of the priority audience viewpoint or TV camera viewpoint S may be data that is dynamically changed with the lapse of time, or may be one piece of fixed data that is not changed.

(Step S204)

Next, in step S204, the data processing unit of the information processing device 100 generates a potential map based on the position data from the start to the end of the live concert of the selected priority audience viewpoint or TV camera viewpoint S to be analyzed.

For example, the map as described above with reference to FIG. 21, that is, is a map in which each area (travel prohibition area, travel caution area, and travel allowance area) is set according to the priority audience, TV camera viewpoint position on the audience seat side is generated.

Note that, as described above, there are both a case where the "map d=priority audience, TV camera viewpoint position base potential map" is a time-series map in which setting areas (travel prohibition area, travel caution area, and travel allowance area) are dynamically changed and a case where the map is one fixed map in which the setting areas are not changed.

By this processing, the priority audience, TV camera viewpoint base potential map corresponding to one priority audience viewpoint or TV camera viewpoint S to be analyzed is generated.

(Step S205)

Next, in step S205, the data processing unit of the information processing device 100 determines the presence or absence of an analysis unprocessed priority audience viewpoint or TV camera viewpoint.

That is, whether or not generation of priority audience, TV camera viewpoint base potential maps of all the number of viewpoints of the priority audience and the TV camera nd acquired in step S201 has been completed is determined.

In a case where there is an unprocessed priority audience viewpoint or TV camera viewpoint, the determination in step S205 is Yes. In this case, the processing of step S202 and subsequent steps for the unprocessed priority audience viewpoint or TV camera viewpoint is performed.

On the other hand, in a case where there is no unprocessed priority audience viewpoint or TV camera viewpoint, that is, in a case where it is determined that generation of the priority audience, TV camera viewpoint base potential maps of all the number of viewpoints of the priority audience and the TV camera nd acquired in step S201 has been completed, the determination in step S205 is No. In this case, the processing proceeds to step S206.

(Step S206)

In a case where generation of all the priority audience, TV camera viewpoint base potential maps is completed, the data processing unit of the information processing device 100 performs the processing of step S206 and subsequent steps.

First, in step S206, setting areas of each of the nd potential maps corresponding to the individual priority audience viewpoints or TV camera viewpoint corresponding to all the priority audience viewpoints or TV camera viewpoint 1 to nd are quantified. For example, travel prohibition area=10, travel caution area=5, travel allowance area=0

Such quantification is performed in units of areas.

(Step S207)

Next, in step S207, the data processing unit of the information processing device 100 adds numerical values corresponding to the areas of the potential maps of all the priority audience viewpoints or TV camera viewpoint 1 to nd for each and every area to calculate addition values corresponding to the areas.

For example, it is assumed that individual priority audience, TV camera viewpoint base potential maps (m1 to m3) corresponding to three priority audience viewpoints or TV camera viewpoint are generated using the total number of viewpoints of the priority audience and TV camera=3, and the area setting of a certain stage position (x1, y1) at a certain time tx is set as follows.

Numerical value of a map m1=5 (travel caution area)

Numerical value of a map m2=5 (travel caution area)

Numerical value of a map m3=0 (travel allowance area)

In this case, the addition value is 5+5+0=10.

Such addition processing is performed for all the maps. Note that, in a case where the map is time-series data, the processing is performed for all stage positions of the map at all times.

(Step S208)

Next, in step S208, the data processing unit of the information processing device 100 resets the area division on the basis of the addition values corresponding to the areas of the potential maps of all the priority audience viewpoints or TV camera viewpoint 1 to nd.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S209)

Next, in step S209, the data processing unit of the information processing device 100 outputs a potential map in which the area division is reset in step S208 to the potential map combination unit 130 as a "priority audience, TV camera viewpoint base potential map".

The detailed sequence of generation processing of the map a=priority audience, TV camera viewpoint base potential map performed by the individual potential map generation unit 120 has been described above.

By this processing, a time-series map in which each area (travel prohibition area, travel caution area, and travel allowance area) is dynamically changed according to the priority audience viewpoint or TV camera viewpoint position from the start to the end of a live concert (performance), or the map a=priority audience, TV camera viewpoint base potential map that does not dynamically changed is generated.

Next, a generation sequence of the pre-generated potential map performed by the potential map combination unit 130 of the information processing device 100 with reference to a flowchart illustrated in FIG. 23.

As described above with reference to FIG. 20, the potential map combination unit 130 combines four individual potential maps generated by the individual potential map generation unit 120, that is, a map a=performer base potential map, a map b=lighting base potential map, a map c=object base potential map, and a map d=priority audience, TV camera viewpoint position base potential map to generate a pre-generated potential map b that is combination data reflecting all of the four potential maps.

The flowchart illustrated in FIG. 23 is a generation sequence of a pre-generated potential map b performed by the potential map combination unit 130. Hereinafter, processing of each step of the flow illustrated in FIG. 23 will be sequentially described.

(Step S221)

First, in step S221, the data processing unit (potential map combination unit 130) of the information processing device 100 illustrated in FIG. 20 quantifies setting areas of each of four individual potential maps generated by the individual potential map generation unit 120, that is, a map a=performer base potential map, a map b=lighting base potential map, a map c=object base potential map, and a map d=priority audience, TV camera viewpoint position base potential map. For example, travel prohibition area=10, travel caution area=5, travel allowance area=0

Such quantification is performed in units of areas.

(Step S222)

Next, in step S222, the data processing unit of the information processing device 100 adds numerical values corresponding to the setting areas of each of the four individual potential maps, that is, the map a=performer base potential map, the map b=lighting base potential map, the map c=object base potential map, and the map d=priority audience, TV camera viewpoint position base potential map for each and every area to calculate addition values corresponding to the areas.

For example, it is assumed that the area setting of a certain stage position (x1, y1) at a certain time tx is the following setting.

Numerical value of the map a=performer base potential map=5 (travel caution area)

Numerical value of the map b=lighting base potential map=0 (travel allowance area)

Numerical value of the map c=object base potential map=5 (travel caution area)

Map d=priority audience, TV camera viewpoint position base potential map=5 (travel caution area)

In this case, the addition value is 5+0+5+5=15.

Such addition processing is performed for all the maps. Note that the maps are time-series data, that is, the processing is performed for all stage positions of the maps at all times.

(Step S223)

Next, in step S223, the data processing unit of the information processing device 100 resets the area division on the basis of the addition values corresponding to the areas of the four individual potential maps, that is, the map a=performer base potential map, the map b=lighting base potential map, the map c=object base potential map, and the map d=priority audience, TV camera viewpoint position base potential map.

For example, the areas are reset according to the following rules.

Addition value is 10 or more=travel prohibition area

Addition value is 5 or more=travel caution area

Addition value is less than 5=travel allowance area

For example, the areas are reset according to the rules described above.

(Step S224)

Next, in step S224, the data processing unit of the information processing device 100 generates a potential map in which the area division is reset in step S223 as a combination map, that is, a "pre-generated potential map b".

The detailed sequence of the generation sequence of the pre-generated potential map b,150*b* performed by the potential map combination unit 130 has been described above.

As described above, the potential map combination unit 130 performs the processing of combining four individual potential maps generated by the individual potential map generation unit 120, that is, a map a=performer base potential map, a map b=lighting base potential map, a map c=object base potential map, and a map d=priority audience, TV camera viewpoint position base potential map to generate the pre-generated potential map b,150*b*.

The pre-generated potential map b,150*b* generated by the potential map combination unit 130 is provided to the traveling route generation unit 160, and the traveling route generation unit 160 determines a traveling route of the image capturing robot 50 from the start to the end of a live concert (performance) on the basis of the pre-generated potential map 150.

That is, as described above with reference to FIG. 10, the traveling route generation unit 160 inputs the pre-generated potential map b,150*b* generated by the potential map combination unit 130, and generates traveling route information 165 in which a route in which the image capturing robot 50 selects and travels in an area that does not collide with a performer or an object on the stage from the start to the end of a live concert (performance) and is not conspicuous by the lightings and further an area that does not interfere with the visual field of the priority audience or the TV camera is set.

For example, a traveling route is generated in which travel is performed only in a traveling allowance area in the pre-generated potential map 150.

The generated traveling route is provided to a travel control unit 170 that performs travel control of the image capturing robot 50, and the travel control unit 170 causes the image capturing robot 50 to travel according to the generated traveling route information 165.

As described above, the image capturing robot 50 is caused to travel according to the traveling route information 165 generated using the pre-generated potential map 150, thereby enabling the image capturing robot 50 to select and travel in an area that does not collide with a performer or an object on the stage from the start to the end of a live concert (performance) and is not conspicuous by the lightings, the area being an area that does not interfere with the visual field of the priority audience or the TV camera.

5. (Example 3) Example of Generating Real-Time Data Reflecting Potential Map Using Information During Live Concert Performance Next, as Example 3, an example of generating a real-time data reflecting potential map using information during a live concert performance will be described.

In Examples 1 and 2 described above, a potential map has been generated using data that can be acquired at a phase before a live concert on the stage is started, that is, the following data stored in the storage unit 110 of the information processing device 100 illustrated in FIGS. 4 and 20.

A. performer action schedule data 111,

B. stage lighting control schedule data 112,

C. on-stage object arrangement schedule data 113,

D. priority audience, TV camera viewpoint position data 114

Each piece of the above data A to D used in Examples 1 and 2 is, for example, data generated on the assumption that a performer acts, lighting control is performed, and arrangement of objects is performed according to a program of a live concert.

However, in a case where the live concert is actually started, the movement of the performer, the lighting control, and the like different from the initial program of the live concert may be performed.

In such a case, in a case where the image capturing robot 50 is caused to travel using a pre-generated potential map generated on the basis of above-described Examples 1 and 2, there is a possibility that a situation in which the image capturing robot comes into contact with a performer occurs.

Example 3 described below prevents such a situation, and is an example in which real-time data of a time during which an actual live concert, that is, a performance of a performer is performed is acquired and a potential map is generated.

FIG. 24 illustrates a configuration example of an information processing device 200 of present Example 3.

As illustrated in FIG. 24, the information processing device 200 includes a real-time stage information acquisition unit 201, a real-time audience seat information acquisition unit 202, a real-time Internet information acquisition unit 203, a real-time stage information analysis unit 204, a storage unit 205, a pre-generated potential map correction unit 206, a real-time attention area analysis unit 207, and a real-time data reflecting potential map generation unit 208.

Note that the information processing device 200 illustrated in FIG. 24 may be, for example, formed inside the mobile device that travels on a stage illustrated in FIGS. 1 to 3, that is, the image capturing robot 50 equipped with a camera, or may be a device independent of the image capturing robot 50, such as a device capable of communicating with the image capturing robot 50 or the like.

FIG. 25 illustrates a configuration example of an information processing system in a case where the information processing device having the configuration illustrated in FIG. 24 is a device independent of the image capturing robot 50.

For example, as illustrated in FIG. 25, an information processing system 280 is constructed in which the information processing device (server) 200, the live concert venue information acquisition device 60, the image capturing robot 50 in the live concert venue, and an SNS server 290 are connected via a communication network.

The information processing device (server) 100 has the configuration illustrated in FIG. 4.

The live concert venue information acquisition device 60 includes a camera that captures an image of the live concert venue, a microphone that acquires audio information of the live concert venue, an illuminance meter that detects a lighting state, a color analysis device, and the like, and transmits information of an acquired image and the like to the information processing device (server) 200 via the communication network.

The information processing device (server) 200 analyzes information received from the live concert venue information acquisition device 60 and information acquired from the SNS server 290, and performs processing of generating a map for determining a traveling route of the image capturing robot 50 in the live concert venue (the map is a potential map), processing of determining a traveling route using the map, processing of generating travel control information of the image capturing robot 50 according to the determined traveling route, and the like.

Note that the SNS server 290 is a server that collects comment information including tweets and the like of users who are viewing a live concert on the Internet. The information processing device (server) 200 analyzes information acquired from the SNS server 290 to analyze an attention area and the like of users who are viewing a live concert via the Internet.

The information processing device (server) 200 further transmits the generated travel control information to the image capturing robot 50 via the communication network.

The image capturing robot 50 travels on the stage in accordance with the travel control information received from the information processing device (server) 100.

For example, processing using such an information processing system can be performed.

Hereinafter, the configuration and the processing of the information processing device 100 illustrated in FIG. 24 will be described.

Specifically, the real-time stage information acquisition unit 201 includes, for example, a camera, an illuminance meter, and the like, and acquires, in real time, information of a stage on which an actual live concert, that is, a performance by performers is performed.

As illustrated in the figure, the real-time stage information acquisition unit 201 acquires the following each piece of information as real-time data.

Performer positions 211,

Lighting states 212,

On-stage object positions 213,

An image capturing robot position 214

Note that the lighting states includes information of the positions of the stage irradiated with the lightings, the brightness of the lightings, and the colors of the lightings.

The real-time stage information acquisition unit 201 continuously acquires each piece of information of the performer positions 211, the lighting states 212, the on-stage object positions 213, and the image capturing robot position 214 as real-time data during the live concert performance period, and outputs the acquired data to the real-time stage information analysis unit 204.

The real-time stage information analysis unit 204 compares each piece of information of the performer positions 211, the lighting states 212, the on-stage object positions 213, and the image capturing robot position 214 input from the real-time stage information acquisition unit 201 with schedule data 231 based on the program of the live concert stored in the storage unit 205 in advance and a pre-generated potential map 150 generated according to Example 1 or Example 2 described above.

The schedule data 231 based on the program of the live concert stored in the storage unit 205 is data similar to the following each piece of information described above with reference to FIGS. 4 and 20.

A. performer action schedule data 111,

B. stage lighting control schedule data 112,

C. on-stage object arrangement schedule data 113

Each piece of the data are data generated in advance on the basis of the scheduled program of the live concert before the start of the live concert.

The real-time stage information analysis unit 204 compares each piece of information of the performer positions 211, the lighting states 212, the on-stage object positions 213, and the image capturing robot position 214 input from the real-time stage information acquisition unit 201 with the schedule data 231 based on the program of the live concert stored in advance in the storage unit 205, and confirms whether or not there is a difference.

In a case where there is no difference, even if the image capturing robot 50 is caused to travel according to a traveling route set using the pre-generated potential map 150 generated according to Example 1 or Example 2 described above, the image capturing robot 50 can travel without colliding with a performer or an object and without being conspicuous by the lightings.

However, in a case where there is a difference, if the image capturing robot 50 is caused to travel according to a traveling route set using the pre-generated potential map 150 generated according to Example 1 or Example 2 described above, there is a possibility that the image capturing robot 50 comes into contact with a performer or an object, or a possibility that travel conspicuous by the lightings is performed.

In a case where the real-time stage information analysis unit 204 detects a difference between each piece of information of the performer positions 211, the lighting states 212, the on-stage object positions 213, and the image capturing robot position 214 input from the real-time stage information acquisition unit 201 and the schedule data 231 based on the program of the live concert stored in the storage unit 205 in advance, the real-time stage information analysis unit 204 further determines whether or not there is an issue in travel of a traveling route according to the pre-generated potential map 150 generated according to Example 1 or Example 2 described above.

In a case where it is determined that there is an issue, that is, in a case where it is determined that there is a possibility of coming in contact with a performer or an object or a possibility of travel conspicuous by the lightings being performed in a case were the image capturing robot 50 is caused to travel according to a traveling route set using the pre-generated potential map 150, a request for correcting the pre-generated potential map 150 is output to the pre-potential map correction unit 206.

In a case where a request for correcting the pre-generated potential map is input from the real-time stage information analysis unit 204, the pre-potential map correction unit 206 corrects the pre-generated potential map 150 so as to reduce the possibility of coming into contact with a performer or an object and the possibility of travel conspicuous by the lightings being performed.

The pre-potential map correction unit 206 corrects the pre-generated potential map 150 to generate a real-time stage information reflecting potential map.

The real-time stage information reflecting potential map is a map in which each area (travel prohibition area, travel caution area, and travel allowance area) is set reflecting the real-time performer positions 211, the lighting states 212, the on-stage object positions 213, and the image capturing robot position 214 acquired by the real-time stage information acquisition unit 201.

A specific example of processing of generating the "real-time stage information reflecting potential map" performed by the pre-potential map correction unit 206 will be described with reference to FIG. 26.

Figure 26:
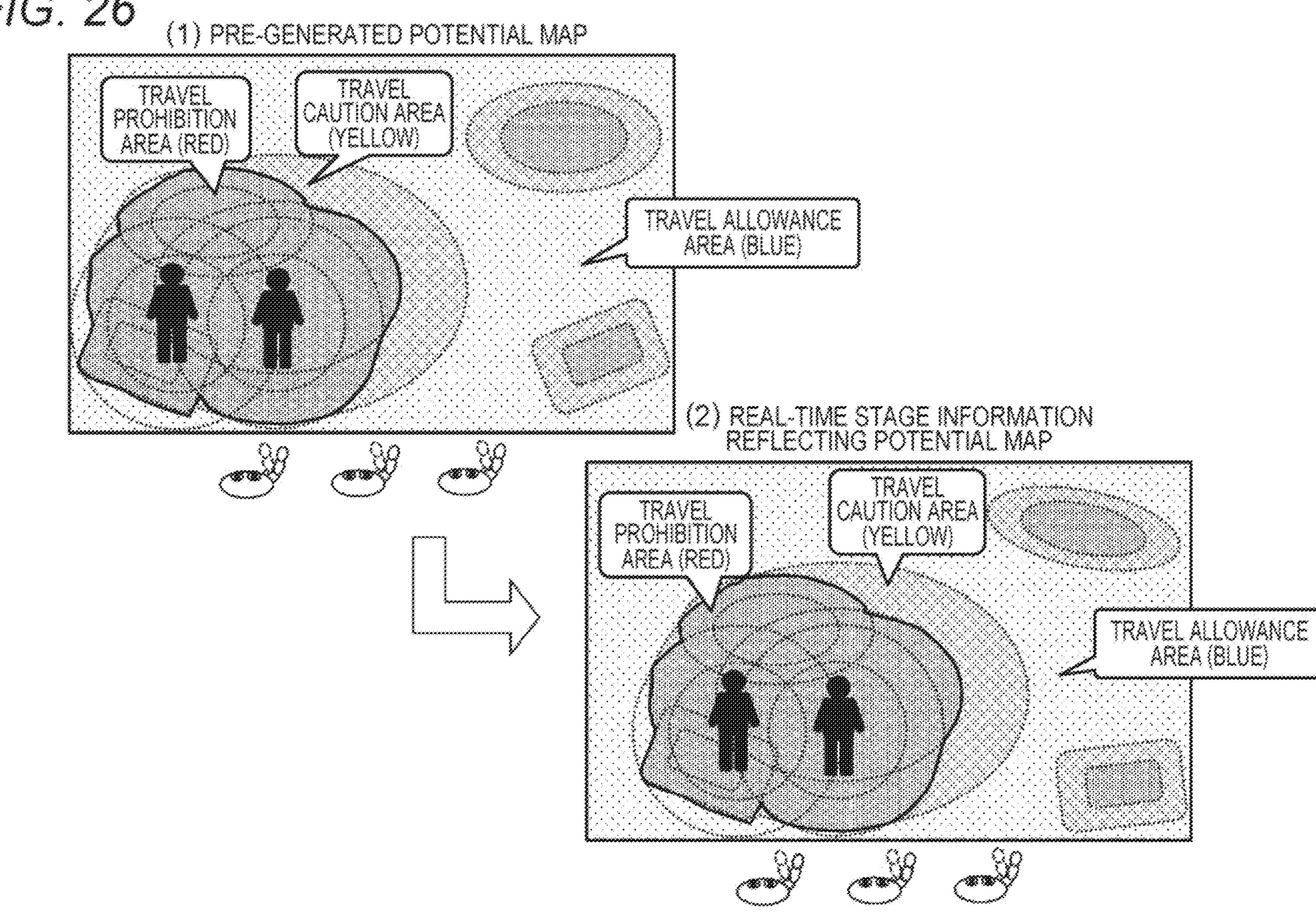
FIG. 26 is a diagram illustrating an example of potential maps generated in the information processing device according to Example 3 of the present disclosure.

FIG. 26 illustrates the following two potential maps.

(1) Pre-generated potential map (2) Real-time stage information reflecting potential map (1) Pre-generated potential map is the pre-generated potential map 150 generated according to Example 1 or Example 2 described above, and is a potential map stored in the storage unit 205 of the information processing device 200 illustrated in FIG. 24.

(2) Real-time stage information reflecting potential map is map generated by the pre-generated potential map 150 being corrected by the pre-potential map correction unit 206. That is, it is a map in which each area (travel prohibition area, travel caution area, and travel allowance area) is reset reflecting the real-time performer positions 211, the lighting states 212, the on-stage object positions 213, and the image capturing robot position 214 acquired by the real-time stage information acquisition unit 201.

In a case where (1) and (2) in FIG. 26 are compared, regarding the performer positions, for example, the performer positions in (1) and the performer positions in (2) are slightly different, and the performer positions in (2) are slightly shifted to the right side.

As described above, in an actual live concert, a state different from a schedule occurs.

The pre-potential map correction unit 206 corrects a pre-generated potential map using real-time stage information to generate a real-time stage information reflecting potential map.

The real-time stage information reflecting potential map generated by the pre-potential map correction unit 206 is a map generated reflecting the real-time performer positions, lighting states, and object positions, and is, for example, a map on which the following area setting is performed.

Travel allowance area (blue)=area far from the real-time performer positions or object positions and determined to be most inconspicuous on the basis of the real-time lighting states, Travel prohibition area (red)=area close to the real-time performer positions or object positions and determined to be conspicuous on the basis of the real-time lighting states, Travel caution area (yellow)=intermediate area between a travel allowance area (blue) and a travel prohibition area (red) described above, The real-time stage information reflecting potential map generated by the pre-potential map correction unit 206 is output to the real-time data reflecting potential map generation unit 208.

Specifically, the real-time audience seat information acquisition unit 202 includes, for example, a camera and the like, and acquires, in real time, information of audience seats in front of a stage on which an actual live concert, that is, a performance by performers is performed.

As illustrated in the figure, the real-time audience seat information acquisition unit 202 acquires the following each piece of information as real-time data.

Audience line-of-sight directions 215,

An audience seat side TV camera capturing direction 216,

The audience viewpoint positions 215 are line-of-sight directions of an audience in front of a stage where a live concert is performed. The audience seat side TV camera capturing direction 216 is a capturing direction of the TV camera in front of the stage where the live concert is performed.

These pieces of real-time information acquired by the real-time audience seat information acquisition unit 202 are input to the real-time attention area analysis unit 207.

Moreover, the real-time Internet information acquisition unit 203 includes, for example, a communication unit connected to a communication network such as the Internet or the like, acquires so-called SNS information 217 including tweets such as impressions and the like of many live concert viewers on the Internet, and inputs the acquired SNS information 217 to the real-time attention area analysis unit 207.

The real-time attention area analysis unit 207 analyzes the audience line-of-sight directions 215 and the audience seat side TV camera capturing direction 216 input from the real-time audience seat information acquisition unit 202 and the SNS information 217 input from the real-time Internet information acquisition unit 203, and analyzes where on the stage the audience is watching, where on the stage the TV camera is capturing, and where on the stage live concert viewers on the Internet are paying attention.

The real-time attention area analysis unit 207 estimates a current attention area on the stage on the basis of these analysis results, and outputs the estimated area to the real-time data reflecting potential map generation unit 208 as real-time attention area information 221 in which the estimated area is illustrated in a drawing.

The real-time data reflecting potential map generation unit 208 inputs the following each piece of data.

(1) "Real-time stage information reflecting potential map" generated by the pre-potential map correction unit 206

(2) Real-time attention area information 221 generated by the real-time attention area analysis unit 207

The real-time data reflecting potential map generation unit 208 inputs the each piece of data and generates a real-time data reflecting potential map 230 on the basis of the input data.

The real-time data reflecting potential map generation unit 208 sequentially performs following Processing 1 and 2.

(Processing 1) Generate a real-time attention area reflecting potential map reflecting a real-time attention area on the basis of the real-time attention area information 221 generated by the real-time attention area analysis unit 207

(Processing 2) The pre-potential map correction unit 206 combines the "real-time stage information reflecting potential map" in which each area (travel prohibition area, travel caution area, and travel allowance area) is set reflecting the real-time performer positions 211, the lighting states 212, the on-stage object positions 213, and the image capturing robot position 214 with the real-time attention area reflecting potential map generated in Processing 1 to generate the real-time data reflecting potential map 230.

Specific examples of these (Processing 1) and (Processing 2) will be described with reference to FIG. 27.

Figure 27:
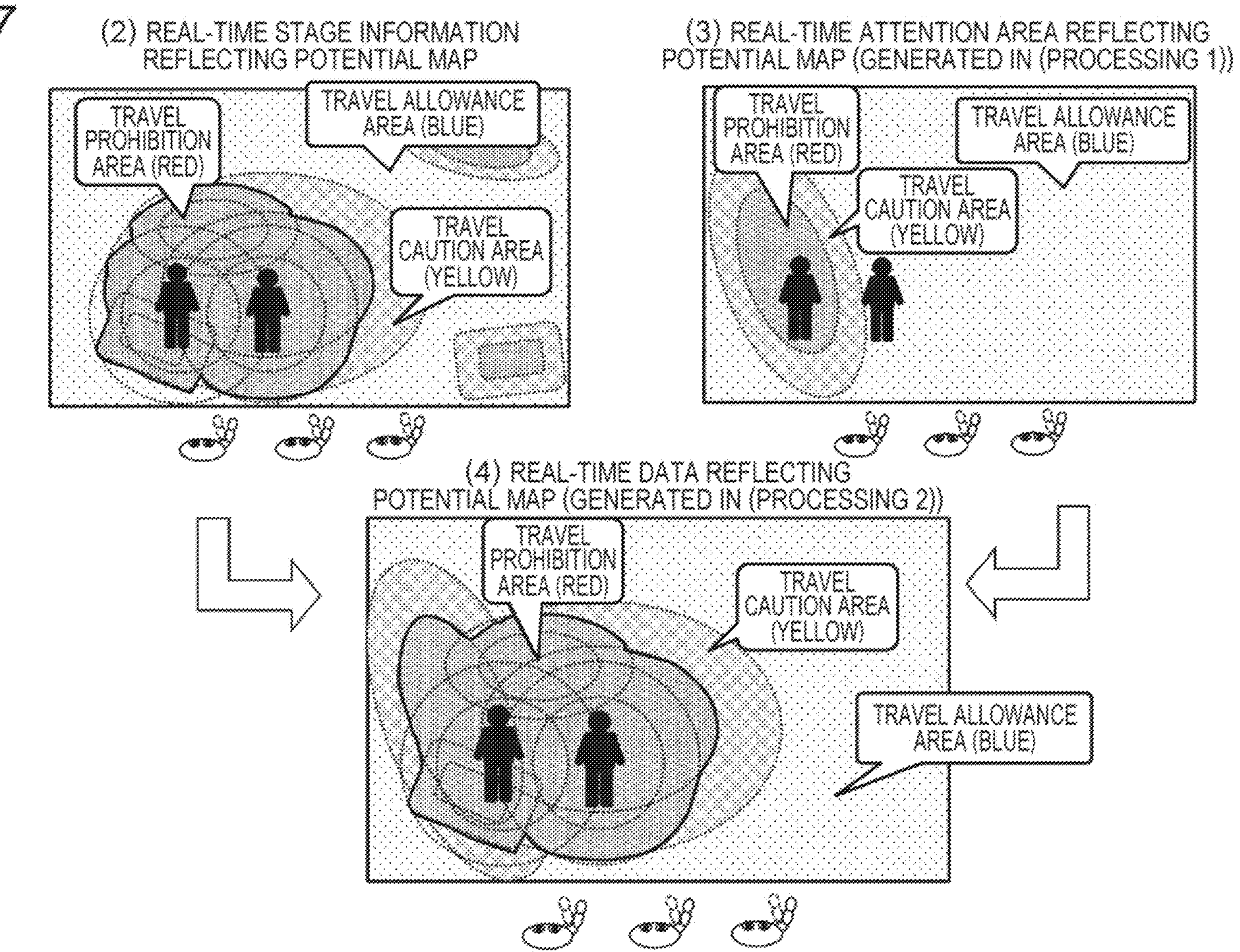
FIG. 27 is a diagram illustrating an example of potential maps generated in the information processing device according to Example 3 of the present disclosure.

FIG. 27 illustrates the following three potential maps.

(2) Real-time stage information reflecting potential map (3) Real-time attention area reflecting potential map (4) Real-time data reflecting potential map 230

(2) Real-time stage information reflecting potential map is the map described above with reference to FIG. 26 and is the "real-time stage information reflecting potential map" generated by the pre-potential map correction unit 206 using the real-time stage information.

(3) Real-time attention area reflecting potential map is a map generated by above (Processing 1) performed by the real-time data reflecting potential map generation unit 208, and is a potential map generated reflecting the real-time attention area on the basis of the real-time attention area information 221 generated by the real-time attention area analysis unit 207.

The real-time attention area reflecting potential map is a map generated reflecting a real-time audience, TV camera, and Internet information, and is a map on which the following area setting is performed.

Travel allowable area (blue)=non-attention area having the lowest attention degree on the basis of a real-time audience, TV camera, and Internet information, Travel prohibition area (red)=attention area having the highest attention degree on the basis of a real-time audience, TV camera, Internet information, Travel caution area (yellow)=intermediate area between a travel allowance area (blue) and a travel prohibition area (red) described above, (4) Real-time data reflecting potential map 230 illustrated in FIG. 27 is a map generated by processing of combining the two potential maps illustrated in FIG. 27 of (2) real-time stage information reflecting potential map, and (3) real-time attention area reflecting potential map.

This map combination processing is generated by quantifying setting areas of each map of "(2) real-time stage information reflecting potential map" and "(3) real-time attention area reflecting potential map", adding numerical values for every area, and resetting the areas (travel prohibition area, travel caution area, and travel allowance area) on the basis of the addition results.

Note that a detailed example of a generation sequence of "(4) real-time data reflecting potential map 230" based on the map combination processing will be described below with reference to a flowchart.

The real-time data reflecting potential map 230 generated by the real-time data reflecting potential map generation unit 208 is a map generated reflecting real-time on-stage information, real-time audience seat information, and real-time Internet information.

The real-time data reflecting potential map 230 generated by the real-time data reflecting potential map generation unit 208 is a map generated reflecting all the real-time performer positions, lighting states, object positions, audience, TV camera, and Internet information, and is a map on which the following area setting is performed.

Travel allowance area (blue)=non-attention area that is the most inconspicuous on the basis of the real-time performer positions, lighting states, object positions, audience, TV camera, and Internet information, Travel prohibition area (red)=attention area that is the most conspicuous on the basis of the real-time performer positions, lighting states, object positions, audience, TV camera, Internet information, Travel caution area (yellow)=intermediate area between a travel allowance area (blue) and a travel prohibition area (red) described above, The real-time data reflecting potential map 230 generated by the real-time data reflecting potential map generation unit 208 is provided to the traveling route generation unit 240, and the traveling route generation unit 240 determines a traveling route of the image capturing robot 50 on the basis of the real-time data reflecting potential map 230.

The traveling route generation unit 240 inputs the real-time data reflecting potential map 230, and generates traveling route information in which a route in which the image capturing robot 50 selects and travels in an area that does not collide with a performer or an object on the stage and is not conspicuous by the lightings and further an area other than an attention area of the audience, the TV camera, and the viewers on the Internet is set.

For example, the traveling route generation unit 240 can set the traveling route as described above by generating a traveling route in which travel is performed only in a travel allowance area in the real-time data reflecting potential map 230.

The generated traveling route is provided to a travel control unit that performs travel control of the image capturing robot 50, and the travel control unit causes the image capturing robot 50 to travel according to the generated traveling route information.

As described above, the image capturing robot 50 is caused to travel according to the traveling route information generated using the real-time data reflecting potential map 230 generated in present Example 3, thereby enabling the image capturing robot 50 to select and travel in an area that does not collide with a real-time performer position or an object position on the stage on which the live concert (performance) is performed and is not conspicuous by the lightings and further an area other than an attention area of the audience, the TV camera, and the viewers on the Internet.

Next, a generation processing sequence of a real-time data reflecting potential map performed by the information processing device 200 according to present Example 3 will be described with reference to a flow illustrated in FIG. 28.

Hereinafter, processing of each step of the flow illustrated in FIG. 28 will be sequentially described.

(Step S301)

First, in step S301, the information processing device 200 acquires real-time stage information (performer positions, lighting states, on-stage object positions, image capturing robot position).

This processing is processing performed by the real-time stage information acquisition unit 201 of the information processing device 200 illustrated in FIG. 24.

Specifically, the real-time stage information acquisition unit 201 includes, for example, a camera, an illuminance meter, and the like, and acquires, as information of a stage on which an actual live concert, that is, a performance by performers is performed, that is, real-time stage information, each piece of information of the performer positions, the lighting states, the on-stage object positions, and the image capturing robot position.

(Step S302)

Next, in step S302, the information processing device 200 corrects the previously generated pre-generated potential map on the basis of the real-time stage information acquired in step S301, and generates a real-time stage information reflecting potential map.

The processing in step S302 is processing performed by the pre-potential map correction unit 206 of the information processing device 200 illustrated in FIG. 24.

Figure 28:
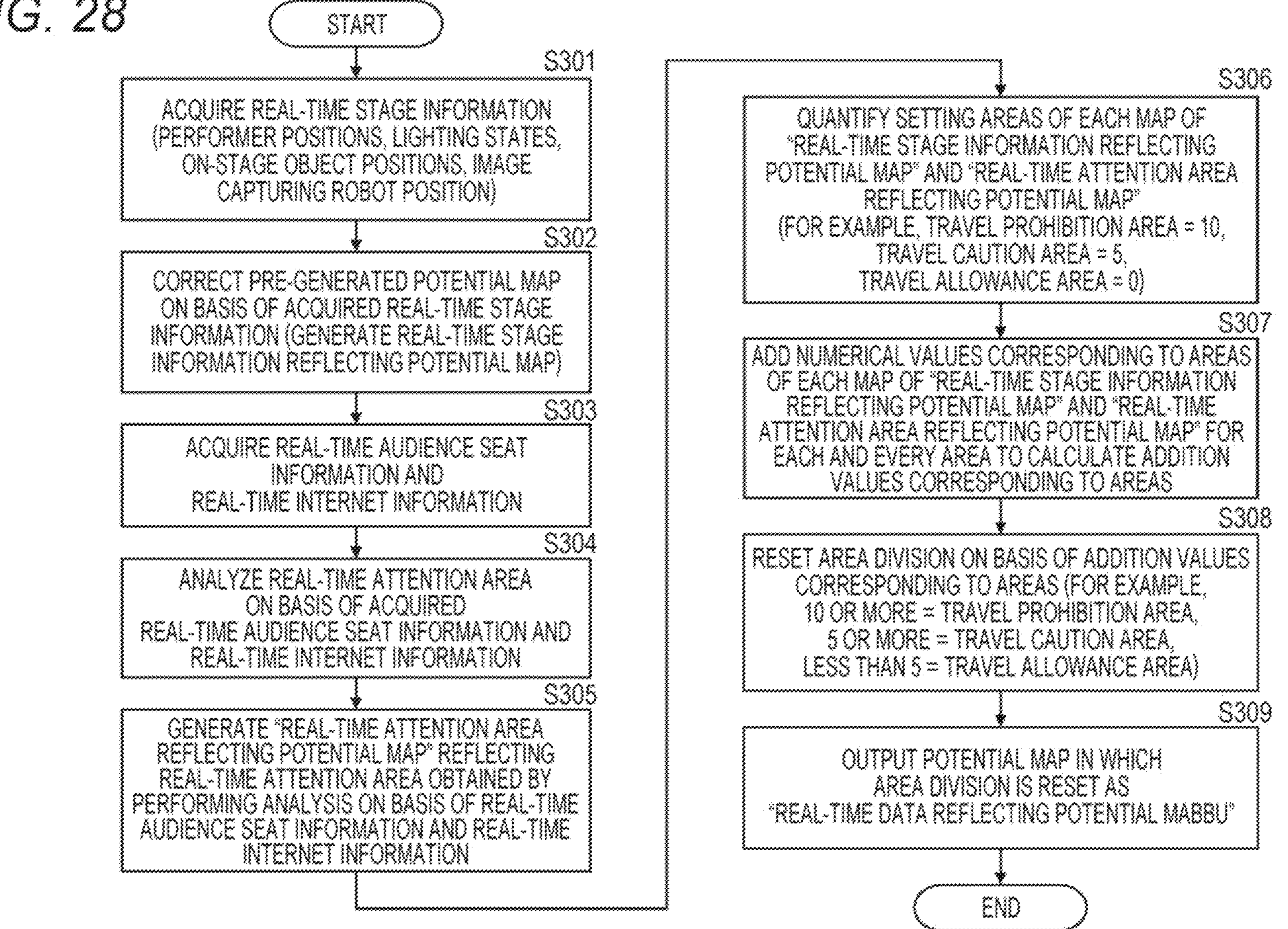
FIG. 28 is a diagram illustrating a flowchart describing a generation processing sequence of a real-time data reflecting potential map performed by the information processing device according to Example 3 of the present disclosure.

Although omitted in the flow illustrated in FIG. 28, after the processing of step S301, the real-time stage information analysis unit 204 of the information processing device 200 illustrated in FIG. 24 analyzes a difference between the real-time stage information (performer positions, lighting states, on-stage object positions, and image capturing robot position) input from the real-time stage information acquisition unit 201 and schedule data 231 based on the program of the live concert stored in the storage unit 205 in advance, and analyzes an issue point of travel of a traveling route according to the pre-generated potential map 150.

In a case where it is determined that there is an issue, that is, in a case where it is determined that there is a possibility of coming in contact with a performer or an object or a possibility of travel conspicuous by the lightings being performed in a case were the image capturing robot 50 is caused to travel according to a traveling route set using the pre-generated potential map 150, a request for correcting the pre-generated potential map 150 is output to the pre-potential map correction unit 206.

The processing in step S302 is subsequent processing, and in a case where a request for correcting the pre-generated potential map is input from the real-time stage information analysis unit 204, the pre-potential map correction unit 206 corrects the pre-generated potential map 150 so as to reduce the possibility of coming into contact with a performer or an object and the possibility of travel conspicuous by the lightings being performed, and generates the real-time stage information reflecting potential map.

The real-time stage information reflecting potential map generated by the pre-potential map correction unit 206 is a map generated reflecting the real-time performer positions, lighting states, and object positions, and is, for example, a map on which the following area setting is performed.

Travel allowance area (blue)=area far from the real-time performer positions or object positions and determined to be most inconspicuous on the basis of the real-time lighting states, Travel prohibition area (red)=area close to the real-time performer positions or object positions and determined to be conspicuous on the basis of the real-time lighting states, Travel caution area (yellow)=intermediate area between a travel allowance area (blue) and a travel prohibition area (red) described above, (Step S303)

Next, in step S303, the information processing device 200 acquires real-time audience seat information and real-time Internet information.

The processing is processing performed by the real-time audience seat information acquisition unit 202 and the real-time Internet information acquisition unit 203 of the information processing device 200 illustrated in FIG. 24.

The real-time audience seat information acquisition unit 202 acquires the following each piece of information as real-time data as described above with reference to FIG. 24.

Audience line-of-sight directions 215,

An audience seat side TV camera capturing direction 216,

Furthermore, the real-time Internet information acquisition unit 203, for example, acquires so-called SNS information 217 including tweets such as impressions and the like of many live concert viewers on the Internet, and inputs the acquired SNS information 217 to the real-time attention area analysis unit 207.

(Step S304)

Next, in step S304, the information processing device 200 analyzes a real-time attention area on the basis of the real-time audience seat information and the real-time Internet information acquired in step S303.

This processing is processing performed by the real-time attention area analysis unit 207 of the information processing device 200 illustrated in FIG. 24.

The real-time attention area analysis unit 207 analyzes the audience line-of-sight directions 215 and the audience seat side TV camera capturing direction 216 input from the real-time audience seat information acquisition unit 202 and the SNS information 217 input from the real-time Internet information acquisition unit 203, and analyzes where on the stage the audience is watching, where on the stage the TV camera is capturing, and where on the stage live concert viewers on the Internet are paying attention.

The real-time attention area analysis unit 207 estimates a current attention area on the stage on the basis of these analysis results, and outputs the estimated area to the real-time data reflecting potential map generation unit 208 as real-time attention area information 221 illustrated in FIG. 24.

(Step S305)

Next, in step S305, the information processing device 200 generates a "real-time attention area reflecting potential map" reflecting the real-time attention area obtained by performing analysis on the basis of the real-time audience seat information and the real-time Internet information.

This processing is processing performed by the real-time data reflecting potential map generation unit 208 of the information processing device 200 illustrated in FIG. 24.

The real-time data reflecting potential map generation unit 208 generates a "real-time attention area reflecting potential map" reflecting the real-time attention area obtained by performing analysis on the basis of the real-time audience seat information and the real-time Internet information.

The real-time attention area reflecting potential map is a map generated reflecting a real-time audience, TV camera, and Internet information, and is a map on which the following area setting is performed.

Travel allowable area (blue)=non-attention area having the lowest attention degree on the basis of a real-time audience, TV camera, and Internet information, Travel prohibition area (red)=attention area having the highest attention degree on the basis of a real-time audience, TV camera, Internet information, Travel caution area (yellow)=intermediate area between a travel allowance area (blue) and a travel prohibition area (red) described above, (Step S306)

Next, in step S306, the information processing device 200 quantifies setting areas of each map of the "real-time stage information reflecting potential map" and the "real-time attention area reflecting potential map".

This processing is also processing performed by the real-time data reflecting potential map generation unit 208 of the information processing device 200 illustrated in FIG. 24.

For example, travel prohibition area=10, travel caution area=5, travel allowance area=0

Such quantification is performed in units of areas.

(Step S307)

Next, in step S307, the information processing device 200 adds numerical values corresponding to areas of each map of the "real-time stage information reflecting potential map" and the "real-time attention area reflecting potential map" for each and every area to calculate addition values corresponding to the areas.

This processing is also processing performed by the real-time data reflecting potential map generation unit 208 of the information processing device 200 illustrated in FIG. 24.

For example, it is assumed that the area setting of the same stage position (x1, y1) of the "real-time stage information reflecting potential map" and the "real-time attention area reflecting potential map" has the following setting.

Numerical value of the real-time stage information reflecting potential map=5 (travel caution area)

Numerical value of the real-time attention area reflecting potential map=5 (travel caution area)

In this case, the addition value is 5+5=10.

Such addition processing is performed for stage areas in all the maps.

(Step S308)

Next, in step S308, the data processing unit of the information processing device 200 resets the area division on the basis of the addition values corresponding to the areas calculated in step S307.

This processing is also processing performed by the real-time data reflecting potential map generation unit 208 of the information processing device 200 illustrated in FIG. 24.

The real-time data reflecting potential map generation unit 208 of the information processing device 200 performs area resetting according to the following rules, for example.

Addition value is 10 or more=travel prohibition area

Addition value is 5 or more=travel caution area

Addition value is less than 5=travel allowance area

For example, the areas are reset according to the rules described above.

(Step S309)

Next, in step S309, the data processing unit of the information processing device 200 outputs a potential map in which the area division is reset in step S308 as a "real-time data reflecting potential map".

This processing is also processing performed by the real-time data reflecting potential map generation unit 208 of the information processing device 200 illustrated in FIG. 24.

The detailed sequence of the real-time data reflecting potential map generation processing performed by the information processing device 200 of Example 3 illustrated in FIG. 24 has been described above.

The image capturing robot 50 is caused to travel according to the traveling route information generated using the real-time data reflecting potential map 230 generated by the information processing device 200 of Example 3 illustrated in FIG. 24, thereby enabling the image capturing robot 50 to select and travel in an area that does not collide with a real-time performer position or an object position on the stage on which the live concert (performance) is performed and is not conspicuous by the lightings and further an area other than an attention area of the audience, the TV camera, and the viewers on the Internet.

Note that, in steps S301 to S302 of the flowchart illustrated in FIG. 28, the following processing is performed.

Real-time stage information (performer positions, lighting states, on-stage object positions, image capturing robot position) acquisition processing by the real-time stage information acquisition unit 201 of the information processing device 200 illustrated in FIG. 24 and real-time stage information reflecting potential map generation processing by correcting a pre-generated potential map by the pre-potential map correction unit 206 are performed.

After the processing of steps S301 to S302, processing of steps S303 to S309 is performed, and finally, in step S309, the real-time data reflecting potential map 230 is generated, and a traveling route of the image capturing robot 50 is determined on the basis of the generated real-time data reflecting potential map 230, and travel control is performed.

However, the traveling route of the image capturing robot 50 may not be changed at any time during a period of the live concert performance. There are a period in which change may be made (=traveling route change allowance period) and a period in which change cannot be made (=traveling route change non-allowance period).

Therefore, the real-time stage information reflecting potential map generation processing in steps S301 to S302 is preferably performed only in a traveling route change allowance period of the image capturing robot 50.

A processing sequence in which the real-time stage information reflecting potential map generation processing in steps S301 to S302 of the flow illustrated in FIG. 28 is set to be performed only in a traveling route change allowance period of the image capturing robot 50 will be described with reference to the flowchart illustrated in FIG. 29.

The flowchart illustrated in FIG. 29 is a flow that can be performed in place of the processing of steps S301 to S302 of the flow illustrated in FIG. 28.

Hereinafter, processing of each step of the flow illustrated in FIG. 29 will be sequentially described.

(Step S321)

First, in step S321, the information processing device 200 illustrated in FIG. 24 determines whether or not it is an acquisition timing of real-time stage information.

This processing is performed by the real-time stage information acquisition unit 201 of the information processing device 200 illustrated in FIG. 24 or a control unit that controls the real-time stage information acquisition unit 201.

The acquisition timing of the real-time stage information is defined in advance such that the real-time stage information is acquired every certain period, for example, every 10 seconds or the like.

In step S321, whether or not it is the acquisition timing of the real-time stage information is determined according to the provision.

In a case where it is determined that it is the acquisition timing of the real-time stage information, the processing proceeds to step S322.

(Step S322)

In a case where it is determined that it is the acquisition timing of the real-time stage information in step S321, the information processing device 200 acquires real-time stage information (performer positions, lighting states, on-stage object positions, image capturing robot position) in step S322.

This processing is performed by the real-time stage information acquisition unit 201 of the information processing device 200 illustrated in FIG. 24.

Specifically, the real-time stage information acquisition unit 201 includes, for example, a camera, an illuminance meter, and the like, and acquires, as information of a stage on which an actual live concert, that is, a performance by performers is performed, that is, real-time stage information, each piece of information of the performer positions, the lighting states, the on-stage object positions, and the image capturing robot position.

(Step S323)

Next, in step S323, the information processing device 200 determines whether or not it is a traveling end time of the image capturing robot.

Information of the traveling end time of the image capturing robot is stored in advance in the storage unit 205 of the information processing device 200. For example, it is recorded in association with a traveling schedule route of the image capturing robot.

The information processing device 200 determines whether or not the current time is the traveling end time of the image capturing robot with reference to the recorded information.

In a case where the current time is the traveling end time of the image capturing robot, the processing is ended.

On the other hand, in a case where the current time is not the traveling end time of the image capturing robot, the processing proceeds to step S324.

(Step S324)

In a case where it is determined in step S323 that it is not the traveling end time of the image capturing robot, the information processing device 200 determines in step S324 whether or not it is a traveling route change allowance time of the image capturing robot.

Information of whether or not the traveling route change allowance time of the image capturing robot is stored in advance in the storage unit 205 of the information processing device 200. For example, it is recorded in association with a traveling schedule route of the image capturing robot.

The information processing device 200 determines whether or not the current time is the traveling route change allowance time of the image capturing robot with reference to the recorded information.

In a case where the current time is not the traveling route change allowance time of the image capturing robot, the processing returns to step S321 without proceeding to step S325, and processing of steps S321 to S324 is repeated.

Only in a case where it is determined that the current time is the traveling route change allowance time of the image capturing robot, the processing proceeds to step S325.

(Step S325)

In a case where it is determined in step S324 that the current time is the traveling route change allowance time of the image capturing robot, processing of step S325 is performed.

In this case, in step S325, the information processing device 200 performs processing of comparing the real-time stage information (performer positions, lighting states, on-stage object positions, image capturing robot position) acquired in step S321 and the previously generated pre-generated potential map.

This processing of step S325 is processing performed by the real-time stage information analysis unit 204 of the information processing device 200 illustrated in FIG. 24.

(Step S326)

Next, in step S326, the information processing device 200 determines whether or not the traveling route of the image capturing robot based on the pre-generated potential map is set to pass through a dangerous area estimated from the real-time stage information (performer positions, lighting states, on-stage object positions, image capturing robot position) acquired in step S321.

This processing of step S326 is also processing performed by the real-time stage information analysis unit 204 of the information processing device 200 illustrated in FIG. 24.

The real-time stage information analysis unit 204 analyzes a difference between the real-time stage information (performer positions, lighting states, on-stage object positions, and image capturing robot position) input from the real-time stage information acquisition unit 201 and schedule data 231 based on the program of the live concert stored in the storage unit 205 in advance, and analyzes a risk of travel of the traveling route according to the pre-generated potential map 150.

In a case where it is determined that there is no risk, that is, in a case where it is determined that there is no possibility of coming in contact with a performer or an object or a possibility of travel conspicuous by the lightings being performed in a case were the image capturing robot 50 is caused to travel according to the traveling route set using the pre-generated potential map 150, the processing returns to step S321 without proceeding to step S327, and processing of step S321 and subsequent steps are repeated.

On the other hand, in a case where it is determined that there is a risk, that is, in a case where it is determined that there is a possibility of coming in contact with a performer or an object or a possibility of travel conspicuous by the lightings being performed in a case were the image capturing robot 50 is caused to travel according to the traveling route set using the pre-generated potential map 150, the processing proceeds to step S327.

(Step S327)

In a case where it is determined in step S326 that there is a risk that the traveling route set using the pre-generated potential map 150 comes in contact with a performer or the like, the information processing device performs processing of step S327.

In this case, in step S327, the information processing device 200 corrects the pre-generated potential map 150 stored in the storage unit 205, and generates the real-time stage information reflecting potential map.

The processing in step S327 is processing performed by the pre-generated potential map correction unit 206 of the information processing device 200 illustrated in FIG. 24.

The pre-potential map correction unit 206 corrects the pre-generated potential map 150 so as to reduce the possibility of coming into contact with a performer or an object and the possibility of travel conspicuous by the lightings being performed, and generates a real-time stage information reflecting potential map.

The real-time stage information reflecting potential map generated by the pre-potential map correction unit 206 is a map generated reflecting the real-time performer positions, lighting states, and object positions, and is, for example, a map on which the following area setting is performed.

Travel allowance area (blue)=area far from the real-time performer positions or object positions and determined to be most inconspicuous on the basis of the real-time lighting states, Travel prohibition area (red)=area close to the real-time performer positions or object positions and determined to be conspicuous on the basis of the real-time lighting states, Travel caution area (yellow)=intermediate area between a travel allowance area (blue) and a travel prohibition area (red) described above, After processing in steps S321 to S327 illustrated in FIG. 29, processing of step S303 and subsequent steps of the flow illustrated in FIG. 28 is performed.

That is, processing of steps S303 to S309 is performed, and finally, in step S309, the real-time data reflecting potential map 230 is generated, and a traveling route of the image capturing robot 50 is determined on the basis of the generated real-time data reflecting potential map 230, and travel control is performed.

By the processing of steps S321 to S327 illustrated in the flowchart of FIG. 29 being performed instead of the processing of steps S301 to S302 illustrated in FIG. 28, the real-time stage information reflecting potential map generation processing can be performed only in a traveling route change allowance period of the image capturing robot 50.

6. Example of Hardware Configuration of Information Processing Device

Next, a hardware configuration example of an information processing device that performs processing according to the above-described examples will be described with reference to FIG. 30.

The hardware illustrated in FIG. 30 is an example of a hardware configuration of the information processing device 100 described above with reference to FIG. 4, the information processing device 100*b* described above with reference to FIG. 20, and the information processing device 200 described above with reference to FIG. 24.

The hardware configuration illustrated in FIG. 30 will be described.

A central processing unit (CPU) 301 functions as a data processing unit that performs various types of processing according to a program stored in a read only memory (ROM) 302 or a storage unit 308. For example, processing according to the sequences described in the above-described examples is performed. A random access memory (RAN) 303 stores programs, data, and the like to be performed by the CPU 301. The CPU 301, the ROM 302, and the RAM 303 are connected to each other by a bus 304.

The CPU 301 is connected to an input/output interface 305 via the bus 304, and an input unit 306 including various sensors, a camera, a switch, a keyboard, a mouse, a microphone, and the like, and an output unit 307 including a display, a speaker, and the like are connected to the input/output interface 305.

The storage unit 308 connected to the input/output interface 305 includes, for example, a hard disk and the like and stores programs performed by the CPU 301 and various types of data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and performs data recording and reading.

7. Summary of Configuration of Present Disclosure

The examples of the present disclosure have been described above in detail with reference to the specific examples. However, it is self-evident that a person skilled in the art can modify or substitute the examples without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in this specification can have the following configurations.

(1) An information processing device including a data processing unit that generates a potential map in which a travel allowance area of an image capturing robot that moves on a stage and captures an image is defined, in which the data processing unit acquires data of at least one of action schedule data of a performer on the stage or arrangement schedule data of an object on the stage, and generates, on the basis of acquired data, a potential map in which a travel allowance area in which a possibility of collision with a performer or an object on a stage is equal to or less than a defined threshold is defined.

(2) The information processing device according to (1), in which the data processing unit acquires time-series data of action schedule data of a performer on the stage or arrangement schedule data of an object on the stage, and generates, on the basis of acquired data, time-series data of a potential map in which a travel allowance area in which a possibility of collision with a performer or an object on a stage is equal to or less than a defined threshold is defined.

(3) The information processing device according to (1) or (2), in which the data processing unit acquires lighting control schedule data on the stage, and generates, on the basis of acquired data, a potential map in which an area other than an area in which a lighting state value calculated on the basis of a lighting with which a stage is irradiated is equal to or greater than a predefined threshold is defined as a travel allowance area.

(4) The information processing device according to any one of (1) to (3), in which the data processing unit acquires lighting brightness control schedule data on the stage, and generates, on the basis of acquired data, a potential map in which an area other than an area in which brightness of a lighting with which a stage is irradiated is equal to or greater than a predefined threshold is defined as a travel allowance area.

(5) The information processing device according to any one of (1) to (4), in which the data processing unit acquires lighting color control schedule data on the stage, and generates, on the basis of acquired data, a potential map in which an area other than an area in which a lighting with which a stage is irradiated has a predetermined color value is defined as a travel allowance area.

(6) The information processing device according to any one of (1) to (5), in which the data processing unit generates a potential map in which a travel allowance area in which a possibility of collision with a performer or an object on a stage is equal to or less than a defined threshold, and a travel prohibition area that is an area closer to a performer or an object on a stage than the travel allowance area are defined.

(7) The information processing device according to (6), in which the data processing unit generates a potential map in which a travel caution area at a middle position between the travel allowance area and the travel prohibition area is defined.

(8) The information processing device according to any one of (1) to (7), in which the data processing unit generates three types of individual potential maps (a) to (c) described below:

(a) a performer base potential map in which a travel allowance area in which a possibility of collision with a performer on a stage is equal to or less than a defined threshold is defined on the basis of action schedule data of a performer on the stage;

(b) an object base potential map in which a travel allowance area in which a possibility of collision with an object on a stage is equal to or less than a defined threshold is defined on the basis of arrangement schedule data of an object on the stage; and (c) a lighting base potential map in which an area other than an area in which a lighting state value calculated on the basis of a lighting with which a stage is irradiated is equal to or more than a predefined threshold is defined as a travel allowance area on the basis of lighting control schedule data on the stage, and further combines three types of individual potential maps (a) to (c) described above to generate a pre-generated potential map.

(9) The information processing device according to (8), in which, in the pre-generated potential map, an area in which a possibility of collision with a performer and an object on a stage is equal to or less than a defined threshold, the area being other than an area in which a lighting state value calculated on the basis of a lighting is equal to or greater than a predefined threshold, is defined as a travel allowance area.

(10) The information processing device according to (8) or (9), in which the data processing unit generates the pre-generated potential map by, in processing of combining the three types of individual potential maps (a) to (c), performing quantifying processing in units of areas for each of a travel allowance area, a travel caution area, and a travel prohibition area defined in each of the three types of individual potential maps (a) to (c), calculating an addition value obtained by adding numerical values of each individual potential map after quantifying processing, and performing area resetting of a travel allowance area, a travel caution area, and a travel prohibition area on the basis of a calculated addition value.

(11) The information processing device according to any one of (1) to (10), in which the data processing unit acquires viewpoint position data of at least one of viewpoint position data of an audience on an audience seat side viewing the stage or viewpoint position data of a camera, and generates, on the basis of acquired data, a potential map in which a position far from a line connecting a viewpoint position of the audience or the camera and a center position of the stage is defined as a travel allowance area.

(12) The information processing device according to any one of (1) to (11), in which the data processing unit generates four types of individual potential maps (a) to (d) described below:

(a) a performer base potential map in which a travel allowance area in which a possibility of collision with a performer on a stage is equal to or less than a defined threshold is defined on the basis of action schedule data of a performer on the stage;

(b) an object base potential map in which a travel allowance area in which a possibility of collision with an object on a stage is equal to or less than a defined threshold is defined on the basis of arrangement schedule data of an object on the stage;

(c) a lighting base potential map in which an area other than an area in which a lighting state value calculated on the basis of a lighting with which a stage is irradiated is equal to or more than a predefined threshold is defined as a travel allowance area on the basis of lighting control schedule data on the stage; and (d) an audience and camera base potential map in which a position far from a line connecting a viewpoint schedule position of an audience or a camera and a center position of the stage is defined as a travel allowance area on the basis of viewpoint position schedule data of at least one of viewpoint position schedule data of the audience on an audience seat side viewing the stage or viewpoint position schedule data of the camera, and further combines four types of individual potential maps (a) to (d) described above to generate a pre-generated potential map.

(13) The information processing device according to any one of (1) to (12), in which the data processing unit acquires real-time data of at least one of action data of the performer or arrangement data of an object on the stage as real-time data during performance of a performance by the performer on the stage, and generates, on the basis of acquired real-time data, a real-time data reflecting potential map in which a travel allowance area in which a possibility of collision with a performer or an object on a stage is equal to or less than a defined threshold is defined.

(14) The information processing device according to (13), in which the data processing unit acquires data of at least one of a line-of-sight direction of an audience on an audience seat side viewing the stage or a capturing direction of a camera as real-time data during performance of a performance by the performer on the stage, analyzes an attention area on the basis of acquired data, and generates a real-time data reflecting potential map in which an area other than an attention area is defined as a travel allowance area.

(15) The information processing device according to (13) or (14), in which the data processing unit further acquires a comment of a user viewing a performance of the performer on the stage via Internet, analyzes an attention area of an Internet viewing user on the basis of an acquired comment, and generates a real-time data reflecting potential map in which an area other than an attention area is defined as a travel allowance area.

(16) The information processing device according to any one of (1) to (15), in which the data processing unit generates a route along which the image capturing robot is caused to travel on the basis of the potential map.

(17) The information processing device according to (16), in which the data processing unit generates a traveling route along which the image capturing robot is set to be caused to travel in a travel allowance area defined in the potential map.

(18) The information processing device according to any one of (1) to (17), in which the data processing unit generates simulation data for displaying a traveling route of the image capturing robot generated on the basis of the potential map on a display unit.

(19) A mobile device including at least one of a storage unit that stores traveling route information generated on the basis of a potential map in which a travel allowance area in which a possibility of collision with a performer or an object on a stage is equal to or less than a defined threshold is defined, the potential map being a map generated on the basis of data of at least one of action schedule data of a performer on a stage or arrangement schedule data of an object on the stage, or a communication unit that acquires the traveling route information from an external device, in which the mobile device performs travel processing according to either the traveling route information acquired from the storage unit or the traveling route information acquired via the communication unit.

(20) An information processing system including an image capturing robot and a server, in which the image capturing robot is an image capturing robot that moves on a stage and captures an image, the server includes a data processing unit that generates a potential map in which a travel allowance area of the image capturing robot is defined, the data processing unit acquires data of at least one of action schedule data of a performer on the stage or arrangement schedule data of an object on the stage, and generates, on the basis of acquired data, a potential map in which a travel allowance area in which a possibility of collision with a performer or an object on a stage is equal to or less than a defined threshold is defined, and the image capturing robot travels according to a traveling route determined on the basis of the potential map generated by the server.

Furthermore, a series of processing described in the specification can be performed by hardware, software, or a configuration obtained by combining hardware and software. In a case where processing by software is performed, a program in which a processing sequence is recorded can be installed and performed in a memory in a computer incorporated in dedicated hardware, or the program can be installed and performed in a general-purpose computer capable of performing various types of processing. For example, the program can be recorded in advance in a recording medium. In addition to being installed on a computer from a recording medium, the program can be received via a network such as a local area network (LAN) or the Internet and installed on a recording medium such as an internal hard disk or the like.

Note that the various types of processing described in the specification may be performed not only in a chronological order in accordance with the description, but may also be performed in parallel or individually depending on processing capability of a device that performs the processing or depending on the necessity. Furthermore, in the present specification, a system is a logical set configuration of a plurality of devices, and is not limited to a system in which devices of configurations are in the same housing.

INDUSTRIAL APPLICABILITY

As described above, according to a configuration of an example of the present disclosure, a map for determining a safe traveling route that does not collide with a performer or an object on a stage can be generated, and an image capturing robot can be caused to travel according to a route determined on the basis of the map.

Specifically, for example, a potential map in which a traveling allowance area of the image capturing robot that moves on a stage and captures an image is defined is generated. A data processing unit acquires action schedule data of a performer, arrangement schedule data of an object on a stage, and control schedule data of a lighting on the stage, and generates, on the basis of the acquired data, a potential map in which an area that does not collide with a performer or an object and is inconspicuous by a lighting is defined as a travel allowance area. Moreover, a traveling route of the robot is determined on the basis of the generated map, and the robot is caused to travel.

With the present configuration, a map for determining a safe traveling route that does not collide with a performer or an object on a stage can be generated, and an image capturing robot can be caused to travel according to a route determined on the basis of the map.

REFERENCE SIGNS LIST

10 Stage
11 Lighting
12 Speaker
13 Monitor
14 Decorative object
20 Performer
30 Audience
31 TV camera
50 Priority audience
50 Image capturing robot
100 Information processing device
110 Storage unit
111 Performer action schedule data
112 Stage lighting control schedule data
113 On-stage object arrangement schedule data
114 Priority audience, TV camera viewpoint position data
120 Individual potential map generation unit
130 Potential map combination unit
150 Pre-generated potential map
160 Traveling route determination unit
165 Traveling route information
170 Travel control unit
180 Information processing system
200 Information processing device
201 Real-time stage information acquisition unit
202 Real-time audience seat information acquisition unit
203 Real-time Internet information acquisition unit
204 Real-time stage information analysis unit
205 Storage unit
206 Pre-generated potential map correction unit
207 Real-time attention area analysis unit
208 Real-time data reflecting potential map generation unit
240 Traveling route generation unit
280 Information processing system
290 SNS server
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An image capturing robot comprising:
a camera;
a transceiver;
a memory;
a drive mechanism to drive mobility of the image capturing robot; and
control circuitry that:
acquires, via the transceiver prior to beginning of a stage performance, time-series data that includes:
time-series action schedule data of actions to be performed live on a stage by a performer during the stage performance, and
time-series arrangement schedule data regarding placement of an object on the stage during the stage performance,
generates, prior to the beginning of the stage performance, on a basis of the acquired data, a time-series map of a travel allowance area of the image capturing robot on the stage during the stage performance in which a possibility of collision between the image capturing robot and either of the performer or the object on the stage during the stage performance is equal to or less than a defined collision threshold, wherein the time-series map of the travel allowance area includes corresponding time-series movement and location information of the image capturing robot corresponding to the time-series action schedule data of actions to be performed live on the stage by the performer and the time-series arrangement schedule data regarding placement of the object on the stage during the stage performance, stores the generated time-series map in the memory, and during the stage performance, uses the time-series map from the memory and moves the image capturing robot, under real-time control of the drive mechanism, in accordance with the generated time-series map of the travel allowance area and according to a determined traveling route within the travel allowance area to prevent collision between the image capturing robot and the performer and the object during the stage performance, wherein the control circuitry:

updates the travel allowance area during the stage performance based on an online comment received during the stage performance, analysis of an attention area associated with the comment received during the stage performance, and generation of real-time data reflecting a map in which an area other than the attention area is included within or as the travel allowance area.

2. The image capturing robot according to claim 1, wherein the acquired data further includes stage lighting control schedule data, and wherein the time-series map of the travel allowance area avoids any area on the stage where the stage lighting control schedule data indicates that a scheduled lighting state is equal to or greater than a predefined lighting threshold.

3. The image capturing robot according to claim 2, wherein the stage lighting control schedule data comprises lighting color control schedule data, and wherein the time-series map of the travel allowance area avoids any area on the stage that the lighting color control schedule data indicates will be illuminated in a predetermined color.

4. The image capturing robot according to claim 1, wherein the control circuitry acquires viewpoint position data that includes at least one of first viewpoint position data relative to an audience seat viewing the stage or second viewpoint position data relative to a remote camera aimed at a center of the stage, and wherein the time-series map of the travel allowance area comprises areas that avoid a line connecting the audience seat to the stage or that avoid a line connecting the remote camera to the stage during the stage performance.

5. The image capturing robot according to claim 1, wherein the control circuitry:

acquires, via the camera, real-time data during the stage performance that includes each of real-time action data of actual actions performed by the performer during the stage performance and real-time data arrangement data regarding actual placement of the object on the stage during the stage performance, generates, based on the acquired real-time data, updates to the time-series map of the travel allowance area in real time during the stage performance, and controls the drive mechanism to move the image capturing robot in real time during the stage performance in accordance with the updates to the time-series map.

6. A system comprising:

circuitry configured to:

acquire, prior to beginning of a stage performance, time-series data that includes:

time-series action schedule data of actions to be performed live on a stage by a performer during the stage performance, and time-series arrangement schedule data regarding placement of an object on the stage during the stage performance, generate, prior to the beginning of the stage performance, on a basis of the acquired data, a time-series map of a travel allowance area of an image capturing robot on the stage during the stage performance in which a possibility of collision between the image capturing robot and either of the performer or the object on the stage during the stage performance is equal to or less than a defined collision threshold, wherein the time-series map of the travel allowance area includes corresponding time-series movement and location information of the image capturing robot corresponding to the time-series action schedule data of actions to be performed live on the stage by the performer and the time-series arrangement schedule data regarding placement of the object on the stage during the stage performance, store the generated time-series map in a memory, and during the stage performance, use the time-series map from the memory and move the image capturing robot, under real-time control, in accordance with the generated time-series map of the travel allowance area and according to a determined traveling route within the travel allowance area to prevent collision between the image capturing robot and the performer and the object during the stage performance, wherein the circuitry;

updates the travel allowance area during the stage performance based on an online comment received during the stage performance, analysis of an attention area associated with the comment received during the stage performance, and generation of real-time data reflecting a map in which an area other than the attention area is included within or as the travel allowance area.

7. The system according to claim 6, wherein the acquired data further includes stage lighting control schedule data, and wherein the time-series map of the travel allowance area avoids any area on the stage where the stage lighting control schedule data indicates that a scheduled lighting state is equal to or greater than a predefined lighting threshold.

8. The system according to claim 7, wherein the stage lighting control schedule data comprises lighting color control schedule data, and wherein the time-series map of the travel allowance area avoids any area on the stage that the lighting color control schedule data indicates will be illuminated in a predetermined color.

9. The system according to claim 6, wherein the circuitry acquires viewpoint position data that includes at least one of first viewpoint position data relative to an audience seat viewing the stage or second viewpoint position data relative to a remote camera aimed at a center of the stage, and wherein the time-series map of the travel allowance area comprises areas that avoid a line connecting the audience seat to the stage or that avoid a line connecting the remote camera to the stage during the stage performance.

10. The system according to claim 6, wherein the circuitry:

acquires, via a camera, real-time data during the stage performance that includes each of real-time action data of actual actions performed by the performer during the stage performance and real-time data arrangement data regarding actual placement of the object on the stage during the stage performance, generates, based on the acquired real-time data, updates to the time-series map of the travel allowance area in real time during the stage performance, and controls a drive mechanism to move the image capturing robot in real time during the stage performance in accordance with the updates to the time-series map.

11. A non-transitory computer-readable storage medium having stored thereon instructions that, when executed by one or more processors, causes the one or more processors to perform a method comprising:

acquiring, prior to beginning of a stage performance, time-series data that includes:

time-series action schedule data of actions to be performed live on a stage by a performer during the stage performance, and time-series arrangement schedule data regarding placement of an object on the stage during the stage performance;

generating, prior to the beginning of the stage performance, on a basis of the acquired data, a time-series map of a travel allowance area of an image capturing robot on the stage during the stage performance in which a possibility of collision between the image capturing robot and either of the performer or the object on the stage during the stage performance is equal to or less than a defined collision threshold, wherein the time-series map of the travel allowance area includes corresponding time-series movement and location information of the image capturing robot corresponding to the time-series action schedule data of actions to be performed live on the stage by the performer and the time-series arrangement schedule data regarding placement of the object on the stage during the stage performance;

storing the generated time-series map in a memory; and during the stage performance, using the time-series map from the memory and moving the image capturing robot, under real-time control, in accordance with the generated time-series map of the travel allowance area and according to a determined traveling route within the travel allowance area to prevent collision between the image capturing robot and the performer and the object during the stage performance, wherein the method further comprises:

updating the travel allowance area during the stage performance based on an online comment received during the stage performance, analysis of an attention area associated with the comment received during the stage performance, and generation of real-time data reflecting a map in which an area other than the attention area is included within or as the travel allowance area.

12. The non-transitory computer-readable storage medium according to claim 11, wherein the acquired data further includes stage lighting control schedule data, and wherein the time-series map of the travel allowance area avoids any area on the stage where the stage lighting control schedule data indicates that a scheduled lighting state is equal to or greater than a predefined lighting threshold.

13. The non-transitory computer-readable storage medium according to claim 12, wherein the stage lighting control schedule data comprises lighting color control schedule data, and wherein the time-series map of the travel allowance area avoids any area on the stage that the lighting color control schedule data indicates will be illuminated in a predetermined color.

14. The non-transitory computer-readable storage medium according to claim 11, wherein said acquiring includes acquiring viewpoint position data that includes at least one of first viewpoint position data relative to an audience seat viewing the stage or second viewpoint position data relative to a remote camera aimed at a center of the stage, and wherein the time-series map of the travel allowance area comprises areas that avoid a line connecting the audience seat to the stage or that avoid a line connecting the remote camera to the stage during the stage performance.

15. The non-transitory computer-readable storage medium according to claim 11, wherein the method further comprises:

acquiring, via a camera, real-time data during the stage performance that includes each of real-time action data of actual actions performed by the performer during the stage performance and real-time data arrangement data regarding actual placement of the object on the stage during the stage performance, generating, based on the acquired real-time data, updates to the time-series map of the travel allowance area in real time during the stage performance, and controlling a drive mechanism to move the image capturing robot in real time during the stage performance in accordance with the updates to the time-series map.

* * * * *